US009780348B2

United States Patent
Kagami et al.

(10) Patent No.: US 9,780,348 B2
(45) Date of Patent: Oct. 3, 2017

(54) ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Sony Corporation, Tokyo (JP)

(72) Inventors: Keiichi Kagami, Fukushima (JP); Kimio Takahashi, Fukushima (JP); Kojiro Kita, Tochigi (JP); Kazuhito Hatta, Fukushima (JP)

(73) Assignee: Sony Corporation, Tokyo (JP)

( * ) Notice: Subject to any disclaimer, the term of this patent is extended or adjusted under 35 U.S.C. 154(b) by 458 days.

(21) Appl. No.: 14/564,307

(22) Filed: Dec. 9, 2014

(65) Prior Publication Data
US 2015/0179998 A1 Jun. 25, 2015

(30) Foreign Application Priority Data

Dec. 19, 2013 (JP) .................................. 2013-262349

(51) Int. Cl.
*H01M 2/16* (2006.01)
*B60L 1/08* (2006.01)
(Continued)

(52) U.S. Cl.
CPC ............. *H01M 2/1646* (2013.01); *B60L 1/08* (2013.01); *B60L 3/0046* (2013.01);
(Continued)

(58) Field of Classification Search
CPC ............. H01M 2/1646; H01M 2/1653; H01M 2/1686
See application file for complete search history.

(56) References Cited

U.S. PATENT DOCUMENTS

2012/0164442 A1 6/2012 Ong et al.
2013/0209860 A1 8/2013 Tsujikawa et al.
(Continued)

FOREIGN PATENT DOCUMENTS

JP 10-214603 8/1998
JP 10-255389 9/1998
(Continued)

OTHER PUBLICATIONS

Korean Office Action (with English translation) mailed Aug. 1, 2016 in corresponding Korean application No. 10-2014-0173667 (17 pages).

*Primary Examiner* — Stewart Fraser
(74) *Attorney, Agent, or Firm* — K&L Gates LLP

(57) ABSTRACT

A secondary battery includes: a cathode; an anode; an electrolytic solution; and an interlayer provided between the cathode and the anode and including one or more of a polyphosphate salt, a melamine salt, a melamine derivative represented by Formula (1), a metal hydroxide, and a metal hydrate, the interlayer partially entering into the cathode, the anode, or both.

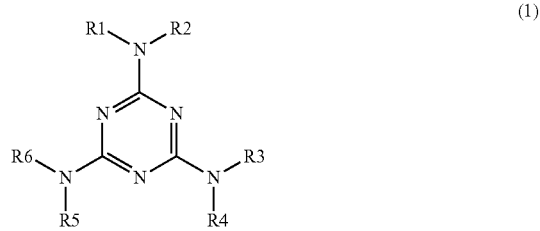

(R1 to R6 are each one of a hydrogen group (—H), a monovalent hydrocarbon group, a monovalent
(Continued)

hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.)

18 Claims, 14 Drawing Sheets

(51) Int. Cl.
| | |
|---|---|
| *B60L 3/00* | (2006.01) |
| *B60L 3/04* | (2006.01) |
| *B60L 11/14* | (2006.01) |
| *B60L 11/18* | (2006.01) |
| *B60L 15/20* | (2006.01) |
| *H01M 4/13* | (2010.01) |
| *H01M 10/052* | (2010.01) |
| *H01M 10/0567* | (2010.01) |
| *H01M 10/0568* | (2010.01) |
| *H01M 10/42* | (2006.01) |

(52) U.S. Cl.
CPC .............. *B60L 3/0069* (2013.01); *B60L 3/04* (2013.01); *B60L 11/14* (2013.01); *B60L 11/1816* (2013.01); *B60L 11/1842* (2013.01); *B60L 11/1846* (2013.01); *B60L 11/1857* (2013.01); *B60L 11/1859* (2013.01); *B60L 11/1861* (2013.01); *B60L 11/1864* (2013.01); *B60L 11/1875* (2013.01); *B60L 11/1879* (2013.01); *B60L 15/20* (2013.01); *B60L 15/2009* (2013.01); *H01M 2/166* (2013.01); *H01M 2/1673* (2013.01); *H01M 2/1686* (2013.01); *H01M 4/13* (2013.01); *H01M 10/052* (2013.01); *H01M 10/0567* (2013.01); *H01M 10/0568* (2013.01); *H01M 10/4235* (2013.01); *B60L 2200/12* (2013.01); *B60L 2240/12* (2013.01); *B60L 2240/14* (2013.01); *B60L 2240/423* (2013.01); *B60L 2240/443* (2013.01); *B60L 2240/545* (2013.01); *B60L 2240/547* (2013.01); *B60L 2240/549* (2013.01); *B60L 2240/662* (2013.01); *B60L 2240/80* (2013.01); *H01M 2220/10* (2013.01); *H01M 2220/20* (2013.01); *H01M 2220/30* (2013.01); *H01M 2300/0085* (2013.01); *Y02E 60/122* (2013.01); *Y02E 60/721* (2013.01); *Y02T 10/645* (2013.01); *Y02T 10/70* (2013.01); *Y02T 10/7011* (2013.01); *Y02T 10/7044* (2013.01); *Y02T 10/7061* (2013.01); *Y02T 10/7072* (2013.01); *Y02T 10/7077* (2013.01); *Y02T 10/72* (2013.01); *Y02T 10/7275* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01); *Y10T 307/406* (2015.04)

(56) References Cited

U.S. PATENT DOCUMENTS

| | | | |
|---|---|---|---|
| 2014/0037924 A1* | 2/2014 | Furuta | C09J 133/14 428/214 |
| 2014/0087232 A1* | 3/2014 | Wang | G09F 23/00 429/122 |
| 2014/0093751 A1* | 4/2014 | Schaefer | H01M 2/1072 429/7 |
| 2014/0234693 A1* | 8/2014 | Tsujikawa | H01M 2/1653 429/144 |

FOREIGN PATENT DOCUMENTS

| | | |
|---|---|---|
| JP | 2001-015166 | 1/2001 |
| JP | 2005-353579 | 12/2005 |
| JP | 2009-301746 | 12/2009 |
| JP | 2009-301798 | 12/2009 |
| JP | 2010-251217 | 11/2010 |
| KR | 10-2012-0049299 A | 5/2012 |
| KR | 10-2013-0107278 A | 10/2013 |

* cited by examiner

ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCES TO RELATED APPLICATIONS

The present application claims priority to Japanese Priority Patent Application JP 2013-262349 filed in the Japan Patent Office on Dec. 19, 2013, the entire content of which is hereby incorporated by reference.

BACKGROUND

The present application relates to an electrode that includes an active material layer, to a secondary battery that uses the electrode, and to a battery pack, an electric vehicle, an electric power storage system, an electric power tool, and an electronic apparatus that use the secondary battery.

In recent years, various electronic apparatuses such as a mobile phone and a mobile information terminal device (a PDA) have been widely used, and it has been demanded to further reduce the size and the weight of the electronic apparatuses and to achieve their longer lives. Accordingly, as an electric power source, a battery, in particular, a small and light-weight secondary battery capable of providing high energy density has been developed.

In these days, it has been considered to apply a secondary battery to various other applications in addition to the electronic apparatuses. Examples of such other applications may include a battery pack attachably and detachably mounted on the electronic apparatuses or the like, an electric vehicle such as an electric automobile, an electric power storage system such as a home electric power server, and an electric power tool such as an electric drill.

There have been proposed secondary batteries that utilize various charge and discharge principles in order to obtain battery capacity. In particular, attention has been paid to a secondary battery that utilizes insertion and extraction of an electrode reactant, because higher energy density is achieved thereby.

A secondary battery includes a cathode, an anode, and electrolytic solution. The cathode includes a cathode active material layer, and the cathode active material layer includes a cathode active material that inserts and extracts the electrode reactant. The anode includes an anode active material layer, and the anode active material layer includes an anode active material that inserts and extracts the electrode reactant.

In such a secondary battery, it is important to improve battery characteristics such as battery capacity; however, it is also important to secure safety. Accordingly, various considerations have been given on the configuration of the secondary battery.

Specifically, in order to improve high-temperature conservation characteristics, etc. after charge operation, ammonium polyphosphate, etc. are contained in a cathode mixture or in an anode mixture (for example, see Japanese Unexamined Patent Application Publication Nos. H10-255389, 2010-251217, and 2001-015166). In order to improve low-temperature characteristics, etc., ammonium polyphosphate, etc. are contained in the electrolytic solution (for example, see Japanese Unexamined Patent Application Publication No. 2005-353579). In order to enhance ignition tolerance, ester phosphate, etc. are provided in part of a separator (for example, see Japanese Unexamined Patent Application Publication No. 2009-301746). In order to cause the secondary battery to be in a safe state when an abnormal incident occurs, ammonium polyphosphate, etc. are contained inside a housing of the battery (for example, see Japanese Unexamined Patent Application Publication No. 2009-301798). In order to secure heat tolerance, etc., melamine cyanurate, etc. are contained in a resin composition of a battery container for the secondary battery (for example, see Japanese Unexamined Patent Application Publication No. H10-214603).

SUMMARY

Various propositions have been made for a configuration of a secondary battery. However, battery characteristics and safety are not yet established at the same time, which leaves a room for improvement.

It is desirable to provide an electrode, a secondary battery, a battery pack, an electric vehicle, an electric power storage system, an electric power tool, and an electronic apparatus that are capable of achieving both battery characteristics and safety.

According to an embodiment of the present application, there is provided a secondary battery including: a cathode; an anode; an electrolytic solution; and an interlayer provided between the cathode and the anode and including one or more of a polyphosphate salt, a melamine salt, a melamine derivative represented by Formula (1), a metal hydroxide, and a metal hydrate, the interlayer partially entering into the cathode, the anode, or both.

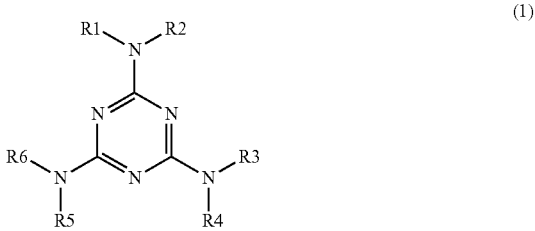

(1)

(R1 to R6 are each one of a hydrogen group (—H), a monovalent hydrocarbon group, a monovalent hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.)

According to an embodiment of the present application, there is provided an electrode including: an active material layer; and a surface layer provided on the active material layer and including one or more of a polyphosphate salt, a melamine salt, a melamine derivative represented by Formula (1), a metal hydroxide, and a metal hydrate, the surface layer partially entering into the active material layer.

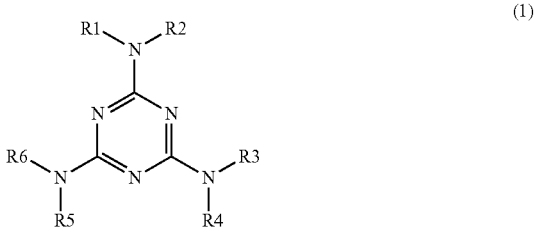

(1)

(R1 to R6 are each one of a hydrogen group (—H), a monovalent hydrocarbon group, a monovalent hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.)

Herein, the wording "the interlayer partially enters into the cathode" (or "a portion of the interlayer enters into the cathode") refers to that a portion of the interlayer is present (a portion of the interlayer protrudes into the cathode) in an inner side of a surface of the cathode (in a direction toward inside of the cathode). The wording "the interlayer partially enters into the anode" (or "a portion of the interlayer enters into the anode") refers to that a portion of the interlayer is present (a portion of the interlayer protrudes into the anode) in an inner side of a surface of the anode (in a direction toward inside of the anode). The wording "the surface layer partially enters into the active material layer" (or "a portion of the surface layer enters into the active material layer") refers to that a portion of the surface layer is present (a portion of the surface layer protrudes into the active material layer) in an inner side of a surface of the active material layer (in a direction toward inside of the active material layer). Detailed description for "enter into" is provided later referring to FIG. 4.

"Metal hydroxide" is a collective term for a metal salt that includes one or more hydroxide ions (OH⁻) as anions. "Metal hydrate" is a collective term for a metal compound that includes one or more water molecules (H₂O). The metal compound that belongs to "metal hydroxide" described above is excluded from "metal hydrate".

According to an embodiment of the present application, there is provided a battery pack including: a secondary battery; a control section configured to control operation of the secondary battery; and a switch section configured to switch the operation of the secondary battery according to an instruction of the control section. The secondary battery includes: a cathode; an anode; an electrolytic solution; and an interlayer provided between the cathode and the anode and including one or more of a polyphosphate salt, a melamine salt, a melamine derivative represented by Formula (1), a metal hydroxide, and a metal hydrate, the interlayer partially entering into the cathode, the anode, or both.

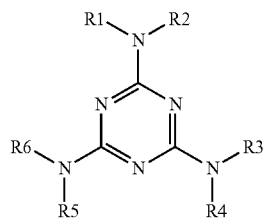

(1)

(R1 to R6 are each one of a hydrogen group (—H), a monovalent hydrocarbon group, a monovalent hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.)

According to an embodiment of the present application, there is provided an electric vehicle including: a secondary battery; a conversion section configured to convert electric power supplied from the secondary battery into drive power; a drive section configured to operate according to the drive power; and a control section configured to control operation of the secondary battery. The secondary battery includes: a cathode; an anode; an electrolytic solution; and an interlayer provided between the cathode and the anode and including one or more of a polyphosphate salt, a melamine salt, a melamine derivative represented by Formula (1), a metal hydroxide, and a metal hydrate, the interlayer partially entering into the cathode, the anode, or both.

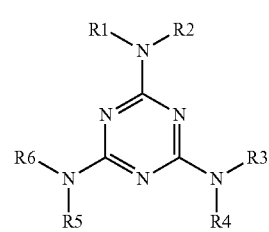

(1)

(R1 to R6 are each one of a hydrogen group (—H), a monovalent hydrocarbon group, a monovalent hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.)

According to an embodiment of the present application, there is provided an electric power storage system including: a secondary battery; one or more electric devices configured to be supplied with electric power from the secondary battery; and a control section configured to control the supplying of the electric power from the secondary battery to the one or more electric devices. The secondary battery includes: a cathode; an anode; an electrolytic solution; and an interlayer provided between the cathode and the anode and including one or more of a polyphosphate salt, a melamine salt, a melamine derivative represented by Formula (1), a metal hydroxide, and a metal hydrate, the interlayer partially entering into the cathode, the anode, or both.

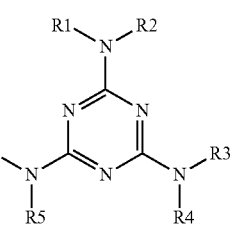

(1)

(R1 to R6 are each one of a hydrogen group (—H), a monovalent hydrocarbon group, a monovalent hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.)

According to an embodiment of the present application, there is provided an electric power tool including: a secondary battery; and a movable section configured to be supplied with electric power from the secondary battery. The secondary battery includes: a cathode; an anode; an electrolytic solution; and an interlayer provided between the cathode and the anode and including one or more of a polyphosphate salt, a melamine salt, a melamine derivative represented by Formula (1), a metal hydroxide, and a metal hydrate, the interlayer partially entering into the cathode, the anode, or both.

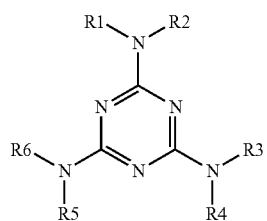

(1)

(R1 to R6 are each one of a hydrogen group (—H), a monovalent hydrocarbon group, a monovalent hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.)

According to an embodiment of the present application, there is provided an electronic apparatus including a secondary battery as an electric power supply source. The secondary battery includes: a cathode; an anode; an electrolytic solution; and an interlayer provided between the cathode and the anode and including one or more of a polyphosphate salt, a melamine salt, a melamine derivative represented by Formula (1), a metal hydroxide, and a metal hydrate, the interlayer partially entering into the cathode, the anode, or both.

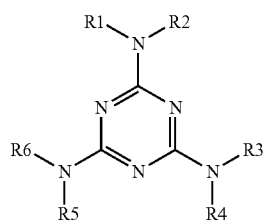

(1)

(R1 to R6 are each one of a hydrogen group (—H), a monovalent hydrocarbon group, a monovalent hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.)

According to the secondary battery of the embodiment of the present application, the interlayer that includes one or more of the polyphosphate salt and the like is provided between the cathode and the anode, and the interlayer partially enters into the cathode, the anode, or both. Accordingly, superior battery characteristics are achieved. Also, according to the electrode of the embodiment of the present application, the surface layer that includes one or more of the polyphosphate salt and the like is provided on the active material layer, and the surface layer partially enters into the active material layer. Accordingly, superior battery characteristics are achieved. Moreover, similar effects are achieved also in the battery pack, the electric vehicle, the electric power storage system, the electric power tool, and the electronic apparatus according to the embodiments of the present application.

It is to be noted that the effects of the present application are not limited to those described above, and may be any of the effects described in the present application.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Some embodiments of the present application are described below in detail with reference to the drawings. The description is provided in the following order.
1. First Secondary Battery (Square Type)
 1-1. Flame Retardant Layer Formed between Anode and Separator
 1-2. Flame Retardant Layer Formed between Cathode and Separator
 1-3. Flame Retardant Layer Formed between Anode and Separator and Flame Retardant Layer Formed between Cathode and Separator
 1-4. Separator Formed between Cathode and Anode (Separator Serving as Flame Retardant Layer)
2. Second Secondary Battery (Cylindrical Type)
 2-1. Flame Retardant Layer Formed between Anode and Separator
 2-2. Flame Retardant Layer Formed between Cathode and Separator
 2-3. Flame Retardant Layer Formed between Anode and Separator and Flame Retardant Layer Formed between Cathode and Separator
 2-4. Separator Formed between Cathode and Anode (Separator Serving as Flame Retardant Layer)
3. Third Secondary Battery (Laminated Film Type)
 3-1. Flame Retardant Layer Formed between Anode and Separator
 3-2. Flame Retardant Layer Formed between Cathode and Separator
 3-3. Flame Retardant Layer Formed between Anode and Separator and Flame Retardant Layer Formed between Cathode and Separator
 3-4. Electrolyte Layer Formed between Cathode and Anode (Electrolyte Layer Serving as Flame Retardant Layer)
4. Applications of Secondary Battery
 4-1. Battery Pack (Single Battery)
 4-2. Battery Pack (Assembled Battery)
 4-3. Electric Vehicle
 4-4. Electric Power Storage System
 4-5. Electric Power Tool
[1. First Secondary Battery (Square Type)]
[1-1. Flame Retardant Layer Formed between Anode and Separator]

First, a first secondary battery of an embodiment of the present application (hereinafter, simply referred to as "secondary battery" or "secondary battery of the embodiment of the present application") is described. It is to be noted that "electrode" of an embodiment of the present application is described below together.

[General Configuration of Secondary Battery]

Figure 1:
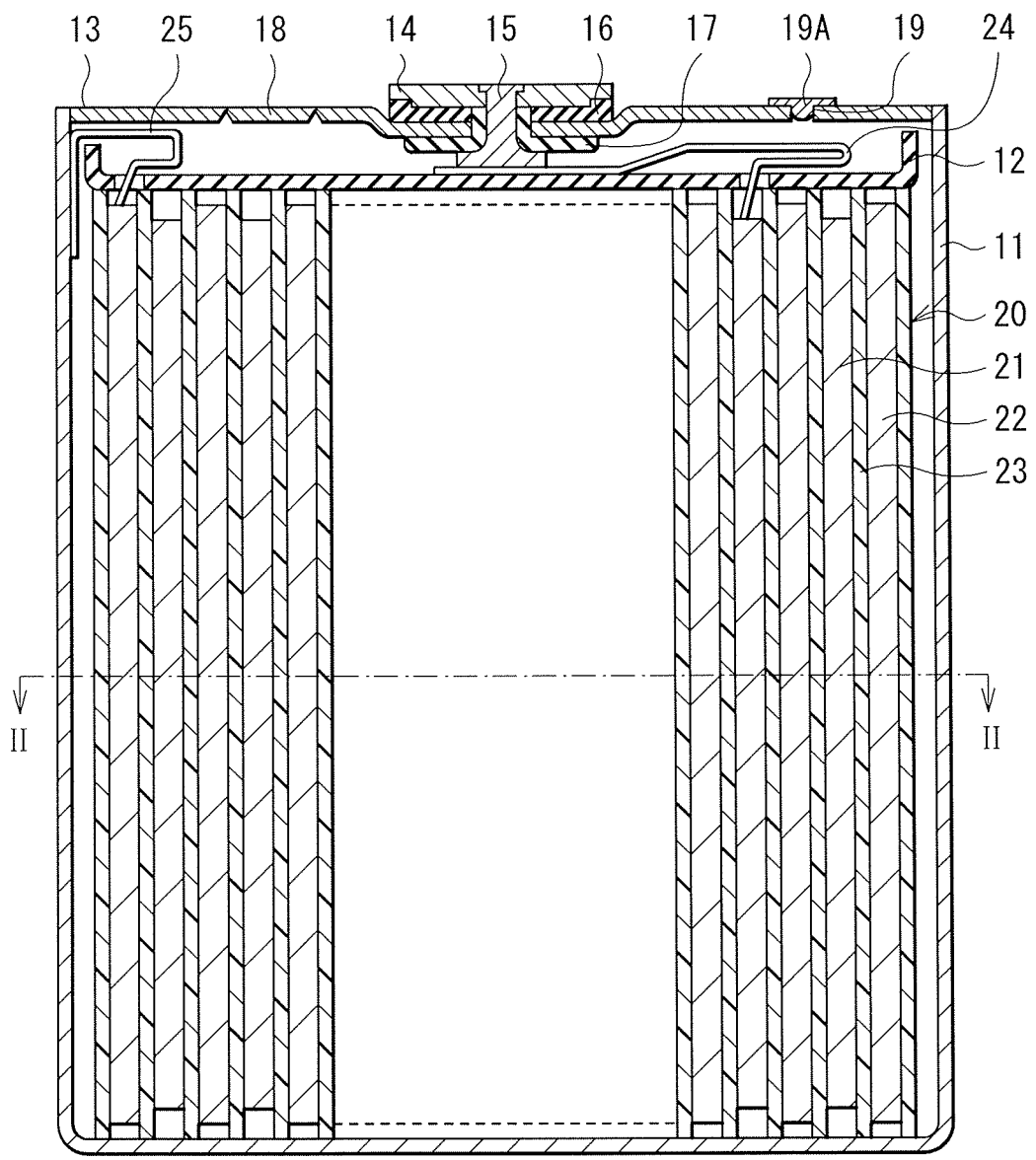
FIG. 1 is a cross-sectional view illustrating a configuration of a first secondary battery (of a square type) of an embodiment of the present application.
Figure 2:
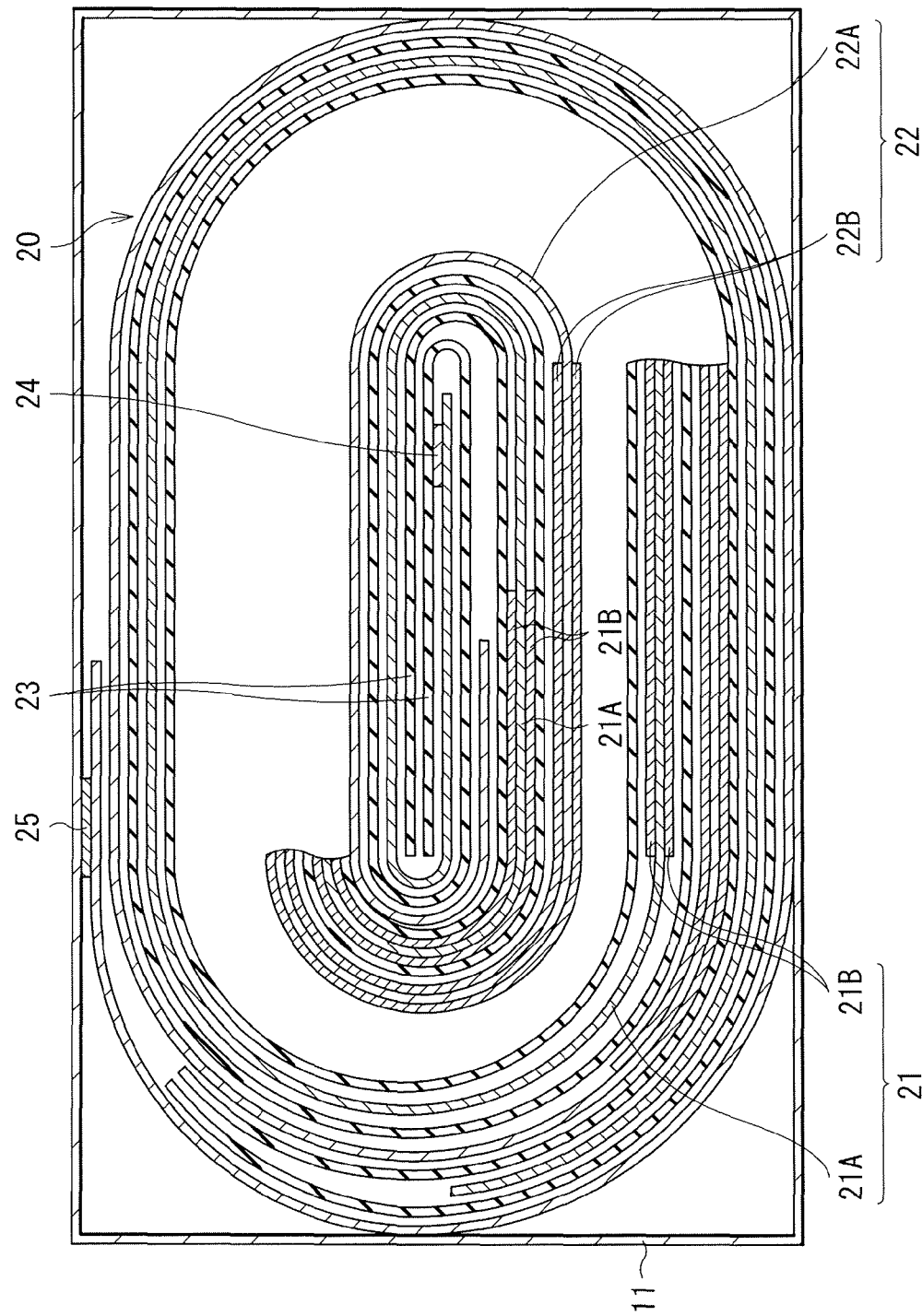
FIG. 2 is a cross-sectional view illustrating the configuration of the secondary battery taken along a line II-II shown in FIG. 1.
Figure 3:
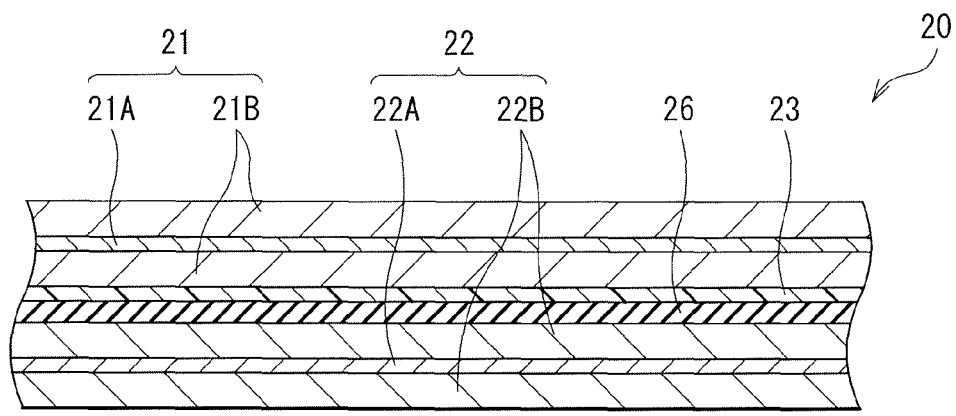
FIG. 3 is a cross-sectional view illustrating a detailed configuration of a battery device illustrated in FIG. 2.
Figure 4:
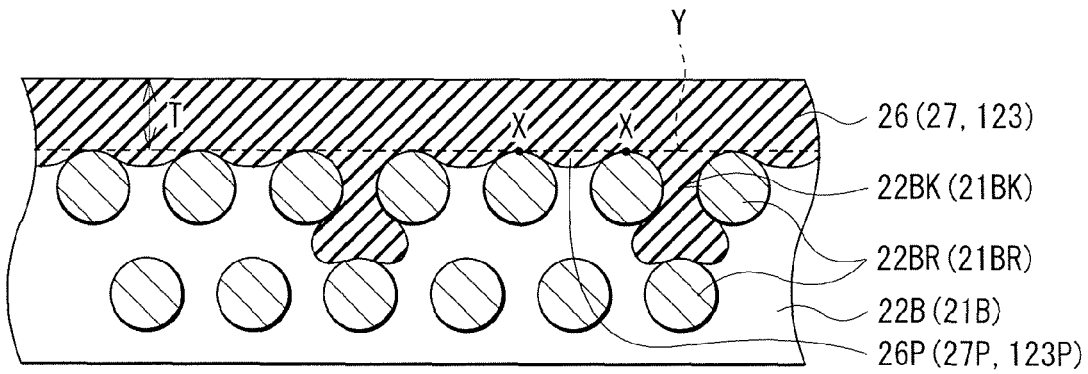
FIG. 4 is a cross-sectional view schematically illustrating part of the battery device illustrated in FIG. 3.
Figure 5:
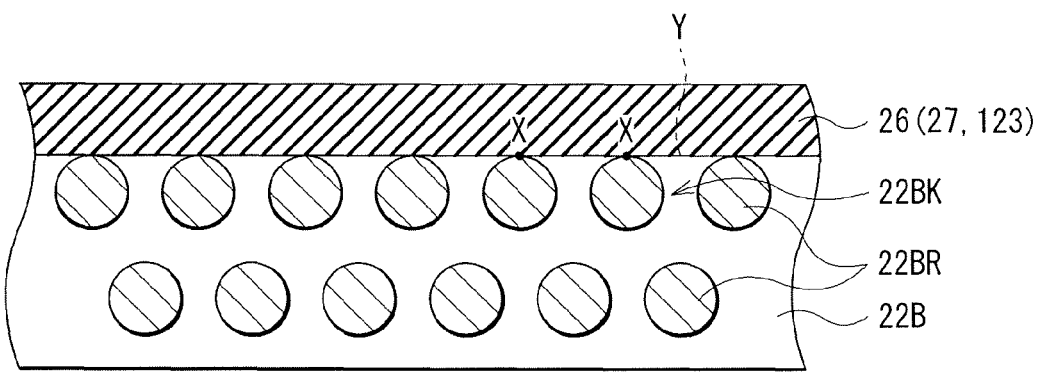
FIG. 5 is a cross-sectional view schematically illustrating a configuration of a battery device in a reference example.

FIG. 1 and FIG. 2 each illustrate a cross-sectional configuration of a secondary battery. FIG. 2 illustrates a cross-section taken along a line II-II shown in FIG. 1. FIG. 3 illustrates a detailed configuration of a battery device 20 illustrated in FIG. 2. FIG. 4 schematically illustrates part of the battery device 20 illustrated in FIG. 3. FIG. 5 schematically illustrates a configuration of the battery device 20 in a reference example, and corresponds to FIG. 4.

The secondary battery described here is a secondary battery in which battery capacity of an anode 22 is obtained by insertion and extraction of an electrode reactant, and has a so-called square-type battery structure.

"Electrode reactant" is a substance related to an electrode reaction, and may be, for example, lithium (Li) in a secondary battery (a lithium ion secondary battery) in which battery capacity is obtained by insertion and extraction of lithium. Description is provided below of a case where the secondary battery of the embodiment of the present application is a lithium ion secondary battery.

In this secondary battery, for example, as illustrated in FIGS. 1 and 2, the battery device 20 is contained inside a battery can 11. The battery device 20 is configured of a cathode 21 and the anode 22 that are laminated and spirally wound with a separator 23 and a flame retardant layer 26 in between. Also, the battery device 20 has a flat shape in accordance with the shape of the battery can 11. The battery device 20 is impregnated with electrolytic solution.

The battery can 11 is a square-type outer package member. As illustrated in FIG. 2, a cross-section of the square-type outer package member in a longitudinal direction has a rectangular shape or a substantially-rectangular shape (part of the shape includes a curve), but is not limited to the rectangular shape and may have an oval shape. Specifically, the square-type outer package member is a container-like member of a rectangular shape having a bottom or of an oval shape having a bottom that has a rectangular opening or a substantially-rectangular (oval) opening which is configured of arcs and straight lines connecting the arcs. It is to be noted that FIG. 2 illustrates a case in which the battery can 11 has the rectangular cross-sectional shape.

The battery can 11 may be made, for example, of one or more conductive materials such as iron (Fe), aluminum (Al), and alloys thereof. The battery can 11 may serve as an electrode terminal in some cases. In particular, iron that is harder than aluminum may be preferable in order to suppress swollenness of the battery can 11 by utilizing hardness (resistance to deformation) at the time of performing charge and discharge operations. When the battery can 11 is made of iron, a surface of the battery can 11 may be plated with a metal material such as nickel (Ni).

The battery can 11 may have a hollow structure in which one end of the battery can 11 is open and the other end thereof is closed. The battery can 11 is hermetically sealed with an insulating plate 12 and a battery cover 13 that are attached to one end (the open end) of the battery can 11. The insulating plate 12 is provided between the battery device 20 and the battery cover 13, and may be made, for example, of an insulating material such as polypropylene. The battery cover 13 may be made, for example, of a material similar to the material of the battery can 11. As with the battery can 11, the battery cover 13 may also serve as an electrode terminal.

A terminal plate 14 to be a cathode terminal is provided outside the battery cover 13. The terminal plate 14 is electrically insulated from the battery cover 13 with an insulating case 16 in between. The insulating case 16 may be made, for example, of an insulating material such as polybutylene terephthalate. A through hole is provided about the middle of the battery cover 13. A cathode pin 15 is inserted in the through hole. The cathode pin 15 is electrically connected to the terminal plate 14, and is electrically insulated from the battery cover 13 with a gasket 17 in between. The gasket 17 may be made, for example, of the insulating material. A surface of the gasket 17 may be coated, for example, with asphalt.

A cleavage valve 18 and an injection hole 19 are provided around a periphery of the battery cover 13. The cleavage valve 18 is electrically connected to the battery cover 13. The cleavage valve 18 is cut off from the battery cover 13 when an internal pressure of the secondary battery becomes a certain level or higher as a result of internal short circuit, heating from outside, or the like. Thus, the internal pressure is released. The injection hole 19 may be blocked, for example, by a sealing member 19A such as a stainless-steel ball.

A cathode lead 24 made of a conductive material such as aluminum is attached to an end (for example, an inner terminal end) of the cathode 21. An anode lead 25 made of a conductive material such as nickel is attached to an end (for example, an outer terminal end) of the anode 22. The cathode lead 24 is attached to one end of the cathode pin 15, and is electrically connected to the terminal plate 14. The anode lead 25 is attached to the battery can 11, and is electrically connected to the battery can 11.

[Cathode]

As illustrated in FIG. 3, the cathode 21 may have cathode active material layers 21B on both surfaces of a cathode current collector 21A, for example. However, the cathode 21 may have the cathode active material layer 21B only on one surface of the cathode current collector 21A.

The cathode current collector 21A may be made, for example, of one or more of conductive materials such as aluminum (Al), nickel (Ni), and stainless steel.

The cathode active material layer 21B contains, as a cathode active material, one or more of cathode materials capable of inserting and extracting lithium. It is to be noted that the cathode active material layer 21B may further contain one or more of other materials such as a cathode binder and a cathode electric conductor.

The cathode material may be preferably a lithium-containing compound, because high energy density is achieved thereby. Examples of the lithium-containing compound may include a lithium transition-metal composite oxide and a lithium transition-metal phosphate compound. The lithium transition-metal composite oxide is an oxide containing lithium and one or more transition metal elements as constituent elements. The lithium transition-metal phosphate compound is a phosphate compound containing lithium and one or more transition metal elements as constituent elements. In particular, the transition metal element may be preferably one or more of cobalt (Co), nickel (Ni), manganese (Mn), iron (Fe), and the like, because a higher voltage is achieved thereby. The chemical formula thereof may be expressed, for example, by $Li_xM1O_2$ or $Li_yM2PO_4$. In the formulas, M1 and M2 each represent one or more transition metal elements. Respective values of x and y vary according to the charge and discharge state, but may be generally in the range of $0.05 \le x \le 1.10$ and $0.05 \le y \le 1.10$.

Specific examples of the lithium transition-metal composite oxide may include $LiCoO_2$, $LiNiO_2$, and a lithium-nickel-based composite oxide represented by the following Formula (20). Specific examples of the lithium transition-metal phosphate compound may include $LiFePO_4$ and $LiFe_{1-u}Mn_uPO_4$ (u<1), because high battery capacity is thereby achieved and superior cycle characteristics are also achieved.

$$LiNi_{1-z}M_zO_2 \quad (20)$$

(M is one or more of cobalt (Co), manganese (Mn), iron (Fe), aluminum (Al), vanadium (V), tin (Sn), magnesium (Mg), titanium (Ti), strontium (Sr), calcium (Ca), zirconium (Zr), molybdenum (Mo), technetium (Tc), ruthenium (Ru), tantalum (Ta), tungsten (W), rhenium (Re), ytterbium (Yb), copper (Cu), zinc (Zn), barium (Ba), boron (B), chromium (Cr), silicon (Si), gallium (Ga), phosphorus (P), antimony (Sb), and niobium (Nb). z satisfies $0.005<z<0.5$.)

Other than the above-described materials, the cathode material may be, for example, one or more of an oxide, a disulfide, a chalcogenide, a conductive polymer, and the like. Examples of the oxide may include titanium oxide, vanadium oxide, and manganese dioxide. Examples of the disulfide may include titanium disulfide and molybdenum sulfide. Examples of the chalcogenide may include niobium selenide. Examples of the conductive polymer may include sulfur, polyaniline, and polythiophene. However, the cathode material may be a material other than the above-mentioned materials.

The cathode active material layer 21B includes a plurality of particulate cathode active materials (cathode active material particles). In accordance therewith, the cathode active material layer 21B may be formed, for example, by one or more of methods such as a coating method and a firing method (a sintering method). The coating method may be a method in which, for example, after a mixture of the cathode active material and a cathode binder, etc. is dispersed or dissolved in a solvent such as an organic solvent to obtain slurry, the slurry is applied onto the cathode current collector 21A. The firing method is a method in which, for example, after the slurry is applied onto the cathode current collector 21A by the coating method, a heat treatment is performed thereon at a temperature higher than a melting point of the cathode binder, etc. The firing method may be, for example, one or more of methods such as an atmosphere firing method, a reaction firing method, and a hot press firing method.

The cathode binder may include, for example, one or more of synthetic rubbers, polymer compounds, and the like. Examples of the synthetic rubber may include styrenebutadiene-based rubber, fluorine-based rubber, and ethylene propylene diene. Examples of the polymer compound may include polyvinylidene fluoride, polyacrylate, and polyimide.

Examples of the cathode electric conductor may include one or more of carbon materials and the like. Examples of the carbon material may include graphite, carbon black, acetylene black, and Ketjen black. The cathode electric conductor may be a metal material, a conductive polymer, or the like as long as the material has electric conductivity.

[Anode]

As illustrated in FIG. 3, the anode 22 may have, anode active material layer 22B on both surfaces of an anode current collector 22A, for example. However, the anode 22 may have the anode active material layer 22B only on one surface of the anode current collector 22A.

The anode current collector 22A may be made, for example, of one or more of conductive materials such as copper (Cu), nickel (Ni), and stainless steel. The surface of the anode current collector 22A may be preferably roughened. Thereby, due to a so-called anchor effect, close-attachment characteristics of the anode active material layer 22B with respect to the anode current collector 22A are improved. In this case, it is enough that the surface of the anode current collector 22A in a region opposed to the anode active material layer 22B is roughened at minimum. Examples of the roughening method may include a method of forming fine particles by utilizing an electrolytic treatment. The electrolytic treatment is a method of forming the fine particles on the surface of the anode current collector 22A with the use of an electrolytic method in an electrolytic bath to provide concavities and convexities on the surface of the anode current collector 22A. A copper foil fabricated by an electrolytic method is generally called "electrolytic copper foil."

The anode active material layer 22B contains, as anode active materials, one or more of anode materials capable of inserting and extracting lithium. However, the anode active material layer 22B may further contain one or more of other materials such as an anode binder and an anode electric conductor. The details of the anode binder and the anode electric conductor may be, for example, similar to the details of the cathode binder and the cathode electric conductor.

However, the chargeable capacity of the anode material may be preferably larger than the discharge capacity of the cathode 21 in order to prevent lithium metal from being unintentionally precipitated on the anode 22 in the middle of the charge operation. Specifically, the electrochemical equivalent of the anode material capable of inserting and extracting lithium may be preferably larger than the electrochemical equivalent of the cathode 21.

The anode material may be, for example, one or more of carbon materials, because, in the carbon material, its crystal structure change at the time of insertion and extraction of lithium is extremely small, and high energy density and superior cycle characteristics are achieved. Another reason is because the carbon material serves as an anode electric conductor as well. Examples of the carbon material may include graphitizable carbon, non-graphitizable carbon, and graphite. However, the spacing of (002) plane in the non-graphitizable carbon may be preferably equal to or greater than 0.37 nm, and the spacing of (002) plane in graphite may be preferably equal to or smaller than 0.34 nm. More specifically, examples of the carbon material may include pyrolytic carbons, cokes, glassy carbon fiber, an organic polymer compound fired body, activated carbon, and carbon blacks. Examples of the cokes may include pitch coke, needle coke, and petroleum coke. The organic polymer compound fired body is obtained by firing (carbonizing) a polymer compound such as phenol resin and furan resin at appropriate temperature. In addition thereto, the carbon material may be low crystalline carbon heat-treated at temperature of about 1000 deg C. or lower, or may be amorphous carbon. It is to be noted that the shape of the carbon material may be any of a fibrous shape, a spherical shape, a granular shape, and a scale-like shape.

Moreover, the anode material may be, for example, a material (a metal-based material) containing one or more of metal elements and metalloid elements as constituent elements, because high energy density is thereby achieved. The metal-based material may be a simple substance, alloy, or a compound, may be two or more thereof, or may have one or more phases thereof in part or all thereof. "Alloy" includes alloy containing one or more metal elements and one or more metalloid elements, in addition to alloy configured of two or more metal elements. Further, "alloy" may contain a nonmetallic element. Examples of the structure thereof may include a solid solution, a eutectic crystal (eutectic mixture), an intermetallic compound, and a structure in which two or more thereof coexist.

Examples of the foregoing metal elements and the foregoing metalloid elements may include one or more of metal elements and metalloid elements capable of forming alloy with lithium. Specific examples thereof may include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). In particular, silicon, tin, or both may be preferable, because silicon and tin have superior ability of inserting and extracting lithium, and therefore achieve high energy density.

A material containing silicon, tin, or both as constituent elements may be any of a simple substance, alloy, and a compound of silicon, may be any of a simple substance, alloy, and a compound of tin, may be two or more thereof, or may have one or more phases thereof in part or all thereof. It is to be noted that "simple substance" described herein merely refers to a simple substance in a general sense (a small amount of impurity may be therein contained), and does not necessarily refer to a purity 100% simple substance.

The alloys of silicon may contain, for example, one or more of elements such as tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr), as a constituent element other than silicon. The compounds of silicon may contain, for example, one or more of carbon (C), oxygen (O), and the like as constituent elements other than silicon. It is to be noted that the compounds of silicon may contain, for example, one or more of the elements described above for the alloys of silicon, as constituent elements other than silicon.

Specific examples of the alloys of silicon and the compounds of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and $LiSiO$. v in $SiO_v$ may be in a range of $0.2<v<1.4$.

The alloys of tin may contain, for example, one or more of elements such as silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr), as constituent elements other than tin. The compounds of tin may contain, for example, one or more of elements such as carbon and oxygen as constituent elements other than tin. It is to be noted that the compounds of tin may contain, for example, one or more of the elements described above for the alloys of tin, as constituent elements other than tin.

Specific examples of the alloys of tin and the compounds of tin may include $SnO_w (0<w\leq2)$, $SnSiO_3$, LiSnO, and $Mg_2Sn$.

In particular, the material containing tin as a constituent element may be preferably, for example, a material containing a second constituent element and a third constituent element in addition to tin (a first constituent element). The second constituent element may include, for example, one or more of elements such as cobalt, iron, magnesium, titanium, vanadium (V), chromium, manganese, nickel, copper, zinc, gallium (Ga), zirconium, niobium (Nb), molybdenum (Mo), silver, indium, cesium (Ce), hafnium (Hf), tantalum (Ta), tungsten (W), bismuth, and silicon. The third constituent element may include, for example, one or more of elements such as boron, carbon, aluminum, and phosphorus (P). One reason for this is because high battery capacity, superior cycle characteristics, and the like are achieved by containing the second and third constituent elements.

In particular, a material (an SnCoC-containing material) containing tin, cobalt, and carbon as constituent elements may be preferable. In the SnCoC-containing material, for example, the content of carbon may be from about 9.9 mass % to about 29.7 mass % both inclusive, and the ratio of contents of tin and cobalt (Co/(Sn+Co)) may be from about 20 mass % to about 70 mass % both inclusive, because high energy density is achieved thereby.

The SnCoC-containing material may preferably have a phase containing tin, cobalt, and carbon. Such a phase may be preferably low-crystalline or amorphous. The phase is a reaction phase capable of reacting with the electrode reactant. Therefore, due to existence of the reaction phase, superior characteristics are achieved. A half bandwidth (a diffraction angle 2θ) of a diffraction peak obtained by X-ray diffraction of the reaction phase may be preferably equal to or larger than 1 deg in a case where CuKα ray is used as a specific X ray, and the insertion rate is 1 deg/min. One reason for this is because the electrode reactant is more smoothly inserted and extracted thereby, and reactivity with the electrolytic solution is decreased. It is to be noted that, in some cases, the SnCoC-containing material may include a phase containing a simple substance or part of the respective constituent elements in addition to the low-crystalline phase or the amorphous phase.

Whether or not the diffraction peak obtained by the X-ray diffraction corresponds to the reaction phase capable of reacting with the electrode reactant is allowed to be easily determined by comparison between X-ray diffraction charts before and after electrochemical reaction with the electrode reactant. For example, if the position of the diffraction peak after electrochemical reaction with the electrode reactant is changed from the position of the diffraction peak before the electrochemical reaction with the electrode reactant, the obtained diffraction peak corresponds to the reaction phase capable of reacting with the electrode reactant. In this case, for example, the diffraction peak of the low crystalline reaction phase or the amorphous reaction phase is seen in a range of 2θ=from about 20 deg to about 50 deg both inclusive. Such a reaction phase may include, for example, the foregoing respective constituent elements, and it may be considered that the low crystalline or amorphous structure thereof may result mainly from the existence of carbon.

In the SnCoC-containing material, part or all of carbon as a constituent element may be preferably bonded to a metal element or a metalloid element as other constituent element, because cohesion or crystallization of tin and/or the like is suppressed thereby. The bonding state of elements is allowed to be checked, for example, by XPS. In a commercially-available device, for example, Al—Kα ray, Mg—Kα ray, or the like may be used as a soft X ray. In the case where part or all of carbons are bonded to a metal element, a metalloid element, or the like, the peak of a synthetic wave of 1s orbit of carbon (C1s) appears in a region lower than 284.5 eV. It is to be noted that energy calibration is made so that the peak of 4f orbit (Au4f) of gold atom is obtained in 84.0 eV. At this time, in general, because surface contamination carbon exists on the material surface, the peak of C1s of the surface contamination carbon is regarded as 284.8 eV, which is used as the energy reference. In XPS measurement, the waveform of the peak of C1s is obtained as a form including the peak of the surface contamination carbon and the peak of carbon in the SnCoC-containing material. Therefore, for example, analysis may be made with the use of commercially-available software to isolate both peaks from each other. In the waveform analysis, the position of the main peak existing on the lowest bound energy side is considered the energy reference (284.8 eV).

The SnCoC-containing material is not limited to the material (SnCoC) configured of only tin, cobalt, and carbon as constituent elements. The SnCoC-containing material may further contain, for example, one or more of silicon, iron, nickel, chromium, indium, niobium, germanium, titanium, molybdenum, aluminum, phosphorus, gallium, bismuth, and the like as constituent elements, in addition to tin, cobalt, and carbon.

Other than the SnCoC-containing material, a material (an SnCoFeC-containing material) containing tin, cobalt, iron, and carbon as constituent elements may be also preferable. The SnCoFeC-containing material may have any composition. To give an example, when the content of iron is set small, the content of carbon may be from about 9.9 mass % to about 29.7 mass % both inclusive, the content of iron may be from about 0.3 mass % to about 5.9 mass % both inclusive, and the ratio of contents of tin and cobalt (Co/(Sn+Co)) may be from about 30 mass % to about 70 mass % both inclusive. Alternatively, when the content of iron is set larger, the content of carbon is from about 11.9 mass % to about 29.7 mass % both inclusive, the ratio of contents of tin, cobalt, and iron ((Co+Fe)/(Sn+Co+Fe)) is from about 26.4 mass % to about 48.5 mass % both inclusive, and the ratio of contents of cobalt and iron (Co/(Co+Fe)) is from about 9.9 mass % to about 79.5 mass % both inclusive. One reason for this is because, in such a composition range, high energy density is achieved. The physical characteristics (such as a half bandwidth) of the SnCoFeC-containing material are similar to those of the SnCoC-containing material described above.

Other than the above-mentioned materials, the anode material may be, for example, one or more of metal oxide, a polymer compound, and the like. Examples of the metal oxide may include iron oxide, ruthenium oxide, and molybdenum oxide. Examples of the polymer compound may include polyacetylene, polyaniline, and polypyrrole.

The anode active material layer 22B includes a plurality of particulate anode active materials (anode active material particles). In accordance therewith, the cathode active material layer 22B may be formed, for example, by one or more of methods such as a coating method and a firing method (a sintering method).

In the secondary battery, as described above, in order to prevent lithium metal from being unintentionally precipitated on the anode 22 in the middle of charge operation, the electrochemical equivalent of the anode material capable of inserting and extracting lithium may be preferably larger than the electrochemical equivalent of the cathode. Further, in the case where the open circuit voltage (that is, a battery voltage) at the time of completely-charged state is equal to or greater than 4.25 V, the extraction amount of lithium per unit mass is larger than that in the case where the open circuit voltage is 4.20 V even if the same cathode active material is used. Accordingly, amounts of the cathode active material and the anode active material are adjusted in order to achieve high energy density.

[Separator]

The separator 23 separates the cathode 21 from the anode 22, and passes lithium ions while preventing current short circuit resulting from contact of both electrodes. The separator 23 may be, for example, a porous film made of synthetic resin, ceramics, or the like. The separator 23 may be a laminated film in which two or more of porous films are laminated. Examples of the synthetic resin may include polytetrafluoroethylene, polypropylene, and polyethylene.

In particular, the separator 23 may include, for example, a polymer compound layer provided on one surface or both surfaces of the above-described porous film (the base material layer). One reason for this is because, thereby, close attachment characteristics of the separator 23 with respect to the cathode 21 and the anode 22 are improved, and therefore, skewness of the battery device 20 is suppressed. Thereby, a decomposition reaction of the electrolytic solution is suppressed, and liquid leakage of the electrolytic solution with which the base material layer is impregnated is suppressed. Accordingly, even if charge and discharge operations are performed repeatedly, resistance is less likely to be increased, and battery is less likely to be swollen.

The polymer compound layer may contain, for example, a polymer compound such as polyvinylidene fluoride, because such a polymer compound has superior physical strength and is electrochemically stable. However, the polymer compound may be a compound other than polyvinylidene fluoride. The polymer compound layer may be formed as follows, for example. That is, after solution in which the polymer compound is dispersed or dissolved is prepared, the base material layer is coated with the solution. Alternatively, the base material layer may be dipped in the solution and may be subsequently dried.

[Electrolytic Solution]

The electrolytic solution with which the battery device 20 is impregnated includes a solvent and an electrolyte salt. The electrolytic solution may further include one or more of other materials such as an additive.

The solvent includes one or more of non-aqueous solvents such as an organic solvent. The electrolytic solution that includes the non-aqueous solvent is a so-called non-aqueous electrolytic solution.

Examples of the non-aqueous solvent may include cyclic ester carbonate, chain ester carbonate, lactone, chain carboxylic ester, and nitrile, because superior battery capacity, superior cycle characteristics, superior conservation characteristics, etc. are achieved thereby. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methyl propyl carbonate. Examples of the lactone may include γ-butyrolactone and γ-valerolactone. Examples of the chain carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

Moreover, examples of the non-aqueous solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N, N-dimethylformamide, N-methylpyrrolidone, N-methyloxazolidinone, N,N'-dimethylimidazolidinone, nitromethane, nitroethane, sulfolane, trimethyl phosphate, and dimethylsulfoxide, because a similar advantage is achieved thereby.

In particular, one or more of ethylene carbonate, propylene carbonate, dimethyl carbonate, diethyl carbonate, and ethyl methyl carbonate may be preferable, because further superior battery capacity, further superior cycle characteristics, further superior conservation characteristics, etc. are achieved thereby. In this case, a combination of a high viscosity (high dielectric constant) solvent (for example, specific dielectric constant $\in \geq 30$) such as ethylene carbonate or propylene carbonate and a low viscosity solvent (for example, viscosity≥1 mPa·s) such as dimethyl carbonate, ethyl methyl carbonate, or diethyl carbonate may be more preferable. One reason for this is because the dissociation characteristics of the electrolyte salt and ion mobility are thereby improved.

In particular, the solvent may contain one or more of unsaturated cyclic ester carbonate, halogenated ester carbonate, sultone (cyclic sulfonic ester), acid anhydride, and the like. One reason for this is that, in this case, chemical stability of the electrolytic solution is improved. The unsaturated cyclic ester carbonate is cyclic ester carbonate including one or more unsaturated carbon bonds (carbon-carbon double bonds). Examples of the unsaturated cyclic ester carbonate may include vinylene carbonate, vinylethylene carbonate, and methyleneethylene carbonate. The halogenated ester carbonate is cyclic or chain ester carbonate having one or more halogens as constituent elements. Examples of the cyclic halogenated ester carbonate may include 4-fluoro-1,3-dioxolane-2-one and 4,5-difluoro-1,3-dioxolane-2-one. Examples of the chain halogenated ester carbonate may include fluoromethyl methyl carbonate, bis (fluoromethyl) carbonate, and difluoromethyl methyl carbonate. Examples of the sultone may include propane sultone and propene sultone. Examples of the acid anhydride may include succinic anhydride, ethane disulfonic anhydride, and sulfobenzoic anhydride. However, the solvent is not limited to the foregoing material, and may be other material.

The electrolyte salt may contain, for example, one or more of salts such as lithium salt. However, the electrolyte salt may contain, for example, salt other than the lithium salt. Examples of "salt other than the lithium salt" may include light metal salt other than lithium salt.

Examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr), because superior battery capacity, superior cycle characteristics, superior conservation characteristics, and the like are thereby achieved.

In particular, one or more of $LiPF_6$, $LiBF_4$, $LiClO_4$, and $LiAsF_6$ may be preferable, and $LiPF_6$ may be more preferable, because the internal resistance is thereby lowered, and a higher effect is achieved. However, the electrolyte salt may be other salt other than those mentioned above.

A content of the electrolyte salt is not particularly limited, but in particular, may be preferably from about 0.3 mol/kg to about 3.0 mol/kg both inclusive with respect to the solvent, because high ion conductivity is achieved thereby.

[Flame Retardant Layer]

The flame retardant layer 26 that is an interlayer is provided between the cathode 21 and the anode 22. The flame retardant layer 26 partially enters into the cathode 21, the anode 22, or both.

In this example, for example, as illustrated in FIG. 3, the separator 23 is provided between the cathode 21 and the anode 22, and the flame retardant layer 26 is provided between the separator 23 and the anode 22. In accordance therewith, the wording "the flame retardant layer 26 partially enters into the anode 22" (or "a portion of the flame retardant layer 26 enters into the anode 22") refers to that a portion of the flame retardant layer 26 is present in an inner side of the surface of the anode 22 (in a direction toward inside of the anode 22). The wording "enter into" is described in detail later (see FIG. 4).

In other words, in the anode 22 that is a specific but not limitative example of the electrode of the present application, the flame retardant layer 26 that is a surface layer is provided on the anode active material layer 22B that is an active material layer, and that a portion of the flame retardant layer 26 enters into the anode active material layer 22B.

The flame retardant layer 26 is formed to cover the surface of the anode 22 (the anode active material layer 22B). However, the flame retardant layer 26 may cover only part of the surface of the anode 22, or may cover the entire surface of the anode 22. In the former case, a plurality of flame retardant layers 26 may be present on the surface of the anode 22. It is to be noted that the flame retardant layer 26 may be configured of a single layer or multiple layers.

The flame retardant layer 26 includes one or more of flame retardant materials. More specifically, the flame retardant layer 26 includes one or more of a polyphosphate salt, a melamine salt, a melamine derivative represented by the following Formula (1) (hereinafter, simply referred to as "melamine derivative"), a metal hydroxide, and a metal hydrate.

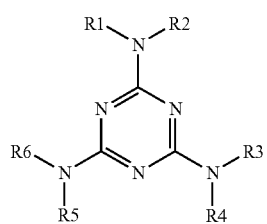

(1)

(R1 to R6 are each one of a hydrogen group, a monovalent hydrocarbon group, a monovalent hydroxyl-group-containing hydrocarbon group, a monovalent group obtained by bonding one or more monovalent hydrocarbon groups and one or more oxygen bonds, a monovalent group obtained by bonding one or more monovalent hydroxyl-group-containing hydrocarbon groups and one or more oxygen bonds, and a monovalent group obtained by bonding two or more thereof.)

One reason why the flame retardant layer 26 including the flame retardant material is provided between the cathode 21 and the anode 22 is because, due to the flame retardant material, occurrence of abnormal incidents such as thermal runaway are suppressed without inhibiting movement of lithium ions even when the secondary battery is exposed in a high temperature environment. Accordingly, the discharge capacity is made less likely to be decreased even charge and discharge operations are performed repeatedly, and defects such as ignition or explosion of the secondary battery are made less likely to occur. Consequently, discharge capacity characteristics, cycle characteristics, etc. are secured and superior safety is also achieved.

The polyphosphate salt may be, for example, one or more of ammonium polyphosphate, magnesium polyphosphate, barium polyphosphate, zinc polyphosphate, nickel polyphosphate, aluminum polyphosphate, and melamine polyphosphate. The melamine polyphosphate is included in the polyphosphate salt, and is excluded from the melamine salt and the melamine derivative. However, a salt other than those described above may be used as long as the salt is a salt of polyphosphate.

The melamine salt may be, for example, one or more of melamine cyanurate, melamine sulfate, etc. However, a salt other than those described above may be used as long as the salt is a salt of melamine.

In Formula (1) related to the melamine derivative, the kind of each of R1 to R6 is not particularly limited as long as the kind thereof is one of the hydrogen group, etc. described above. It is to be noted that the respective R1 to R6 may be the same kind or may be different kinds. Further, part of R1 to R6 may be the same kind. One reason for this is because the above-described advantage is achieved without depending on the kind of each of R1 to R6 by causing the melamine derivative to have a melamine-type skeleton shown in Formula (1). The melamine derivative also includes melamine (when all of R1 to R6 are hydrogen groups).

"Monovalent hydrocarbon group" is a collective term of a monovalent group that is configured of carbon (C) and hydrogen (H). The monovalent hydrocarbon group may be linear or may be branched to have one or more side chains. Further, the monovalent hydrocarbon group may be a saturated hydrocarbon group, or may be an unsaturated hydrocarbon group. It is to be noted that the carbon number is not particularly limited.

In particular, the monovalent hydrocarbon group may be preferably an alkyl group. More specifically, the monovalent hydrocarbon group may be preferably an alkyl group having carbon number from 1 to 5 both inclusive. One reason for this is because, since the carbon number is not excessively large, compatibility of the melamine derivative, etc. are secured thereby. Specific examples thereof may include a methyl group ($—CH_3$), an ethyl group ($—C_2H_5$), a propyl group ($—C_3H_7$), a butyl group ($—C_4H_9$), and a pentyl group ($—C_5H_{11}$).

"Monovalent hydroxyl-group-containing hydrocarbon group" is a monovalent group obtained by bonding the above-described monovalent hydrocarbon group and a hydroxyl group ($—OH$).

In particular, the monovalent hydroxyl-group-containing hydrocarbon group may be preferably a hydroxyalkyl group. More specifically, the monovalent hydroxyl-group-containing hydrocarbon group may be preferably a hydroxyalkyl group having carbon number from 1 to 5 both inclusive. One reason for this is because, since the carbon number is not excessively large, compatibility of the melamine derivative, etc. are secured thereby. Specific examples thereof may include —CH$_2$—OH, —C$_2$H$_4$—OH, —C$_3$H$_6$—OH, —C$_4$H$_8$—OH, and —C$_5$H$_{10}$—OH.

"Monovalent group obtained by bonding one or more monovalent hydrocarbon groups and one or more oxygen bonds" (hereinafter, referred to as "first bonding group") is a group in which one or more oxygen bonds are introduced in mid-course of the above-described monovalent hydrocarbon group.

In particular, the first bonding group may be preferably a group in which one or more oxygen bonds are introduced in mid-course of the alkyl group having carbon number from 1 to 5 both inclusive. One reason for this is because, since the carbon number is not excessively large, compatibility of the melamine derivative, etc. are secured thereby. Specific examples thereof may include —CH$_2$—O—CH$_3$, —C$_2$H$_4$—O—CH$_3$, —C$_3$H$_7$—O—CH$_3$, —C$_4$H$_8$—O—CH$_3$, —CH$_2$—O—C$_2$H$_5$, —CH$_2$—O—C$_3$H$_7$, and —CH$_2$—O—C$_4$H$_9$.

"Monovalent group obtained by bonding one or more monovalent hydroxyl-group-containing hydrocarbon groups and one or more oxygen bonds" (hereinafter, referred to as "second bonding group") is a group in which one or more oxygen bonds are introduced in mid-course of the above-described monovalent hydroxyl-group-containing hydrocarbon group.

In particular, the second bonding group may be preferably a group in which one or more oxygen bonds are introduced into mid-course of the hydroxyalkyl group having carbon number from 1 to 5 both inclusive. One reason for this is because, since the carbon number is not excessively large, compatibility of the melamine derivative, etc. are secured thereby. Specific examples thereof may include —CH$_2$—O—CH$_2$—OH, —C$_2$H$_4$—O—CH$_2$—OH, —C$_3$H$_6$—O—CH$_2$—OH, —C$_4$H$_8$—O—CH$_2$—OH, —CH$_2$—O—C$_2$H$_4$—OH, —CH$_2$—O—C$_3$H$_6$—OH, and —CH$_2$—O—C$_4$H$_8$—OH.

Specific examples of the melamine derivative include one or more of melamine compounds represented by respective Formulas (1-1) to (1-4). However, a derivative other than those described above may be used as long as the derivative is a derivative of melamine.

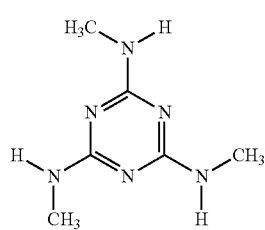

(1-1)

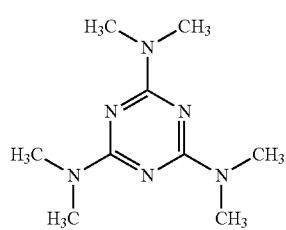

(1-2)

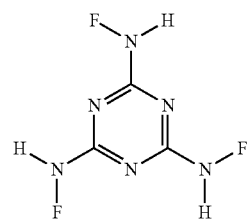

(1-3)

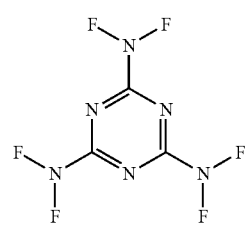

(1-4)

"Metal hydroxide" is a collective term of a metal salt that includes one or more hydroxide ions (OH) as anions as described above. The kind of cation is not particularly limited as long as the kind of the cation is one or more metal ions. However, hydrates of metal oxides that have homologous composition formulas are included in "metal hydroxide" described above.

Specific examples of the metal hydroxide may be one or more of aluminum hydroxide (Al(OH)$_3$), magnesium hydroxide (Mg(OH)$_2$), talc (Mg$_3$Si$_4$O$_{10}$(OH)$_2$), imogolite (Al$_2$SiO$_3$(OH)) and the like. However, a metal compound other than those described above may be used as long as the metal compound is a metal hydroxide.

"Metal hydrate" is a collective term of a metal compound that includes one or more water molecules (H$_2$O) as described above. The kind of the metal compound is not particularly limited as long as the kind thereof is a compound that includes one or more metal elements as constituent elements. However, in order to avoid confusion between "metal hydroxide" and "metal hydrate", the metal compound that belongs to "metal hydroxide" described above is excluded from "metal hydrate" described above.

Specific examples of the metal hydrate may be one or more of boehmite (Al$_2$O$_3$.H$_2$O), hydrotalcite (Mg$_6$Al$_2$(CO$_3$)(OH)$_{16}$.4H$_2$O), sepiolite (Mg$_9$Si$_{12}$O$_{30}$(OH)$_6$(OH$_2$)$_4$.6H$_2$O), sericite (K$_2$O.3Al$_2$O$_3$.6SiO$_2$.2H$_2$O), saponite ((Ca/2, Na)$_{0.33}$(Mg, Fe$^{2+}$)$_3$(Si, Al)$_4$O$_{10}$(OH)$_2$.4H$_2$O), attapulgite ((Mg, Al)$_2$Si$_4$O$_{10}$(OH).6H$_2$O), and montmorillonite ((Na, Ca)$_{0.33}$(Al, Mg)$_2$Si$_4$O$_{10}$(OH)$_2$.nH$_2$O, where n is an integer of 1 or larger). However, a hydrate of a metal compound other than those described above may be used as long as the hydrate is a metal hydrate.

It is to be noted that when the flame retardant material is in a form of powder (in a form of a plurality of particles), an average particle size (a median size D50) of the flame retardant material is not particularly limited. In particular, the average particle size may be preferably from 0.1 μm to 10 μm both inclusive. One reason for this is because occurrence of abnormal incidents such as thermal runaway may become difficult to be suppressed when the average particle size is excessively small, and on the other hand, a gap between the particles of the flame retardant material becomes small and therefore the lithium ion becomes difficult to pass through the flame retardant layer 26 when the average particle size is excessively large.

In particular, the flame retardant layer 26 not merely covers the surface of the anode 22 (the anode active material layer 22B), but a portion of the flame retardant layer 26 enters into the inside of the anode 22 (the anode active material layer 22B) as described above.

In detail, as illustrated in FIG. 4, a plurality of particulate anode active materials 22BR are present inside the anode active material layer 22B, and a gap 22BK is formed between adjacent anode active materials 22BR. The flame retardant layer 26 covers the surface of the anode active material layer 22B. Also, a portion (an entering portion 26P) of the flame retardant layer 26 enters into the anode active material layer 22B. Specifically, when a surface position Y of the anode active material layer 22B defined by connecting vertexes X of two or more anode active materials 22BR is used as a reference, the entering portion 26P is present in an er side of the anode active material layer 22B (in a direction toward the inside of the anode active material layer 22B) compared to the surface position Y. In FIG. 4, the surface position Y is illustrated with a dashed line.

It is to be noted that FIG. 4 schematically illustrates the configuration of each of the anode active material layer 22B and the flame retardant layer 26 in order to simplify the content of the illustration. The configuration of the anode active material layer 22B, more specifically, the number, an arrangement state, etc. of the plurality of anode active materials 22BR illustrated in FIG. 4 are therefore mere examples. Also, illustration of components (such as the anode binder) other than the anode active materials 22BR is omitted in FIG. 4.

In order to examine whether or not a portion of the flame retardant layer 26 enters into the anode active material layer 22B, for example, cross-sections of the anode 22 and the flame retardant layer 26 may be observed with use of a microscope such as a scanning electron microscope (SEM). Presence of the flame retardant layer 26 in a lower side of the surface position Y (in a direction toward the inside of the anode active material layer 22B) in a photograph taken by the microscope shows that a portion (the entering portion 26P) of the flame retardant layer 26 enters into the inside of the anode active material layer 22B.

Some reasons why a portion of the flame retardant layer 26 enters into the anode active material layer 22B may be as follows.

In a case where a coating method, a pressurization method, or the like described later is not used as a method of forming the flame retardant layer 26, as illustrated in FIG. 5, the flame retardant layer 26 is merely adjacent to the surface of the anode active material layer 22B. In this case, because the flame retardant layer 26 merely covers the surface of the anode active material layer 22B, no portion of the flame retardant layer 26 enters into the inside of the anode active material layer 22B. The flame retardant material is therefore not allowed to be present near the highly-active anode active material 22BR that is a cause of occurrence of abnormal incidents such as thermal runaway. Accordingly, it is difficult for the flame retardant material to sufficiently suppress occurrence of abnormal incidents. Moreover, when close attachment characteristics of the flame retardant layer 26 with respect to the anode active material layer 22B is insufficient, the flame retardant layer 26 becomes easier to fall off from the anode active material layer 22B under an influence of a stress caused in the anode active material layer 22B at the time of charge and discharge operations.

On the other hand, in a case where the coating method, pressurization method, etc. are used as the method of forming the flame retardant layer 26, as illustrated in FIG. 4, a portion (the entering portion 26P) of the flame retardant layer 26 enters into the inside of the anode active material layer 22B. Thus, a portion of the flame retardant material enters into the inside of the anode active material layer 22B. In this case, the flame retardant material is allowed to be present near the highly-active anode active material 22BR. Accordingly, it is possible for the flame retardant layer to sufficiently suppress occurrence of the abnormal incidents. In addition thereto, the close attachment characteristics of the flame retardant layer 26 with respect to the anode active material layer 22B is remarkably improved due to an anchor effect, the flame retardant layer 26 becomes less likely to fall off from the anode active material layer 22B even under the influence of the stress caused at the time of charge and discharge operations. Consequently, the abnormal incidents such as thermal runaway are stably suppressed, which further improves safety.

A distance (a depth) of the entering portion 26P that enters into the inside of the anode active material layer 22B, in other words, how far the entering portion 26P enters into the inside of the anode active material layer 22B is not particularly limited. One reason for this is because the above-described advantages are achieved as long as the flame retardant material enters into the inside of the anode active material layer 22B related to the charge and discharge reactions. For this reason, the entering portion 26P may be present in part of the gap 22BK that is present near the surface of the anode active material layer 22B as illustrated in FIG. 4, may be present to fill the gap 22BK, or may not only fill the gap 22BK but may be present further in the inside of the anode active material layer 22B. In particular, the above-described depth may be preferably as large as possible. The entering portion 26P may therefore preferably enter as deep as possible in the anode active material layer 22B. One reason for this is because the flame retardant material enters deep in the anode active material layer 22B, and a higher effect is therefore achieved.

It is to be noted that the battery device 20 is impregnated with the electrolytic solution as described later. Accordingly, the flame retardant layer 26 is a component, of the secondary battery, that is different from the separator 23 and plays a role different from that of the separator 23.

In accordance therewith, the flame retardant layer 26 may include one or more of other materials such as a polymer compound together with the above-described flame retardant material. One reason for this is because the close attachment characteristics of the flame retardant layer 26 with respect to the anode active material layer 22B is improved when the flame retardant layer 26 is formed on the surface of the anode active material layer 22B by the coating method. Also, when using the pressurization method, the close attachment characteristics of the flame retardant layer 26 with respect to the separator 23 are improved by forming the flame retardant layer 26 on the surface of the separator 23 by the coating method.

The kind of the polymer compound may be, for example, similar to the kind of the anode binder described above. In particular, the kind of the polymer compound may be preferably the same as the kind of the polymer compound used as the anode binder, because the close attachment characteristics of the flame retardant layer 26 with respect to the anode active material layer 22B are further improved. It is to be noted that, in order to suppress damage (disruption, falling off, etc.) of the entering portion 26P as a result of expansion and contraction of the anode active material layer 22B at the time of charge and discharge operations, the kind of the polymer compound, the content of the polymer compound in the anode active material layer 22B, etc. may be preferably set appropriately.

A thickness of the flame retardant layer 26 is not particularly limited. However, in particular, the thickness of the flame retardant layer 26 may be preferably from 1 μm to 30 μm both inclusive. One reason for this is because occurrence of the abnormal incidents such as thermal runaway becomes difficult to be suppressed when the thickness of the flame retardant layer 26 is excessively small, and on the other hand, when the thickness thereof is excessively large, the volume occupied by the anode active material layer 22B and the like inside the secondary battery is reduced and the lithium ion becomes difficult to move between the cathode 21 and the anode 22, which may result in decrease in battery capacity or the like. "Thickness" described above is a distance between the above-described surface position Y and an uppermost surface of the flame retardant layer 26, that is, the thickness defined by T shown in FIG. 4.

[Operation of Secondary Battery]

The secondary battery may operate, for example, as follows. At the time of charge operation, lithium ions extracted from the cathode 21 may be inserted in the anode 22 through the electrolytic solution. At the time of discharge operation, lithium ions extracted from the anode 22 may be inserted in the cathode 21 through the electrolytic solution.

[Method of Manufacturing Secondary Battery]

The secondary battery may be manufactured, for example, by the following procedure.

When fabricating the cathode 21, first, the cathode active material is mixed with the cathode binder, the cathode electric conductor, and/or the like to obtain a cathode mixture. Subsequently, the cathode mixture is dispersed or dissolved in an organic solvent or the like to obtain paste cathode mixture slurry. Lastly, both surfaces of the cathode current collector 21A are coated with the cathode mixture slurry, which is dried to form the cathode active material layer 21B. Subsequently, the cathode active material layer 21B may be compression-molded with the use of a roll pressing machine and/or the like. In this case, the compression-molding process may be performed while heating the cathode active material layer 21B, or the compression-molding process may be repeated for a plurality of times.

When fabricating the anode 22, the anode active material layers 22B are formed on both surfaces of the anode current collector 22A by a procedure similar to that of the cathode 21 described above. Specifically, the anode active material is mixed with the anode binder, the anode electric conductor, and/or the like to prepare an anode mixture, which is subsequently dispersed or dissolved in an organic solvent or the like to obtain paste anode mixture slurry. Subsequently, both surfaces of the anode current collector 22A are coated with the anode mixture slurry, which is dried to form the anode active material layer 22B. Thereafter, the anode active material layer 22B is compression-molded with the use of a roll pressing machine and/or the like.

In a case where the flame retardant layer 26 is formed on the surface of the anode 22, it is possible to select from several methods.

In a case of using the coating method, first, the flame retardant material is mixed with the polymer compound, etc., and the mixture is dispersed or dissolved in a solvent such as an organic solvent to obtain slurry. Subsequently, a surface of the anode active material layer 22B is coated with the slurry, which is dried to form the flame retardant layer 26. In this case, the flame retardant material, in a state being dispersed or dissolved in the solvent, is supplied to the surface of the anode active material layer 22B, and part of the flame retardant material therefore penetrates to the inside of the anode active material layer 22B. Thus, a portion (the entering portion 26P) of the flame retardant layer 26 enters into the inside of the anode active material layer 22B.

In a case of using a dipping method, the anode active material layer 22B is dipped into the slurry and is pulled out therefrom, and the pulled-out anode active material layer 22B is dried. Also in this case, a portion of the flame retardant layer 26 enters into the inside of the anode active material layer 22B for a reason similar to that in the case of using the coating method.

In a case of using the pressurization method, the slurry is applied onto the surface of the separator 23, and the applied slurry is dried thereafter to form the flame retardant layer 26. Subsequently, the flame retardant layer 26 formed on the separator 23 is brought to face the anode 22 (the anode active material layer 22B), and the separator 23 is pressurized onto the anode 22. In this case, the flame retardant layer 26 is closely attached to both of the anode 22 and the separator 23. However, attachment intensity (or adhesion intensity) of the flame retardant layer 26 with respect to the separator 23 may be preferably higher than attachment intensity of flame retardant layer 26 with respect to the anode 22, because a higher effect is achieved thereby.

It is to be noted that, in order to examine a magnification relationship between the attachment intensities, for example, after the completed secondary battery is decomposed to take out the anode 22, the flame retardant layer 26, and the separator 23 that are in a closely-attached state, the separator 23 may be peeled off from the anode 22. After peeling off the separator 23, when a large portion of the flame retardant layer 26 is attached to the separator 23, it shows that the attachment intensity of the flame retardant layer 26 with respect to the separator 23 is higher than the attachment intensity of the flame retardant layer 26 with respect to the anode 22. On the other hand, when a large portion of the flame retardant layer 26 is attached to the anode 22, it shows that attachment intensity of the flame retardant layer 26 with respect to the separator 23 is lower than the attachment intensity of the flame retardant layer 26 with respect to the anode 22. The procedure of examining the magnitude relationship between attachment intensities with paying attention to the attachment after the peeling off is similarly applicable below.

The details of the pressurization step may be as follows, for example. First, the battery device 20 is fabricated by the procedure described later. In the battery device 20, the flame retardant layer 26 is closely attached to the anode 22. Subsequently, the battery device 20 is contained in a pouch made of latex. Thereafter, the pouch is degassed and an opening thereof is sealed. Subsequently, the battery device 20 is pressurized (hydraulically pressurized) under hydrostatic pressure in a heated state. In this pressurization step, a portion (the entering portion 26P) of the flame retardant layer 26 protrudes into the anode active material layer 22B under an influence of the pressure at the time of pressurization, and therefore, a portion of the flame retardant material enters into the gap 22BK. Thus, a portion of the flame retardant layer 26 enters into the inside of the anode active material layer 22B. Conditions of the pressure at the time of pressurization, etc. are not particularly limited as long as the conditions cause a portion of the flame retardant layer 26 to protrude into the gap 22BK.

In the pressurization step, a portion of the flame retardant layer 26 protrudes into the anode active material layer 22B under the pressure applied onto the flame retardant layer 26 at the time of pressurization, and the entering portion 26P is formed thereby. In this case, compared to the case of using the coating method, density of the flame retardant material in the entering portion 26P is increased, by which occurrence of the abnormal incidents is further suppressed and the close attachment characteristics of the flame retardant layer 26 with respect to the anode active material layer 22B is further improved.

It is to be noted that, in the case of using the pressurization method, the slurry may be applied onto a surface of a supporting plate such as a plastic plate or a glass plate, instead of applying the slurry onto the surface of the separator 23. In this case, after the slurry is dried to form the flame retardant layer 26, the formed flame retardant layer 26 is peeled off from the supporting plate, by which a sheet-like flame retardant layer 26 is prepared in advance. The sheet-like flame retardant layer 26 is overlapped onto the anode active material layer 22B, and then, the sheet-like flame retardant layer 26 is pressurized. Thus, a portion of the flame retardant layer 26 protrudes into the anode active material layer 22B.

In particular, the coating method and the dipping method are preferably used, because it is easier for the flame retardant material to enter deep into the anode active material layer 22B in the step of forming the flame retardant layer 26.

Moreover, in order to secure physical strength of the entering portion 26P, it may be preferable that physical strength of the flame retardant layer 26 itself be sufficiently high. Specifically, in the case where the flame retardant layer 26 is formed on the surface of the anode active material layer 22B by the coating method, a large portion of the flame retardant layer 26 may be preferably attached firmly onto (left on) the surface of the anode active material layer 22B when the secondary battery is decomposed to cause the anode 22 to be separated from the separator 23. In the case of using the pressurization method, by forming the flame retardant layer 26 on the surface of the separator 23 by the coating method, a large portion of the flame retardant layer 26 may be preferably attached firmly onto (left on) the surface of the separator when the secondary battery is decomposed to cause the anode 22 to be separated from the separator 23. In the case of using the sheet-like flame retardant layer 26, it may be preferable that the flame retardant layer 26 be not damaged (for example, disrupted) when the flame retardant layer 26 is separated from the anode 22 after the pressurization.

When fabricating the battery device 20, the cathode lead 24 may be attached to the cathode current collector 21A, for example, by a welding method or the like, and the anode lead 25 may be attached to the anode current collector 22A, for example, by a welding method or the like. Subsequently, the cathode 21 and the anode 22 are laminated with the separator 23 and the flame retardant layer 26 in between, and the laminated body is spirally wound in a longitudinal direction to form a spirally wound body. Subsequently, the spirally wound body is shaped into a flat shape.

When assembling the secondary battery, first, the battery device 20 is contained inside the battery can 11, and then, the insulating plate 12 is placed on the battery device 20. Subsequently, the cathode pin 15 may be attached to the cathode lead 24, for example, by a welding method or the like, and the anode lead 25 may be attached to the battery can 11, for example, by a welding method or the like. In this case, the battery cover 13 may be fixed onto the open end of the battery can 11, for example, by a laser welding method or the like. Subsequently, the electrolytic solution in which the electrolyte salt is dispersed into the solvent is injected inside the battery can 11 from the injection hole 19 to cause the battery device 20 to be impregnated with the electrolytic solution. Lastly, the injection hole 19 is blocked by the sealing member 19A.

[Functions and Effects of Secondary Battery]

According to the present secondary battery of a square type, the flame retardant layer 26 including the flame retardant material is provided between the cathode 21 and the anode 22, and a portion (the entering portion 26P) of the flame retardant layer 26 enters into the inside of the anode active material layer 22B. In this case, as described above, occurrence of abnormal incidents such as thermal runaway is suppressed while movement of lithium ions is not inhibited. Accordingly, even when charge and discharge operations are performed repeatedly, discharge capacity is less likely to be decreased, and defects such as ignition or explosion of the secondary battery are less likely to be caused. Consequently, it is possible to achieve both favorable battery characteristics and safety.

[1-2. Flame Retardant Layer Formed Between Cathode and Separator]

Figure 6:
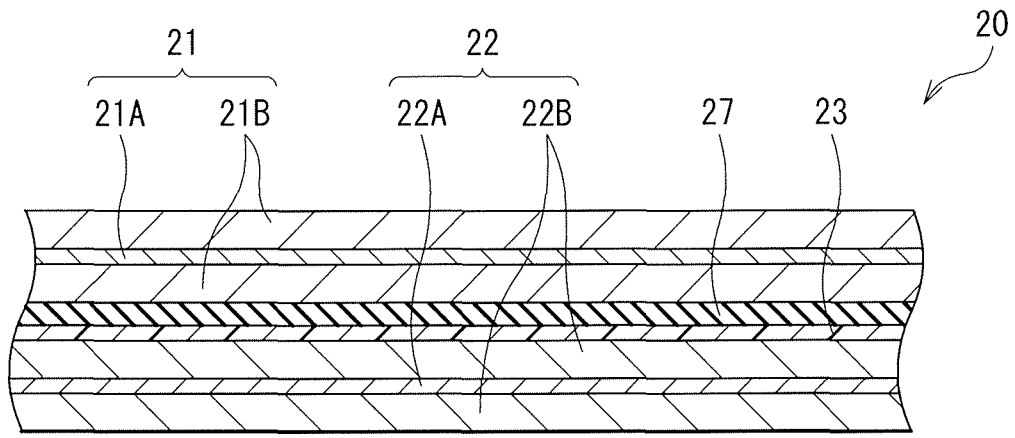
FIG. 6 is a cross-sectional view illustrating another detailed configuration of the battery device illustrated in FIG. 2.

As illustrated in FIG. 6 corresponding to FIG. 3, a flame retardant layer 27 formed between the separator 23 and the cathode 21 may be used instead of the flame retardant layer 26 formed between the separator 23 and the anode 22.

A configuration and a forming method of the battery device 20 illustrated in FIG. 6 are similar to the configuration and the forming method of the battery device 20 illustrated in FIG. 3 except that the flame retardant layer 26 is not formed between the separator 23 and the anode 22 but the flame retardant layer 27 is formed between the separator 23 and the cathode 21 instead thereof.

Specifically, respective configurations of the cathode active material layer 21B and the flame retardant layer 27 are similar to the respective configurations of the anode active material layer 22B and the flame retardant layer 26 described above. In detail, in the cathode 21 which is a specific but not limitative example of the electrode of the present application, the flame retardant layer 27 which is an interlayer is provided on the cathode active material layer 21B. As illustrated in FIG. 4, when the plurality of cathode active materials 21BR and the gaps 21BK are present in the cathode active material layer 21B, the flame retardant layer 27 may be formed, for example, by a coating method, a dipping method, a pressurization method, etc. Thus, a portion (an entering portion 27P) of the flame retardant layer 27 enters into the inside of the cathode 21 (the cathode active material layer 21B). A portion of the flame retardant material therefore enters into the inside of the cathode active material layer 21B. The wording "a portion of the flame retardant layer 27 enters into the cathode 21" or the like refers to that the portion of the flame retardant layer 27 is present in an er side of the surface of the cathode 21 (in a direction toward the inside of the cathode 21).

Also in the flame retardant layer 27, a function similar to that of the flame retardant layer 26 is achieved, and it is therefore possible to achieve both favorable battery characteristics and safety. It is to be noted that, when using the pressurization method as the method of forming the flame retardant layer 27, the thus-formed flame retardant layer 27 is closely attached to both of the cathode 21 and the separator 23. However, attachment intensity of the flame retardant layer 27 with respect to the separator 23 may be preferably higher than attachment intensity of the flame retardant layer 27 with respect to the cathode 21, because a higher effect is achieved thereby.

[1-3. Flame Retardant Layer Formed Between Anode and Separator and Flame Retardant Layer Formed Between Cathode and Separator]

Figure 7:
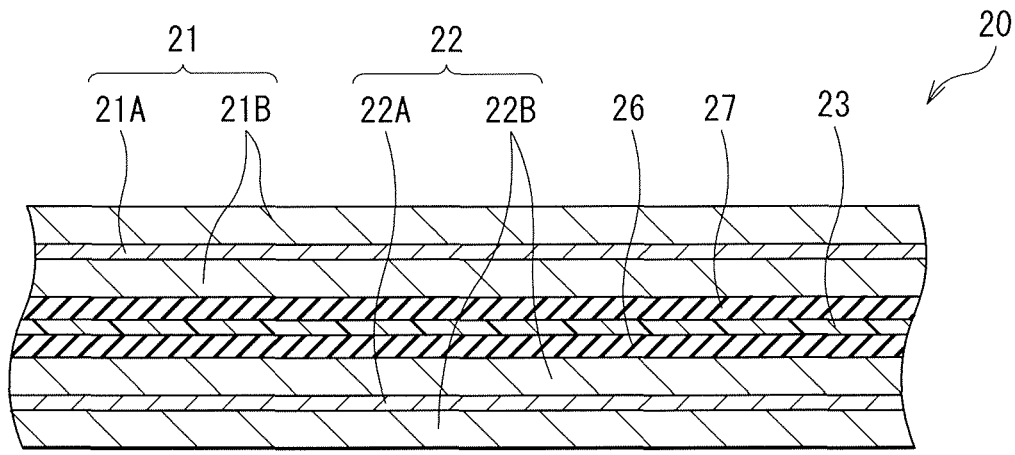
FIG. 7 is a cross-sectional view illustrating still another detailed configuration of the battery device illustrated in FIG. 2.

As illustrated in FIG. 7 corresponding to FIG. 3, the flame retardant layer 27 (a first interlayer) formed between the separator 23 and the cathode 21 may be used in addition to the flame retardant layer 26 (a second interlayer) formed between the separator 23 and the anode 22.

A configuration and a forming method of the battery device 20 illustrated in FIG. 7 are similar to the configuration and the forming method of the battery device 20 illustrated in FIG. 3 except that the flame retardant layer 27 is newly formed between the separator 23 and the cathode 21. Specifically, as illustrated in FIG. 4, a portion (the entering portion 26P) of the flame retardant layer 26 enters into the inside of the anode active material layer 22B, and a portion of the flame retardant material therefore enters into the inside of the anode active material layer 22B. Also, a portion (the entering portion 27P) of the flame retardant layer 27 enters into the inside of the cathode active material layer 21B, and a portion of the flame retardant material therefore enters into the inside of the cathode active material layer 21B.

The function of suppressing occurrence of the abnormal incidents, etc. described above are achieved in both of the flame retardant layers 26 and 27. Accordingly, occurrence of the abnormal incidents such as thermal runaway is remarkably suppressed, which achieves a higher effect. It is to be noted that, when using the pressurization method as the method of forming the flame retardant layers 26 and 27, the flame retardant layer 26 is closely attached to both of the anode 22 and the separator 23, and the flame retardant layer 27 is closely attached to both of the cathode 21 and the separator 23. In this case, attachment intensity of the flame retardant layer 26 with respect to the separator 23 may be preferably higher than attachment intensity of the flame retardant layer 26 with respect to the anode 22. Also, attachment intensity of the flame retardant layer 27 with respect to the separator 23 may be preferably higher than attachment intensity of the flame retardant layer 27 with respect to the cathode 21. One reason for these is because a higher effect is achieved thereby.

[1-4. Separator Formed Between Cathode and Anode (Separator Serving as Flame Retardant Layer)]

Figure 8:
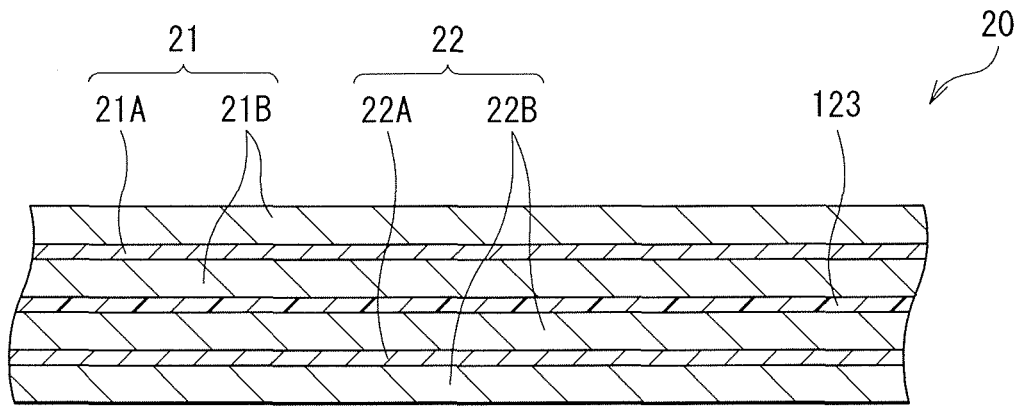
FIG. 8 is a cross-sectional view illustrating still another detailed configuration of the battery device illustrated in FIG. 2.

As illustrated in FIG. 8 corresponding to FIG. 3, a separator 123 that serves as a flame retardant layer may be used instead of the separator 23 and the flame retardant layer 26. The separator 123 also has a function as a flame retardant layer, unlike the separator 23 that does not serve as the flame retardant layer.

A configuration and a forming method of the battery device 20 illustrated in FIG. 8 are similar to the configuration and the forming method of the battery device 20 illustrated in FIG. 3 except that the flame retardant layer 26 is not formed and the separator 123 is used instead of the separator 23. The separator 123 has a configuration similar to the configuration of the separator 23 except that the separator 123 includes therein one or more of the flame retardant materials described above. The separator 123 is formed by a method (the pressurization method) similar to the method of forming the flame retardant layer 26. In accordance therewith, as illustrated in FIG. 4, a portion (an entering portion 123P) of the separator 123 that serves as the flame retardant layer enters into the inside of the anode active material layer 22B, and a portion of the flame retardant material therefore enters into the inside of the anode active material layer 22B. Also, a portion (the entering portion 123P) of the separator 123 enters into the inside of the cathode active material layer 21B, and a portion of the flame retardant material therefore enters into the inside of the cathode active material layer 21B.

Also in the separator 123, a function similar to the function of the flame retardant layer 26 is achieved, and it is therefore possible to achieve both favorable battery characteristics and safety.

[2. Second Secondary Battery (Cylindrical Type)]

[2-1. Flame Retardant Layer Formed Between Anode and Separator]

Figure 9:
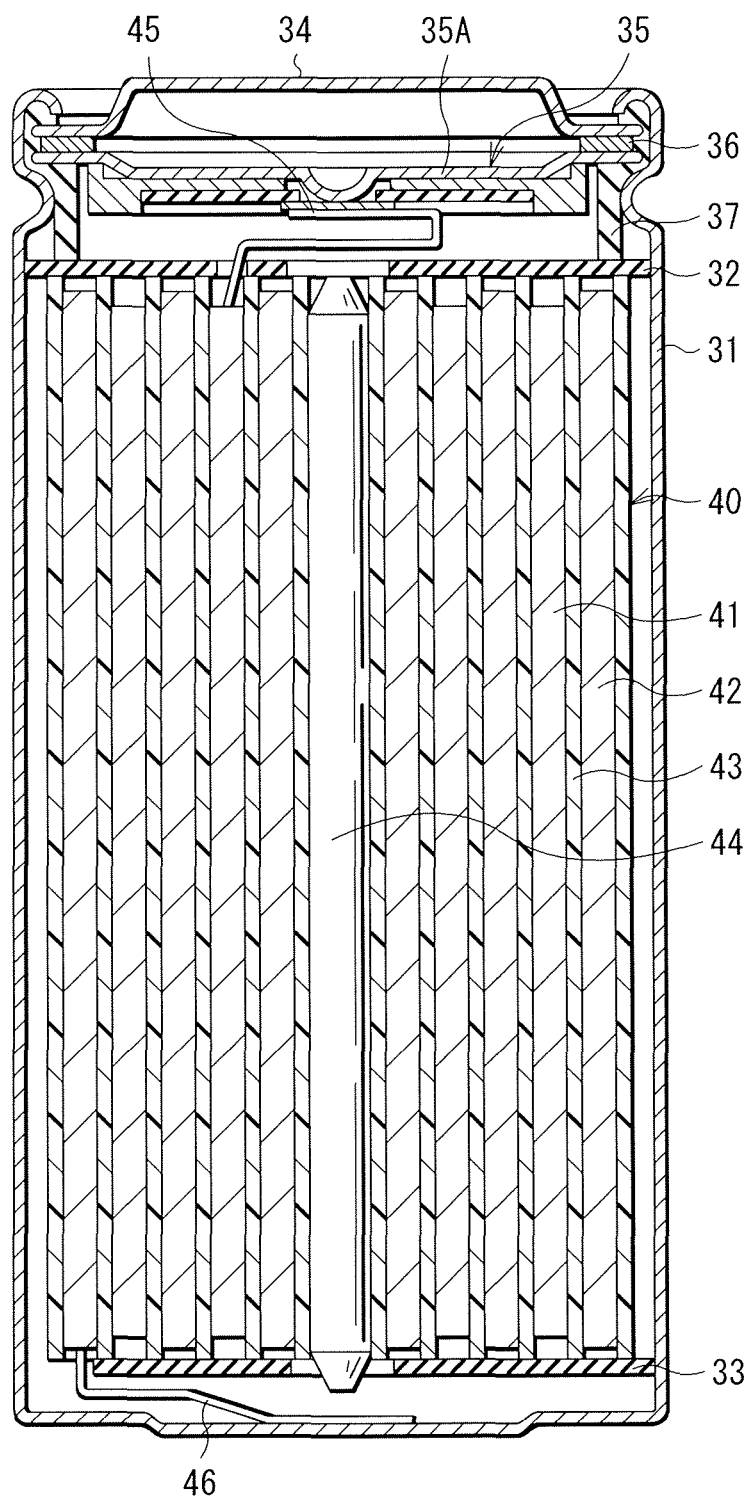
FIG. 9 is a cross-sectional view illustrating a configuration of a second secondary battery (of a cylindrical type) of an embodiment of the present application.
Figure 10:
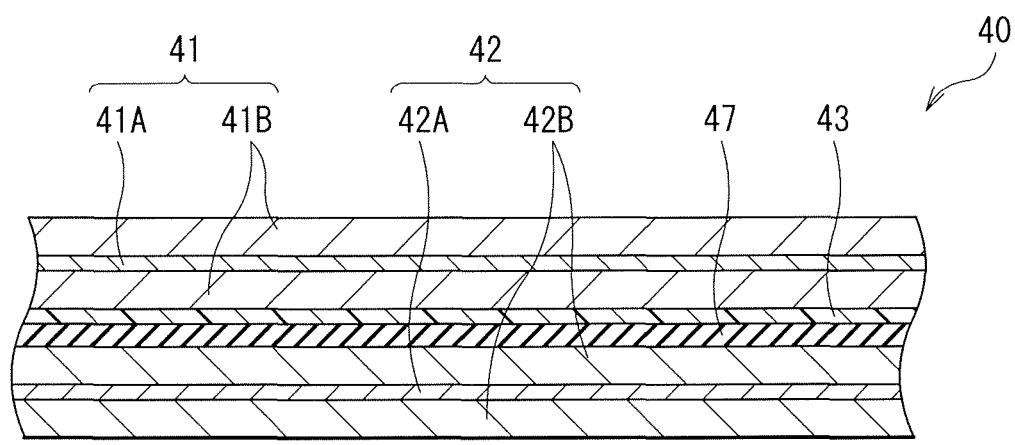
FIG. 10 is a cross-sectional view illustrating a detailed configuration of a spirally wound electrode body illustrated in FIG. 9.

FIG. 9 illustrates a cross-sectional configuration of a second secondary battery. FIG. 10 illustrates a detailed configuration of a spirally wound electrode body 40 illustrated in FIG. 9. The components of the square-type secondary battery that have been already described are appropriately referred to below.

[General Configuration of Secondary Battery]

The secondary battery described below is a lithium ion secondary battery, and has a so-called cylindrical-type battery structure.

As illustrated in FIG. 9, the secondary battery may contain, for example, a pair of insulating plates 32 and 33 as well as the spirally wound electrode body 40 inside a battery can 31 in the shape of a hollow cylinder. In the spirally wound electrode body 40, for example, a cathode 41 and an anode 42 are laminated with a separator 43 and a flame retardant layer 47 in between and are spirally wound.

The battery can 31 may have, for example, a hollow structure in which one end of the battery can 31 is closed and the other end of the battery can 31 is open. The battery can 31 may be made, for example, of one or more of iron (Fe), aluminum (Al), alloy thereof, and the like. The surface of the battery can 31 may be plated with nickel (Ni) or the like. The pair of insulating plates 32 and 33 is arranged to sandwich the spirally wound electrode body 40 in between, and to extend perpendicularly to the spirally wound periphery surface of the spirally wound electrode body 40.

At the open end of the battery can 31, a battery cover 34, a safety valve mechanism 35, and a positive temperature coefficient device (PTC device) 36 are attached by being swaged with a gasket 37. Thereby, the battery can 31 is hermetically sealed. The battery cover 34 may be made, for example, of a material similar to that of the battery can 31. The safety valve mechanism 35 and the PTC device 36 are provided on an er side of the battery cover 34. The safety valve mechanism 35 is electrically connected to the battery cover 34 via the PTC device 36. In the safety valve mechanism 35, in the case where the internal pressure becomes a certain level or higher by internal short circuit, external heating, or the like, a disk plate 35A inverts to cut electric connection between the battery cover 34 and the spirally wound electrode body 40. The PTC device 36 prevents abnormal heat generation resulting from a large current. As temperature rises, resistance of the PTC device 36 is increased accordingly. The gasket 37 may be made, for example, of an insulating material. The surface of the gasket 37 may be coated with asphalt.

In the center of the spirally wound electrode body 40, for example, a center pin 44 may be inserted. However, the center pin 44 may not be inserted in the center of the spirally wound electrode body 40. For example, a cathode lead 45 made of a conductive material such as aluminum may be connected to the cathode 41. For example, an anode lead 46 made of a conductive material such as nickel may be connected to the anode 42. For example, the cathode lead 45 may be welded to the safety valve mechanism 35, and may be electrically connected to the battery cover 34. For example, the anode lead 46 may be welded to the battery can 31, and may be electrically connected to the battery can 31.

[Cathode, Anode, Separator, Flame Retardant Layer, and Electrolytic Solution]

As illustrated in FIG. 10, the cathode 41 may have, for example, cathode active material layers 41B on both surfaces of a cathode current collector 41A, and the anode 42 may have, for example, anode active material layers 42B on both surfaces of the anode current collector 42A. Respective configurations of the cathode current collector 41A, the cathode active material layer 41B, the anode current collector 42A, and the anode active material layer 42B are similar to the respective configurations of the cathode current collector 21A, the cathode active material layer 21B, the anode current collector 22A, and the anode active material layer 22B.

A configuration of the separator 43 is similar to the configuration of the separator 23. Also, a composition of the electrolytic solution with which the spirally wound electrode body 40 is impregnated is similar to the composition of the electrolytic solution used in the cylindrical-type secondary battery.

A configuration of the flame retardant layer 47 is similar to the configuration of the flame retardant layer 26. Specifically, the flame retardant layer 47 is provided between the cathode 41 and the anode 42. More specifically, the flame retardant layer 47 is provided between the separator 43 and the anode 42. Also, the flame retardant layer 47 includes one or more of the flame retardant materials. A portion (an entering portion) of the flame retardant layer 47 enters into the anode 42 (the anode active material layer 42B), and a portion of the flame retardant material therefore enters into the inside of the anode active material layer 42B.

[Operation of Secondary Battery]

The secondary battery may operate, for example, as follows. At the time of charge operation, lithium ions extracted from the cathode 41 may be inserted in the anode 42 through the electrolytic solution. At the time of discharge operation, lithium ions extracted from the anode 42 may be inserted in the cathode 41 through the electrolytic solution.

[Method of Manufacturing Secondary Battery]

The secondary battery may be manufactured, for example, by the following procedure.

First, the cathode 41 and the anode 42 are fabricated by a fabrication procedure similar to that of the cathode 21 and the anode 22. In this case, the cathode active material layers 41B are formed on both surfaces of the cathode current collector 41A, and the anode active material layers 42B are formed on both surfaces of the anode current collector 42A. Thereafter, the cathode lead 45 may be attached to the cathode current collector 41A, for example, by a welding method or the like, and the anode lead 46 may be attached to the anode current collector 42A, for example, by a welding method or the like.

Subsequently, the cathode 41 and the anode 42 are laminated with the separator 43 and the flame retardant layer 47 in between and are spirally wound, and the spirally wound electrode body 40 is thereby fabricated. Thereafter, the center pin 44 is inserted in the center of the spirally wound electrode body. Subsequently, the spirally wound electrode body 40 is sandwiched between the pair of insulating plates 32 and 33, and is contained inside the battery can 31. In this case, the end tip of the cathode lead 45 may be attached to the safety valve mechanism 35, for example, by a welding method or the like, and the end tip of the anode lead 46 may be attached to the battery can 31, for example, by a welding method or the like. Subsequently, the electrolytic solution is injected into the battery can 31, and the spirally wound electrode body 40 is impregnated with the electrolytic solution. Lastly, the battery cover 34, the safety valve mechanism 35, and the PTC device 36 are fixed at the open end of the battery can 31, by being swaged with the gasket 37 in between.

It is to be noted that, when manufacturing the secondary battery, the flame retardant layer 47 is formed by a coating method, a dipping method, a pressurization method, etc. by a procedure similar to the procedure of forming the flame retardant layer 26.

[Functions and Effects of Secondary Battery]

According to the cylindrical-type secondary battery, the flame retardant layer 47 including the flame retardant material is provided between the cathode 41 and the anode 42, and a portion (an entering portion) of the flame retardant layer 47 enters into the inside of the anode active material layer 42B. Accordingly, it is possible to achieve both favorable battery characteristics and safety for a reason similar to the reason for the square-type secondary battery.

Other embodiments related to the square-type secondary battery illustrated in FIGS. 6 to 8 also applicable also to the above-described cylindrical-type secondary battery.

[2-2. Flame Retardant Layer Formed Between Cathode and Separator]

Figure 11:
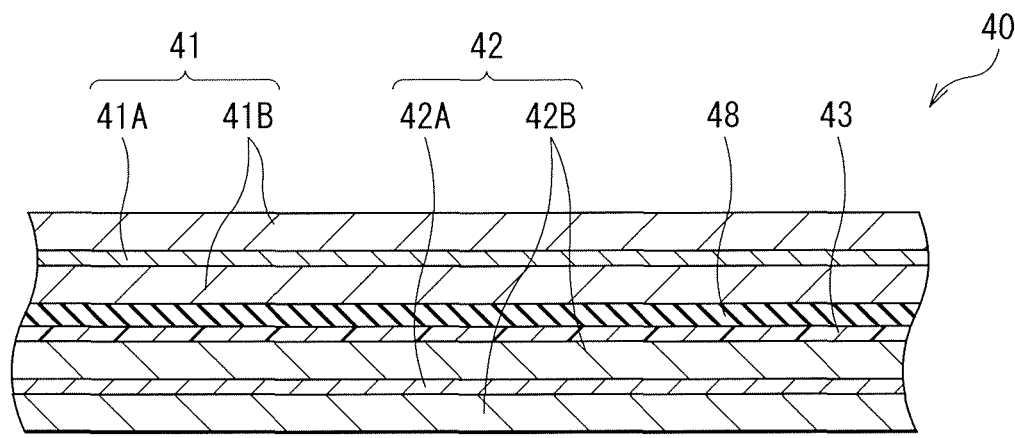
FIG. 11 is a cross-sectional view illustrating another detailed configuration of the spirally wound electrode body illustrated in FIG. 9.

Specifically, as illustrated in FIG. 11 corresponding to FIG. 10, a flame retardant layer 48 formed between the separator 43 and the cathode 41 may be used instead of the flame retardant layer 47 formed between the separator 43 and the anode 42. A configuration and a forming method of the spirally wound electrode body 40 illustrated in FIG. 11 are similar to the configuration and the forming method of the spirally wound electrode body 40 illustrated in FIG. 10, except that the flame retardant layer 47 is not formed between the separator 43 and the anode 42 and the flame retardant layer 48 is formed between the separator 43 and the cathode 41 instead thereof. Specifically, the respective configurations of the cathode active material layer 41B and the flame retardant layer 48 are similar to the respective configurations of the anode active material layer 42B and the flame retardant layer 47 described above. Accordingly, a portion (an entering portion) of the flame retardant layer 48 enters into the inside of the cathode active material layer 41B, and a portion of the flame retardant material therefore enters into the inside of the cathode active material layer 41B.

Also in the flame retardant layer 48, a function similar to the function of the flame retardant layer 47 is achieved, and it is therefore possible to achieve both favorable battery characteristics and safety.

[2-3. Flame Retardant Layer Formed Between Anode and Separator and Flame Retardant Layer Formed Between Cathode and Separator]

Figure 12:
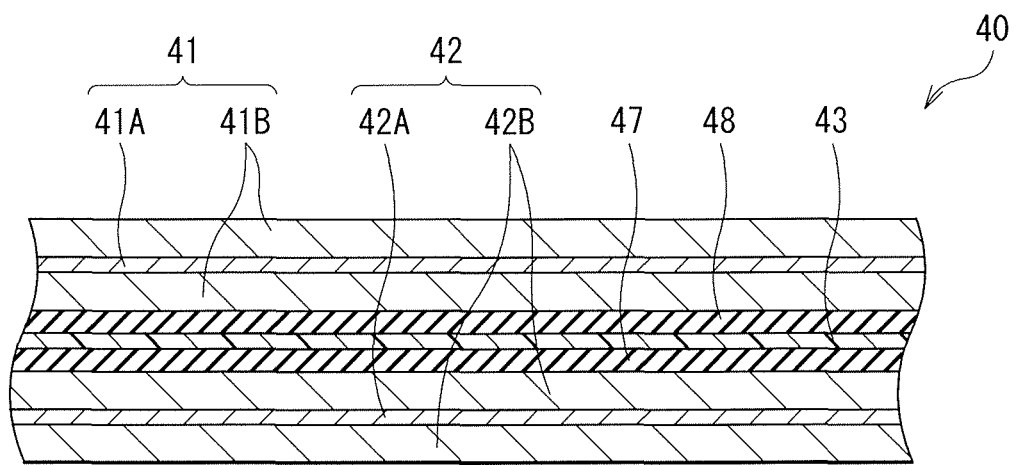
FIG. 12 is a cross-sectional view illustrating still another detailed configuration of the spirally wound electrode body illustrated in FIG. 9.

As illustrated in FIG. 12 corresponding to FIG. 10, the flame retardant layer 48 (the first interlayer) formed between the separator 43 and the cathode 41 may be used in addition to the flame retardant layer 47 (the second interlayer) formed between the separator 43 and the anode 42. A configuration and a forming method of the spirally wound electrode body 40 illustrated in FIG. 12 are similar to the configuration and the forming method of the spirally wound electrode body 40 illustrated in FIG. 10 except that the flame retardant layer 48 is newly formed between the separator 43 and the cathode 41. Specifically, a portion (an entering portion) of the flame retardant layer 47 enters into the inside of the anode active material layer 42B, and a portion of the flame retardant material therefore enters into the inside of the anode active material layer 42B. Also, a portion (an entering portion) of the flame retardant layer 48 enters into the inside of the cathode active material layer 41B, and a portion of the flame retardant material enters into the inside of the cathode active material layer 41B.

The function of suppressing occurrence of abnormal incidents, etc. described above are achieved in both of the flame retardant layers 47 and 48. Accordingly, occurrence of the abnormal incidents such as thermal runaway is remarkably suppressed, which achieves a higher effect.

[2-4. Separator Formed Between Cathode and Anode (Separator Serving as Flame Retardant Layer)]

Figure 13:
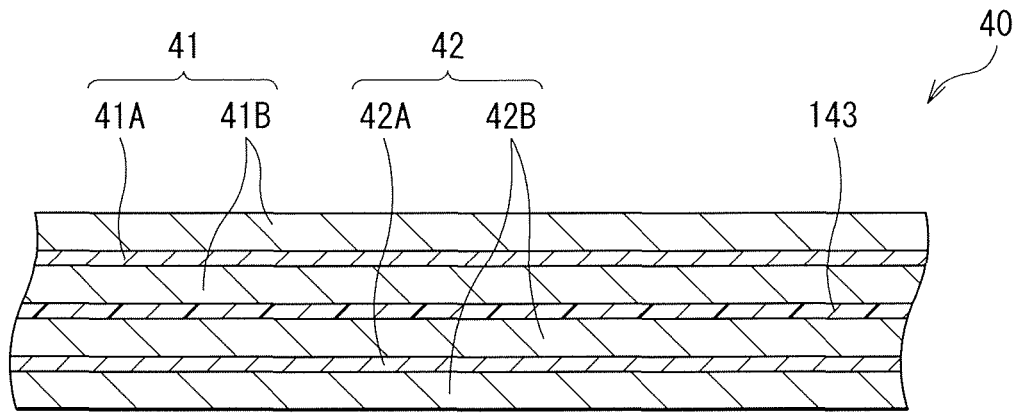
FIG. 13 is a cross-sectional view illustrating still another detailed configuration of the spirally wound electrode body illustrated in FIG. 9.

As illustrated in FIG. 13 corresponding to FIG. 10, a separator 143 that serves as a flame retardant layer may be used instead of the separator 43 and the flame retardant layer 47. The separator 143 also has a function as a flame retardant layer, unlike the separator 43 that does not serve as the flame retardant layer.

A configuration and a forming method of the spirally wound electrode body 40 illustrated in FIG. 13 are similar to the configuration and the forming method of the spirally wound electrode body 40 illustrated in FIG. 10 except that the flame retardant layer 47 is not formed and the separator 143 is used instead of the separator 43. The separator 143 has a configuration similar to the configuration of the separator 43 except that the separator 143 therein includes one or more of the flame retardant materials described above. The separator 143 is formed by a method (a pressurization method) similar to the method of forming the flame retardant layer 47. In accordance therewith, a portion (an entering portion) of the separator 143 that serves as the flame retardant layer enters into the inside of the anode active material layer 42B, and a portion of the flame retardant material therefore enters into the inside of the anode active material layer 42B. Also, a portion (an entering portion) of the separator 143 enters into the inside of the cathode active material layer 41B, and a portion of the flame retardant material therefore enters into the inside of the cathode active material layer 41B.

Also in the separator 143, a function similar to the function of the flame retardant layer 47 is achieved, and it is therefore possible to achieve both favorable battery characteristics and safety.

[3. Third Secondary Battery (Laminated Film Type)]

[3-1. Flame Retardant Layer Formed Between Anode and Separator]

Figure 14:
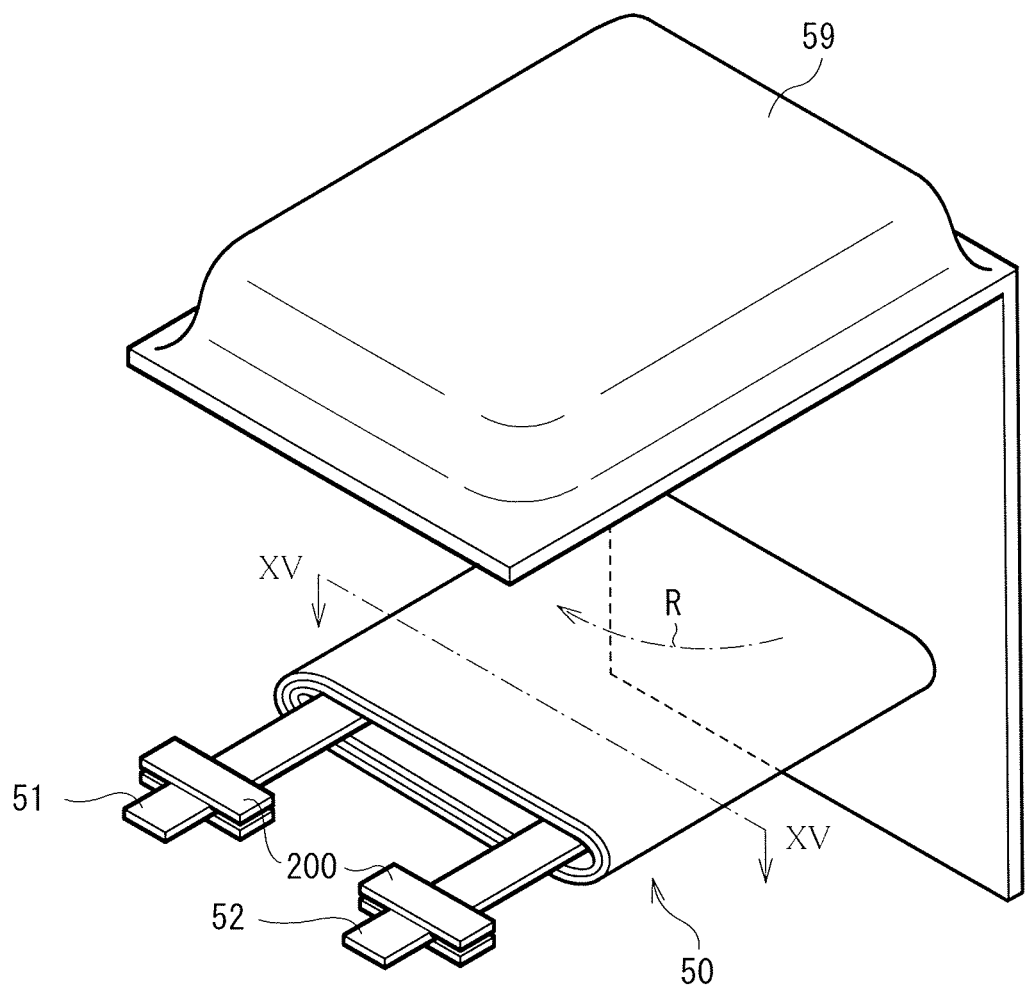
FIG. 14 is a perspective view illustrating a configuration of a third secondary battery (of a laminated film type) of an embodiment of the present application.
Figure 15:
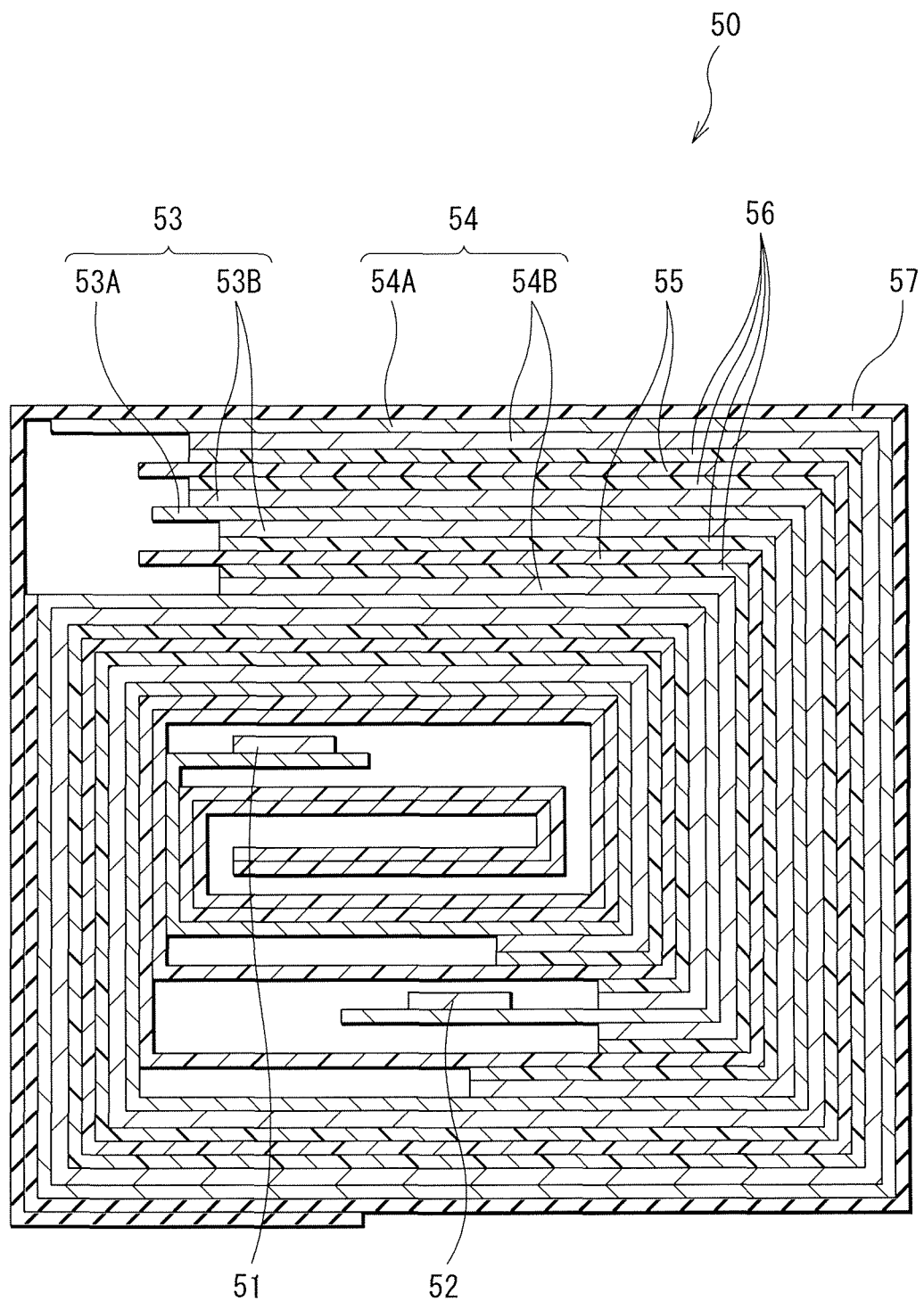
FIG. 15 is a cross-sectional view of a spirally wound electrode body taken along a line XV-XV shown in FIG. 14.
Figure 16:
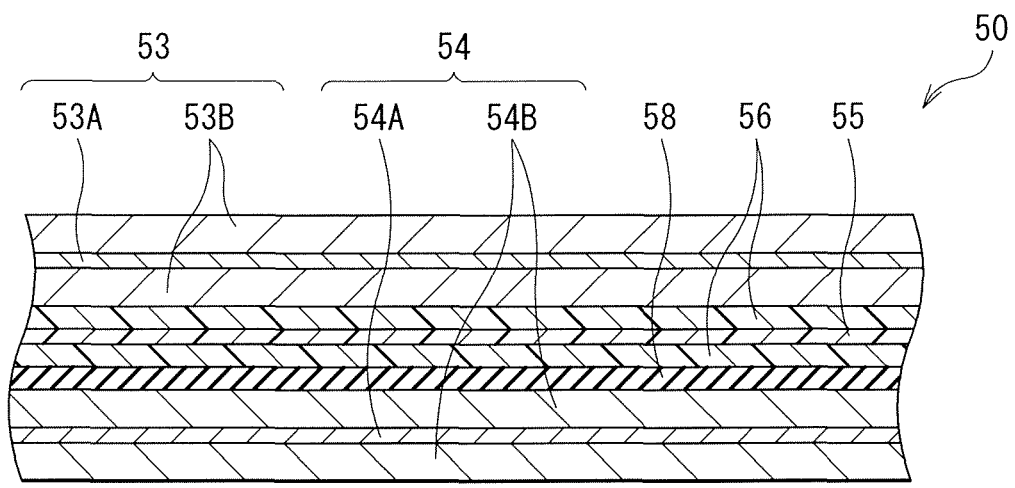
FIG. 16 is a cross-sectional view illustrating a detailed configuration of the spirally wound electrode body illustrated in FIG. 15.

FIG. 14 illustrates a perspective configuration of the third secondary battery. FIG. 15 illustrates a cross-sectional configuration of a spirally wound electrode body 50 taken along a line XV-XV shown in FIG. 14. FIG. 16 illustrates a detailed configuration of the spirally wound electrode body 50 illustrated in FIG. 15. The components of the square-type secondary battery that have been already described are appropriately referred to below.

[General Configuration of Secondary Battery]

A secondary battery described below is a lithium ion secondary battery, and has a so-called laminated-film-type battery structure.

For example, as illustrated in FIGS. 14 and 15, the secondary battery may contain the spirally wound electrode body 50 in a film-like outer package member 59. In the spirally wound electrode body 50, for example, a cathode 53 and an anode 54 are laminated with a separator 55, an electrolyte layer 56, and a flame retardant layer 58 in between and are spirally wound. A cathode lead 51 is attached to the cathode 53, and an anode lead 52 is attached to the anode 54. The outermost periphery of the spirally wound electrode body 50 is protected by a protective tape 57.

The cathode lead 51 and the anode lead 52 may be, for example, led out from inside to outside of the outer package member 59 in the same direction. The cathode lead 51 may be made, for example, of one or more of conductive materials such as aluminum. The anode lead 52 may be made, for example, of one or more of conductive materials such as copper (Cu), nickel (Ni), and stainless steel. These conductive materials may be in the shape, for example, of a thin plate or mesh.

The outer package member 59 may be, for example, a film that is foldable in a direction of an arrow R illustrated in FIG. 14. A depression for containing the spirally wound electrode body 50 is provided in a portion of the outer package member 59. The outer package member 59 may be a laminated film in which, for example, a fusion bonding layer, a metal layer, and a surface protective layer are laminated in this order. In a step of manufacturing the secondary battery, the outer package member 59 is folded so that the fusion bonding layer faces the spirally wound electrode body 50, and then, the outer edges of the facing fusion bonding layers are fusion bonded to each other. However, the outer package member 59 may be configured of two laminated films that are bonded to each other by an adhesive or the like. Examples of the fusion bonding layer may include a film made of polyethylene, polypropylene, and/or the like. Examples of the metal layer may include an aluminum foil. Examples of the surface protective layer may include a film made of nylon, polyethylene terephthalate, and/or the like.

In particular, the outer package member 59 may be preferably an aluminum laminated film in which a polyethylene film, an aluminum foil, and a nylon film are laminated in this order. However, the outer package member 59 may be a laminated film having other laminated structure, a polymer film such as polypropylene, or a metal film.

For example, a close-attachment film 58 to prevent outside air intrusion may be inserted between the outer package member 59 and the cathode lead 51 and between the outer package member 59 and the anode lead 52. The close-attachment film 58 is made of a material having close-attachment characteristics with respect to the cathode lead 51 and the anode lead 52. Examples of the material having close-attachment characteristics may include polyolefin resin. More specifically, examples thereof may include polyethylene, polypropylene, modified polyethylene, and modified polypropylene.

[Cathode, Anode, Separator, Flame Retardant Layer, and Electrolytic Solution]

As illustrated in FIG. 15, the cathode 53 may have, for example, cathode active material layers 53B on both surfaces of a cathode current collector 53A, and the anode 54 may have, for example, anode active material layers 54B on both surfaces of the anode current collector 54A. Respective configurations of the cathode current collector 53A, the cathode active material layer 53B, the anode current collector 54A, and the anode active material layer 54B are similar to the respective configurations of the cathode current collector 21A, the cathode active material layer 21B, the anode current collector 22A, and the anode active material layer 22B. A configuration of the separator 55 is similar to the configuration of the separator 23.

A configuration of the flame retardant layer 58 is similar to the configuration of the flame retardant layer 26. Specifically, the flame retardant layer 58 is provided between the cathode 53 and the anode 54. More specifically, the flame retardant layer 58 is provided between the separator 55 and the anode 54. Also, the flame retardant layer 58 includes one or more of the flame retardant materials. A portion (an entering portion) of the flame retardant layer 58 enters into the anode 54 (the anode active material layer 54B), and a portion of the flame retardant layer therefore enters into the inside of the anode active material layer 54B.

[Electrolyte Layer]

The electrolyte layer 56 includes electrolytic solution and a polymer compound, and the electrolytic solution is held by the polymer compound. In other words, the electrolyte layer 56 is a so-called gel electrolyte, because high ion conductivity (for example, 1 mS/cm or more at room temperature) is thereby achieved and liquid leakage of the electrolytic solution is prevented. The electrolyte layer 56 may further contain one or more of other materials such as an additive.

The polymer compound may contain, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. Other than the above, the polymer compound may be a copolymer. The copolymer may be, for example, a copolymer of vinylidene fluoride and hexafluoropropylene. In particular, polyvinylidene fluoride may be preferable as a homopolymer, and the copolymer of vinylidene fluoride and hexafluoropropylene may be preferable as a copolymer, because such a polymer compound is electrochemically stable.

For example, the composition of the electrolytic solution may be similar to the composition of the electrolytic solution of the square-type secondary battery. However, in the electrolyte layer 56 as a gel electrolyte, the solvent of the electrolytic solution refers to a wide concept including not only a liquid solvent but also a material having ion conductivity capable of dissociating the electrolyte salt. Therefore, in the case where a polymer compound having ion conductivity is used, the polymer compound is also included in the solvent.

It is to be noted that the electrolytic solution may be used as it is instead of the gel electrolyte layer 56. In this case, the spirally wound electrode body 50 is impregnated with the electrolytic solution.

[Operation of Secondary Battery]

The secondary battery may operate, for example, as follows. At the time of charge operation, lithium ions extracted from the cathode 53 may be inserted in the anode 54 through the electrolyte layer 56. In contrast, at the time of discharge operation, lithium ions extracted from the anode 54 may be inserted in the cathode 53 through the electrolyte layer 56.

[Method of Manufacturing Secondary Battery]

The secondary battery including the gel electrolyte layer 56 may be manufactured, for example, by the following three types of procedures.

In the first procedure, the cathode 53 and the anode 54 are fabricated by a fabrication procedure similar to that of the cathode 21 and the anode 22. Specifically, when fabricating the cathode 53, the cathode active material layers 53B are formed on both surfaces of the cathode current collector 53A, and when fabricating the anode 54, the anode active material layers 54B are formed on both surfaces of the anode current collector 54A. Subsequently, precursor solution containing electrolytic solution, a polymer compound, and a solvent such as an organic solvent is prepared. Thereafter, the cathode 53 and the anode 54 are coated with the precursor solution to form the gel electrolyte layer 56. Subsequently, the cathode lead 51 may be attached to the cathode current collector 53A, for example, by a welding method or the like, and the anode lead 52 may be attached to the anode current collector 54A, for example, by a welding method or the like. Subsequently, the cathode 53 and the anode 54 are laminated with the separator 55, the electrolyte layer 56, and the flame retardant layer 58 in between and are spirally wound to fabricate the spirally wound electrode body 50. Thereafter, the protective tape 57 is adhered to the outermost periphery of the spirally wound electrode body 50. Subsequently, after the film-like outer package member 59 is folded and the spirally wound electrode body 50 is contained inside the outer package member 59, the outer edges of the outer package members 59 may be bonded, for example, by a thermal fusion bonding method or the like to enclose the spirally wound electrode body 50 inside the outer package members 59. In this case, close attachment films 200 are inserted between the cathode lead 51 and the outer package member 59 and between the anode lead 52 and the outer package member 59. It is to be noted that, when manufacturing the secondary battery, the flame retardant layer 58 is formed by a coating method, a dipping method, a pressurization method, etc. by a procedure similar to the procedure of forming the flame retardant layer 26.

In the second procedure, the cathode lead 51 is attached to the cathode 53, and the anode lead 52 is attached to the anode 54. Subsequently, the cathode 53 and the anode 54 are laminated with the separator 55 and the flame retardant layer 58 in between and are spirally wound to fabricate a spirally wound body as a precursor of the spirally wound electrode body 50. Thereafter, the protective tape 57 is adhered to the outermost periphery thereof. Subsequently, after the spirally wound body is contained inside the outer package member 59, the outermost peripheries except for one side are bonded by a thermal fusion bonding method and/or the like, and the spirally wound body is enclosed inside the pouch-like outer package member 59. Subsequently, electrolytic solution, a monomer as a raw material for the polymer compound, a polymerization initiator, and other materials such as a polymerization inhibitor are mixed to prepare a composition for electrolyte. Subsequently, the composition for electrolyte is injected inside the pouch-like outer package member 59. Thereafter, the outer package member 59 is hermetically sealed by a thermal fusion bonding method and/or the like. Subsequently, the monomer is thermally polymerized, and thereby, a polymer compound is formed. Thereby, the polymer compound is impregnated with the electrolytic solution, the polymer compound is gelated, and accordingly, the electrolyte layer 56 is formed. Also in this procedure, the flame retardant layer 58 is formed by a coating method, a dipping method, a pressurization method, etc. by a procedure similar to the procedure of forming the flame retardant layer 26.

In the third procedure, the spirally wound body is fabricated and contained inside the pouch-like outer package member 59 in a manner similar to that of the foregoing second procedure, except that the separator 55 with both surfaces coated with a polymer compound is used. Examples of the polymer compound with which the separator 55 is coated may include a polymer (a homopolymer, a copolymer, or a multicomponent copolymer) containing vinylidene fluoride as a component. Specific examples of the homopolymer may include polyvinylidene fluoride. Examples of the copolymer may include a binary copolymer containing vinylidene fluoride and hexafluoropropylene as components. Examples of the multicomponent copolymer may include a ternary copolymer containing vinylidene fluoride, hexafluoropropylene, and chlorotrifluoroethylene as components. It is to be noted that, in addition to the polymer containing vinylidene fluoride as a component, other one or more polymer compounds may be used. Subsequently, electrolytic solution is prepared and injected inside the outer package member 59. Thereafter, the opening of the outer package member 59 is hermetically sealed by a thermal fusion bonding method and/or the like. Subsequently, the separator 55 is closely attached to the cathode 53 and the flame retardant layer 58 with the polymer compound in between. Thus, the polymer compound is impregnated with the electrolytic solution, and the polymer compound is gelated. Accordingly, the electrolyte layer 56 is formed. Also in this procedure, the flame retardant layer 58 is formed by a coating method, a dipping method, a pressurization method, etc. by a procedure similar to the procedure of forming the flame retardant layer 26.

In the third procedure, swollenness of the secondary battery is suppressed more than in the first procedure. Further, in the third procedure, the monomer as a raw material of the polymer compound, the solvent, and the like are less likely to be left in the electrolyte layer 56 compared to in the second procedure. Therefore, the formation step of the polymer compound is favorably controlled. Accordingly, the cathode 53, the anode 54, and the separator 55, and the flame retardant layer 58 are sufficiently and closely attached to the electrolyte layer 56.

[Functions and Effects of Secondary Battery]

According to the laminated-film-type secondary battery described above, the flame retardant layer 58 including the flame retardant material is provided between the cathode 53 and the anode 54, and a portion (the entering portion) of the flame retardant layer 58 enters into the inside of the anode active material layer 54B. Accordingly, it is possible to achieve both favorable battery characteristics and safety due to a function similar to the function of the square-type secondary battery.

Other embodiments related to the square-type secondary battery illustrated in FIGS. 6 to 8 are applicable also to the above-described laminated-film-type secondary battery.

[3-2. Flame Retardant Layer Formed Between Cathode and Separator]

Figure 17:
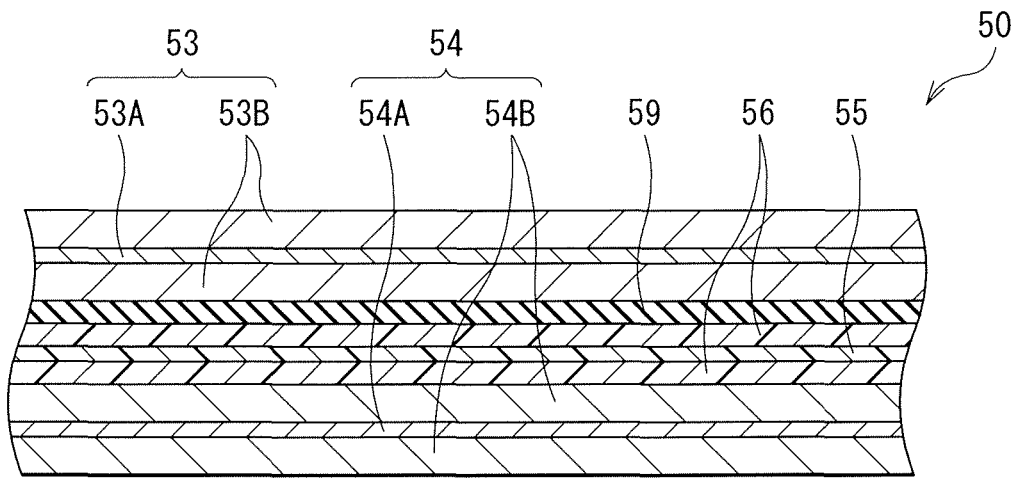
FIG. 17 is a cross-sectional view illustrating another detailed configuration of the spirally wound electrode body illustrated in FIG. 15.

Specifically, as illustrated in FIG. 17 corresponding to FIG. 16, a flame retardant layer 59 formed between the separator 55 and the cathode 53 may be used instead of the flame retardant layer 58 formed between the separator 55 and the anode 54. A configuration and a forming method of the spirally wound electrode body 50 illustrated in FIG. 17 are similar to the configuration and the forming method of the spirally wound electrode body 50 illustrated in FIG. 16 except that the flame retardant layer 58 is not formed between the separator 55 and the anode 54 and the flame retardant layer 59 is formed between the separator 55 and the cathode 53 instead thereof. Specifically, respective configurations of the cathode active material layer 53B and the flame retardant layer 59 are similar to the respective configurations of the anode active material layer 54B and the flame retardant layer 58 described above. Accordingly, a portion (an entering portion) of the flame retardant layer 59 enters into the inside of the cathode active material layer 53B, and a portion of the flame retardant material therefore enters into the inside of the cathode active material layer 53B.

Also in the flame retardant layer 59, a function similar to the function of the flame retardant layer 58 is achieved, and it is therefore possible to achieve both favorable battery characteristics and safety.

[3-3. Flame Retardant Layer Formed Between Anode and Separator and Flame Retardant Layer Formed Between Cathode and Separator]

Figure 18:
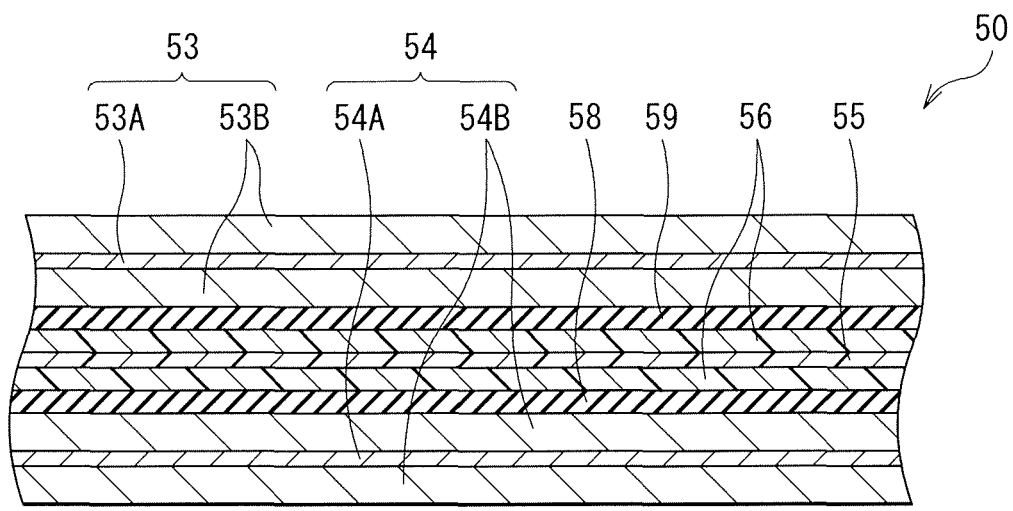
FIG. 18 is a cross-sectional view illustrating still another detailed configuration of the spirally wound electrode body illustrated in FIG. 15.

As illustrated in FIG. 18 corresponding to FIG. 16, the flame retardant layer 59 (the first interlayer) formed between the separator 55 and the cathode 53 may be used in addition to the flame retardant layer 58 (the second interlayer) formed between the separator 55 and the anode 54. A configuration and a forming method of the spirally wound electrode body 50 illustrated in FIG. 18 are similar to the configuration and the forming method of the spirally wound electrode body 50 illustrated in FIG. 16 except that the flame retardant layer 59 is newly formed between the separator 55 and the cathode 53. Specifically, a portion (the entering portion) of the flame retardant layer 58 enters into the inside of the anode active material layer 54B, and a portion of the flame retardant material therefore enters into the inside of the anode active material layer 54B. Also, a portion (an entering portion) of the flame retardant layer 59 enters into the inside of the cathode active material layer 53B, and a portion of the flame retardant material therefore enters into the inside of the cathode active material layer 53B.

In both of the flame retardant layers 58 and 59, the function of suppressing the abnormal incidents, etc. described above are achieved, and occurrence of the abnormal incidents such as thermal runaway is remarkably suppressed, which achieves a higher effect.

[3-4. Electrolyte Layer Formed Between Cathode and Anode (Electrolyte Layer Serving as Flame Retardant Layer)]

Figure 19:
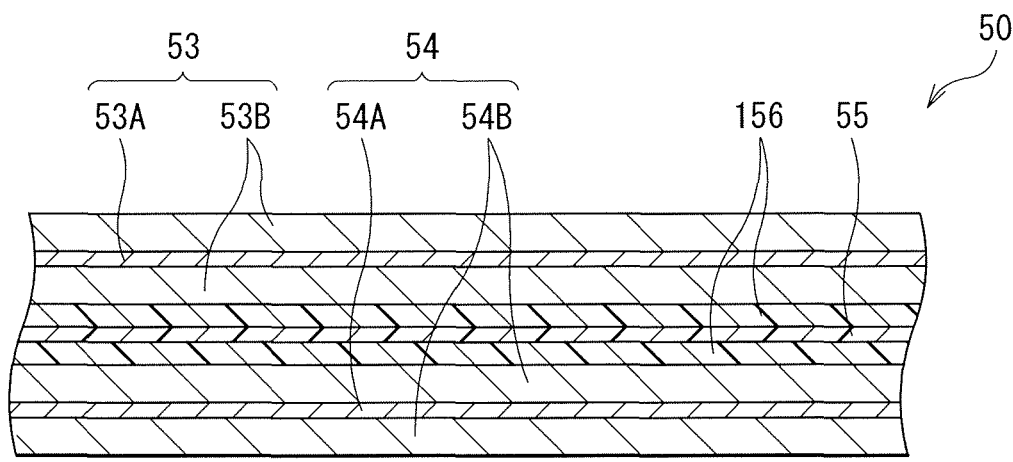
FIG. 19 is a cross-sectional view illustrating still another detailed configuration of the spirally wound electrode body illustrated in FIG. 15.

As illustrated in FIG. 19 corresponding to FIG. 16, an electrolyte layer 156 that serves as a flame retardant layer may be used instead of the electrolyte layer 56 and the flame retardant layer 58. The electrolyte layer 156 also has a function as a flame retardant layer, unlike the electrolyte layer 56 that does not serve as the flame retardant layer.

A configuration and a forming method of the spirally wound electrode body 50 illustrated in FIG. 19 are similar to the configuration and the forming method of the spirally wound electrode body 50 illustrated in FIG. 60 except that the flame retardant layer 58 is not formed and the electrolyte layer 156 is used instead of the electrolyte layer 56. The electrolyte layer 156 is provided between the cathode 53 and the anode 54. More specifically, the electrolyte layer 156 is provided between the separator 55 and the cathode 53, and the electrolyte layer 156 is also provided between the separator 55 and the anode 54. The electrolyte layer 156 has a configuration similar to the configuration of the electrolyte layer 56 except that the electrolyte layer 156 includes one or more of the flame retardant materials described above. The electrolyte layer 156 is formed by a method similar to the method of forming the electrolyte layer 56. In accordance therewith, a portion (an entering portion) of the electrolyte layer 156 that serves as a flame retardant layer enters into the inside of the anode active material layer 42B, and a portion of the flame retardant material therefore enters into the inside of the anode active material layer 42B. Also, a portion (an entering portion) of the electrolyte layer 156 enters into the inside of the cathode active material layer 41B, and a portion of the flame retardant material therefore enters into the inside of the cathode active material layer 41B.

In the electrolyte layer 156, the function of suppressing occurrence of the abnormal incidents described above is achieved, and occurrence of the abnormal incidents such as thermal runaway is therefore remarkably suppressed, which achieves a higher effect. In this case, in particular, merely two layers (the two electrolyte layers 156) are used and four layers (the two electrolyte layers 156 and the flame retardant layers 58 and 59) are not necessary. Accordingly, the configuration of the spirally wound electrode body 50 is simplified, and the thickness of the spirally wound electrode body 50 is reduced.

It is to be noted that, in FIG. 19, two electrolyte layers 156 are provided. However, only one of the two electrolyte layers 156 may be provided where appropriate. A similar effect is achieved also in this case.

Other than above, the separator 55 that includes the flame retardant material, that is, the separator 55 that also has a function as the flame retardant layer may be used as described referring to FIG. 8, when the electrolytic solution is used as it is instead of the gel electrolyte layer 56, which is not specifically illustrated. In this case, a portion (an entering portion) of the separator 55 that serves as the flame retardant layer enters into the inside of each of the cathode active material layer 53B and the anode active material layer 54B, and a portion of the flame retardant material enters into the inside of the cathode active material layer 53B and the anode active material layer 54B. Accordingly, also in this case, a function similar to the function of the flame retardant layers 58 and 59 is achieved, and it is therefore possible to achieve both favorable battery characteristics and safety.

[4. Applications of Secondary Battery]

Next, description is provided of application examples of the foregoing secondary battery.

Applications of the secondary battery are not particularly limited as long as the secondary battery is applied to a machine, a device, an instrument, an apparatus, a system (collective entity of a plurality of devices and the like), or the like that is allowed to use the secondary battery as a driving electric power source, an electric power storage source for electric power accumulation, or the like. The secondary battery used as an electric power source may be a main electric power source (an electric power source used preferentially), or may be an auxiliary electric power source (an electric power source used instead of a main electric power source or used being switched from the main electric power source). In the case where the secondary battery is used as the auxiliary electric power source, the kind of the main electric power source is not limited to the secondary battery.

Examples of applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include a portable lifestyle appliance such as an electric shaver; a storage device such as a backup electric power source and a memory card; an electric power tool such as an electric drill and an electric saw; a battery pack used as an attachable and detachable electric power source of a notebook personal computer or the like; a medical electronic apparatus such as a pacemaker and a hearing aid; an electric vehicle such as an electric automobile (including a hybrid automobile); and an electric power storage system such as a home battery system for accumulating electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, etc. One reason for this is because, in these applications, since superior battery characteristics are demanded, performance is effectively improved with the use of the secondary battery according to the embodiment of the present application. It is to be noted that the battery pack is an electric power source using secondary batteries, and may be a so-called assembled battery or the like. The electric vehicle is a vehicle that works (runs) with the use of a secondary battery as a driving electric power source. As described above, the electric vehicle may be an automobile (such as a hybrid automobile) also including a drive source other than a secondary battery. The electric power storage system is a system using a secondary battery as an electric power storage source. For example, in a home electric power storage system, electric power is accumulated in the secondary battery as an electric power storage source, and therefore, home electric products and the like become usable with the use of the accumulated electric power. The electric power tool is a tool in which a movable section (such as a drill) is moved with the use of a secondary battery as a driving electric power source. The electronic apparatus is an apparatus executing various functions with the use of a secondary battery as a driving electric power source (electric power supply source).

Description is specifically provided of some application examples of the secondary battery. It is to be noted that the configurations of the respective application examples described below are mere examples, and may be changed as appropriate.

[4-1. Battery Pack (Single Battery)]

Figure 20:
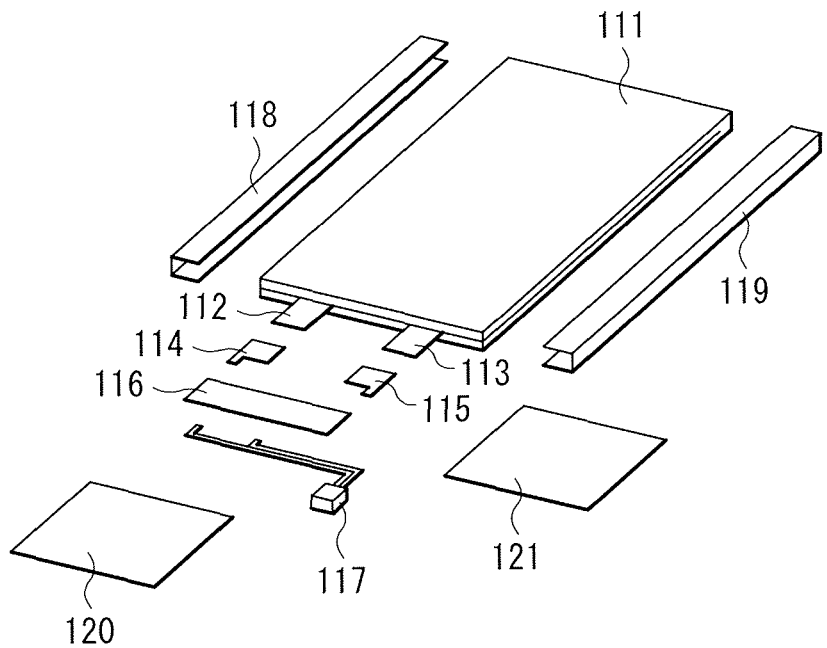
FIG. 20 is a perspective view illustrating a configuration of an application example (a battery pack: a single battery) of the secondary battery.
Figure 21:
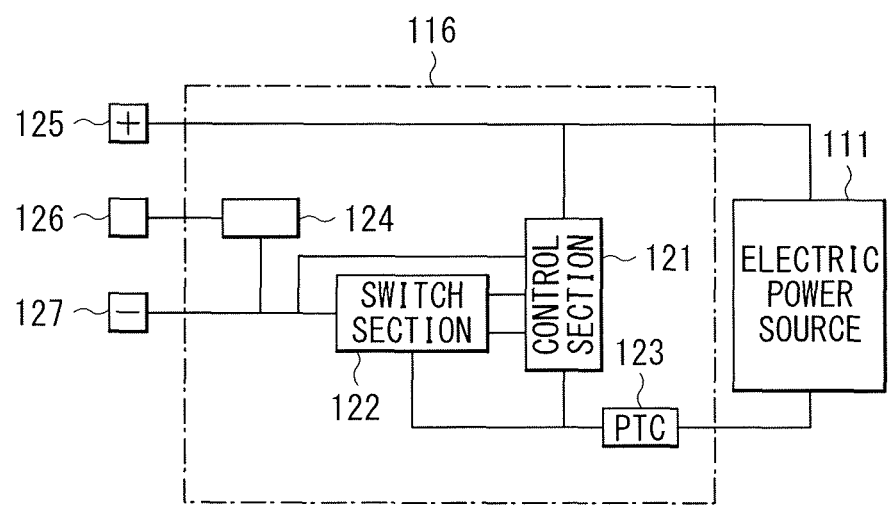
FIG. 21 is a block diagram illustrating the configuration of the battery pack illustrated in FIG. 20.

FIG. 20 illustrates a perspective configuration of a battery pack that uses a single battery. FIG. 21 illustrates a block configuration of the battery pack illustrated in FIG. 20. It is to be noted that FIG. 20 illustrates a decomposed state of the battery pack.

The battery pack described below is a simplified battery pack (a so-called soft pack) that uses one secondary battery, and may be built in an electronic apparatus such as a smartphone, for example. As illustrated in FIG. 20, the battery pack may include, for example, an electric power source 111 configured of a laminated-film-type secondary battery, and a circuit substrate 116 connected to the electric power source 111.

A pair of adhesive tapes 118 and 119 is attached to both side surfaces of the electric power source 111. A protective circuit (PCM: Protection Circuit Module) is formed on the circuit substrate 116. The circuit substrate 116 is connected to a cathode lead 112 and an anode lead 113 of the electric power source 111 with a pair of tabs 114 and 115 in between, and is also connected to a lead line 117 provided with a connector for external connection. It is to be noted that the circuit substrate 116 is protected from the upper and lower sides thereof by a label 120 and an insulating sheet 121, in a state of being connected to the electric power source 111. The circuit substrate 116, the insulating sheet 121, etc. are fixed due to the attachment of the label 120.

Also, the battery pack may include the electric power source 111 and the circuit substrate 116, for example, as illustrated in FIG. 21. The circuit substrate 116 may include, for example, a control section 121, a switch section 122, a PTC 123, and a temperature detection section 124. The electric power source 111 is connectable to the outside via a cathode terminal 125 and an anode terminal 127. The electric power source 111 is therefore charged and discharged via the cathode terminal 125 and the anode terminal 127. The temperature detection section 124 is capable of detecting temperature with the use of a temperature detection terminal (a so-called T terminal) 126.

The control section 121 controls operation of the whole battery pack (including a used state of the electric power source 111), and may include, for example, a central processing unit (CPU), a memory, and/or the like.

For example, when a battery voltage reaches an overcharge detection voltage, the control section 121 may cause the switch section 122 to be disconnected so that a charge current does not flow into a current path of the electric power source 111. Also, for example, when a large current flows at the time of charge operation, the control section 121 may cause the switch section 122 to be disconnected to block the charge current.

Other than the above, for example, when the battery voltage reaches an overdischarge detection voltage, the control section 121 may cause the switch section 122 to be disconnected so that a discharge current does not flow into a current path of the electric power source 111. Also, for example, when a large current flows at the time of discharge operation, the control section 121 may cause the switch section 122 to be disconnected to block the discharge current.

It is to be noted that the overcharge detection voltage of the secondary battery may be, for example, about 4.20±0.05 V, and the overdischarge detection voltage may be, for example, about 2.4±0.1 V.

The switch section 122 switches the used state of the electric power source 111 (whether or not the electric power source 111 is connectable to an external device) according to an instruction of the control section 121. The switch section 121 may include, for example, a charge control switch, a discharge control switch, and the like. The charge control switch and the discharge control switch may each be, for example, a semiconductor switch such as a field-effect transistor (MOSFET) using a metal oxide semiconductor. It is to be noted that the charge and discharge currents may be detected, for example, based on an ON resistance of the switch section 122.

The temperature detection section 124 measures the temperature of the electric power source 111, and outputs the measurement result to the control section 121. The temperature detection section 124 may include, for example, a temperature detection device such as a thermistor. It is to be noted that the measurement result supplied by the temperature detection section 124 may be used in a case where the control section 121 performs charge and discharge control at the time of abnormal heat generation, in a case where the control section 121 performs a correction process at the time of calculating remaining capacity, etc.

It is to be noted that the circuit substrate 116 may not include the PTC 123. In this case, a PTC element may be provided separately on the circuit substrate 116.

[4-2. Battery Pack (Assembled Battery)]

Figure 22:
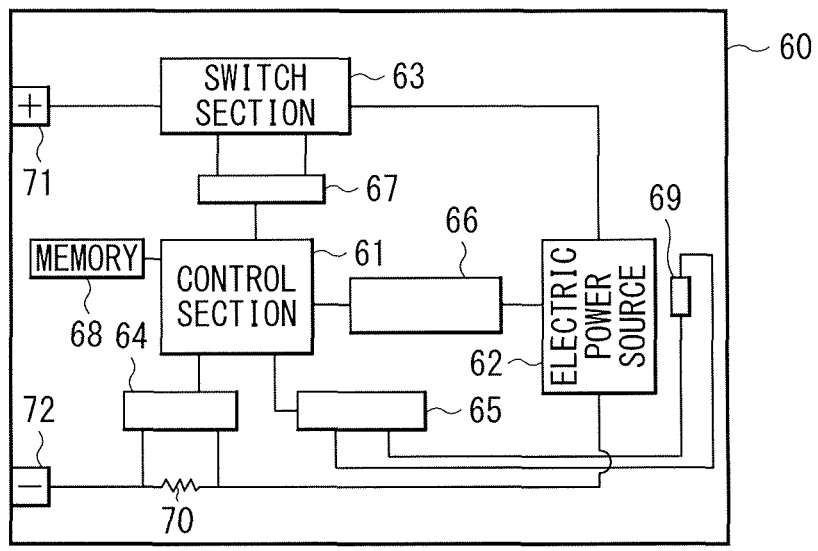
FIG. 22 is a block diagram illustrating a configuration of an application example (a battery pack: an assembled battery) of the secondary battery.

FIG. 22 illustrates a block configuration of a battery pack that uses an assembled battery. For example, the battery pack may include a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 inside a housing 60. The housing 60 may be made, for example, of a plastic material or the like.

The control section 61 controls operation of the whole battery pack (including a used state of the electric power source 62), and may include, for example, a CPU or the like.

The electric power source 62 includes one or more secondary batteries of an embodiment of the present application. The electric power source 62 may be, for example, an assembled battery including two or more secondary batteries. The connection type of the secondary batteries may be a series-connected type, may be a parallel-connected type, or may be a mixed type thereof. To give an example, the electric power source 62 may include six secondary batteries connected in a manner of dual-parallel and three-series.

The switch section 63 switches the used state of the electric power source 62 (whether or not the electric power source 62 is connectable to an external device) according to an instruction of the control section 61. The switch section 63 may include, for example, a charge control switch, a discharge control switch, a charging diode, a discharging diode, and the like (not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures temperature with the use of the temperature detection device 69, and outputs the measurement result to the control section 61. The temperature measurement result may be used, for example, for a case in which the control section 61 controls charge and discharge operations at the time of abnormal heat generation or a case in which the control section 61 performs a correction process at the time of calculating remaining capacity. The voltage detection section 66 measures a voltage of the secondary battery in the electric power source 62, performs analog-to-digital conversion on the measured voltage, and supplies the resultant to the control section 61.

The switch control section 67 controls operations of the switch section 63 according to signals inputted from the current measurement section 64 and the voltage detection section 66.

The switch control section 67 executes control so that a charge current is prevented from flowing in a current path of the electric power source 62 by disconnecting the switch section 63 (a charge control switch) in the case where, for example, the battery voltage reaches an overcharge detection voltage. Accordingly, in the electric power source 62, only discharge operation is allowed to be performed through the discharging diode. It is to be noted that, for example, in the case where a large current flows at the time of charge operation, the switch control section 67 blocks the charge current.

Further, the switch control section 67 causes a discharge current to be prevented from flowing in the current path of the electric power source 62 by disconnecting the switch section 63 (a discharge control switch) in the case where, for example, the battery voltage reaches an overdischarge detection voltage. Accordingly, in the electric power source 62, only charge operation is allowed to be performed through the charging diode. It is to be noted that, for example, in the case where a large current flows at the time of discharge, the switch control section 67 blocks the discharge current.

It is to be noted that, in the secondary battery, for example, the overcharge detection voltage may be about 4.20 V±0.05 V, and the overdischarge detection voltage may be about 2.4 V±0.1 V.

The memory 68 may be, for example, an EEPROM as a non-volatile memory or the like. The memory 68 may store, for example, numerical values calculated by the control section 61 and information of the secondary battery measured in a manufacturing step (such as an internal resistance in the initial state). It is to be noted that, in the case where the memory 68 stores full charge capacity of the secondary battery, the control section 61 is allowed to comprehend information such as remaining capacity.

The temperature detection device 69 measures temperature of the electric power source 62, and outputs the measurement result to the control section 61. The temperature detection device 69 may be, for example, a thermistor or the like.

The cathode terminal 71 and the anode terminal 72 are terminals connected to an external device (such as a notebook personal computer) driven with the use of the battery pack or an external device (such as a battery charger) used for charging the battery pack. The electric power source 62 is charged and discharged through the cathode terminal 71 and the anode terminal 72.

[4-3. Electric Vehicle]

Figure 23:
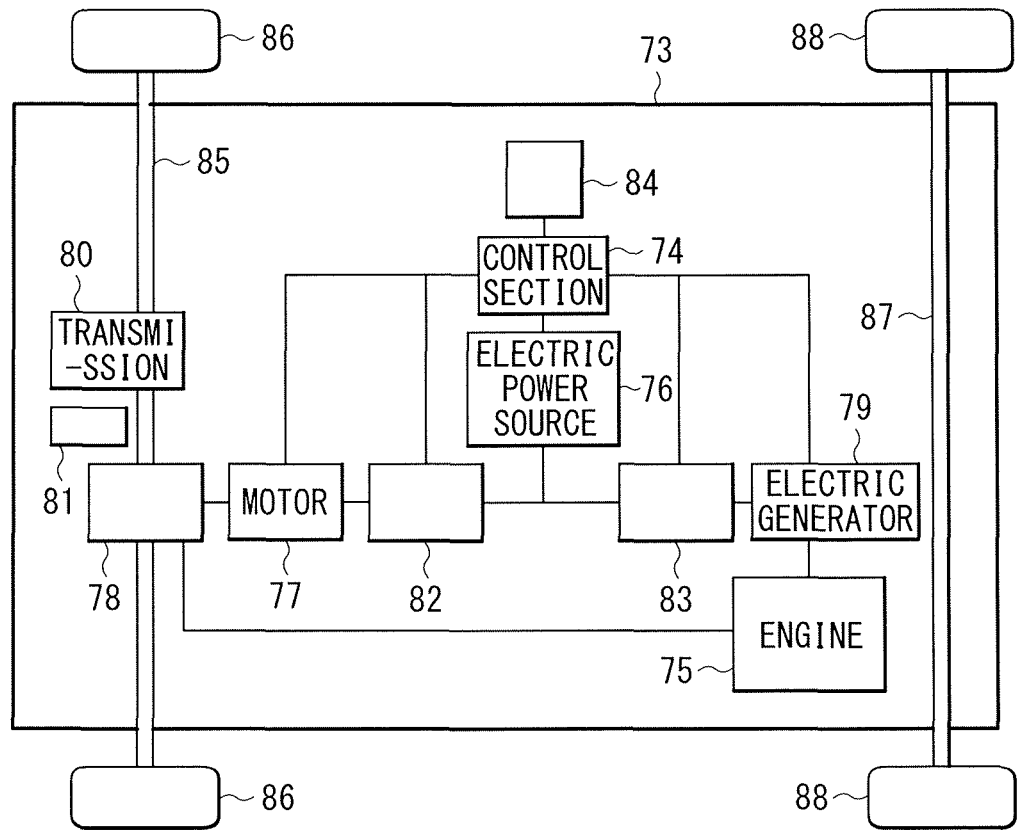
FIG. 23 is a block diagram illustrating a configuration of an application example (an electric vehicle) of the secondary battery.

FIG. 23 illustrates a block configuration of a hybrid automobile as an example of electric vehicles. For example, the electric vehicle may include a control section 74, an engine 75, an electric power source 76, a driving motor 77, a differential 78, an electric generator 79, a transmission 80, a clutch 81, inverters 82 and 83, and various sensors 84 in a housing 73 made of metal. In addition thereto, the electric vehicle may include, for example, a front drive shaft 85 and a front tire 86 that are connected to the differential 78 and the transmission 80, a rear drive shaft 87, and a rear tire 88.

The electric vehicle may run with the use of, for example, one of the engine 75 and the motor 77 as a drive source. The engine 75 is a main power source, and may be, for example, a petrol engine. In the case where the engine 75 is used as a power source, drive power (torque) of the engine 75 may be transferred to the front tire 86 or the rear tire 88 through the differential 78, the transmission 80, and the clutch 81 as drive sections, for example. The torque of the engine 75 may also be transferred to the electric generator 79. With the use of the torque, the electric generator 79 generates alternating-current electric power. The generated alternating-current electric power is converted into direct-current electric power through the inverter 83, and the converted power is accumulated in the electric power source 76. In contrast, in the case where the motor 77 as a conversion section is used as a power source, electric power (direct-current electric power) supplied from the electric power source 76 is converted into alternating-current electric power through the inverter 82. The motor 77 is driven with the use of the alternating-current electric power. Drive power (torque) obtained by converting the electric power by the motor 77 may be transferred to the front tire 86 or the rear tire 88 through the differential 78, the transmission 80, and the clutch 81 as the drive sections, for example.

It is to be noted that, alternatively, the following mechanism may be adopted. In the mechanism, when speed of the electric vehicle is reduced by an unillustrated brake mechanism, the resistance at the time of speed reduction is transferred to the motor 77 as torque, and the motor 77 generates alternating-current electric power by utilizing the torque. It may be preferable that the alternating-current electric power is converted into direct-current electric power through the inverter 82, and the direct-current regenerative electric power is accumulated in the electric power source 76.

The control section 74 controls operations of the whole electric vehicle, and, for example, may include a CPU and/or the like. The electric power source 76 includes one or more secondary batteries of an embodiment of the present application. Alternatively, the electric power source 76 may be connected to an external electric power source, and electric power may be accumulated by receiving the electric power from the external electric power source. The various sensors 84 may be used, for example, for controlling the number of revolutions of the engine 75 or for controlling an opening level (a throttle opening level) of an unillustrated throttle valve. The various sensors 84 may include, for example, a speed sensor, an acceleration sensor, an engine frequency sensor, and/or the like.

The description has been given above of the hybrid automobile as an electric vehicle. However, examples of the electric vehicles may include a vehicle (an electric automobile) that operates with the use of only the electric power source 76 and the motor 77 without using the engine 75.

[4-4. Electric Power Storage System]

Figure 24:
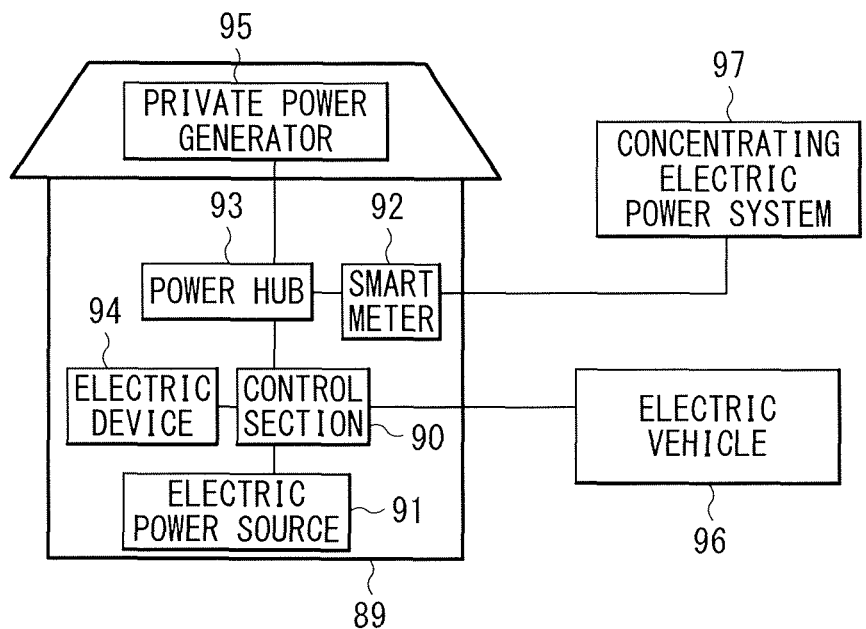
FIG. 24 is a block diagram illustrating a configuration of an application example (an electric power storage system) of the secondary battery.

FIG. 24 illustrates a block configuration of an electric power storage system. For example, the electric power storage system may include a control section 90, an electric power source 91, a smart meter 92, and a power hub 93 inside a house 89 such as a general residence and a commercial building.

In this case, the electric power source 91 may be connected to, for example, an electric device 94 provided inside the house 89, and may be connectable to an electric vehicle 96 parked outside the house 89. Further, for example, the electric power source 91 may be connected to a private power generator 95 provided in the house 89 through the power hub 93, and may be connectable to an external concentrating electric power system 97 through the smart meter 92 and the power hub 93.

It is to be noted that the electric device 94 may include, for example, one or more home electric appliances such as a refrigerator, an air conditioner, a television, and a water heater. The private power generator 95 may be, for example, one or more of a solar power generator, a wind-power generator, and the like. The electric vehicle 96 may be, for example, one or more of an electric automobile, an electric motorcycle, a hybrid automobile, and the like. The concentrating electric power system 97 may be, for example, one or more of a thermal power plant, an atomic power plant, a hydraulic power plant, a wind-power plant, and the like.

The control section 90 controls operation of the whole electric power storage system (including a used state of the electric power source 91), and, for example, may include a CPU and/or the like. The electric power source 91 includes one or more secondary batteries of an embodiment of the present application. The smart meter 92 may be, for example, an electric power meter compatible with a network provided in the house 89 demanding electric power, and may be communicable with an electric power supplier. Accordingly, for example, while the smart meter 92 communicates with outside, the smart meter 92 controls the balance between supply and demand in the house 89, and thereby allows effective and stable energy supply.

In the electric power storage system, for example, electric power may be accumulated in the electric power source 91 from the concentrating electric power system 97 as an external electric power source through the smart meter 92 and the power hub 93, and electric power is accumulated in the electric power source 91 from the private power generator 95 as an independent electric power source through the power hub 93. The electric power accumulated in the electric power source 91 is supplied to the electric device 94 and the electric vehicle 96 according to an instruction of the control section 90. Therefore, the electric device 94 becomes operable, and the electric vehicle 96 becomes chargeable.

That is, the electric power storage system is a system capable of accumulating and supplying electric power in the house 89 with the use of the electric power source 91.

The electric power stored in the electric power source 91 is arbitrarily usable. Therefore, for example, electric power is allowed to be accumulated in the electric power source 91 from the concentrating electric power system 97 in the middle of the night when an electric rate is inexpensive, and the electric power accumulated in the electric power source 91 is allowed to be used during daytime hours when an electric rate is expensive.

It is to be noted that the foregoing electric power storage system may be provided for each household (family unit), or may be provided for a plurality of households (family units).

[4-5. Electric Power Tool]

Figure 25:
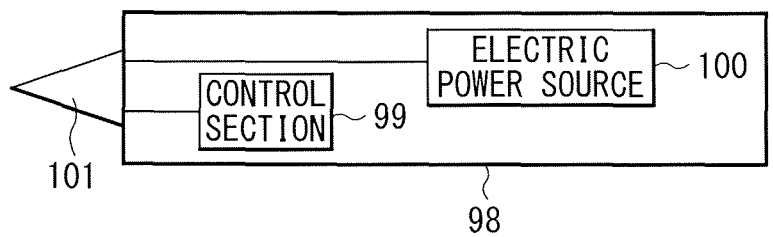
FIG. 25 is a block diagram illustrating a configuration of an application example (an electric power tool) of the secondary battery.

FIG. 25 illustrates a block configuration of an electric power tool. For example, the electric power tool may be an electric drill, and may include a control section 99 and an electric power source 100 in a tool body 98 made of a plastic material and/or the like. For example, a drill section 101 as a movable section may be attached to the tool body 98 in an operable (rotatable) manner.

The control section 99 controls operations of the whole electric power tool (including a used state of the electric power source 100), and may include, for example, a CPU and/or the like. The electric power source 100 includes one or more secondary batteries of an embodiment of the present application. The control section 99 allows electric power to be supplied from the electric power source 100 to the drill section 101 according to operation of an unillustrated operation switch.

EXAMPLES

Specific examples of embodiments of the present application are described in detail.

Examples 1-1 to 1-30

Cylindrical-type secondary batteries (lithium ion secondary batteries) illustrated in FIGS. 9 and 10 were fabricated by the following procedure.

When fabricating the cathode 41, first, 94 parts by mass of a cathode active material ($LiNi_{0.77}Co_{0.20}Al_{0.03}O_2$), 3 parts by mass of a cathode binder (polyvinylidene fluoride), and 3 parts by mass of a cathode electric conductor (graphite) were mixed to obtain a cathode mixture. Subsequently, the cathode mixture was dispersed in an organic solvent (N-methyl-2-pyrrolidone) to obtain cathode mixture slurry. Subsequently, the cathode mixture slurry was applied onto both surfaces of the cathode current collector 41A (a strip-like aluminum foil being 20 μm thick), and the applied cathode mixture slurry was dried to form the cathode active material layers 41B. In this case, the area density of the cathode active material layer 41B on one surface of the cathode current collector 41A was set as 40 mg/cm². Lastly, the cathode active material layer 41B was compression-molded with the use of a roll pressing machine.

When fabricating the anode 42, first, 80 parts by mass of an anode active material (silicon), 8.5 parts by mass of an anode binder (polyvinylidene fluoride), and 11.5 parts by mass of an anode conductor (graphite) were mixed to obtain an anode mixture. Subsequently, the anode mixture was dispersed in an organic solvent (N-methyl-2-pyrrolidone) to obtain anode mixture slurry. Subsequently, the anode mixture slurry was applied onto both surfaces of the anode current collector 42A (a strip-like copper foil being 15 μm thick), and the applied anode mixture slurry was dried to form the anode active material layers 42B. In this case, the area density of the anode active material layer 42B on one surface of the anode current collector 42A was set as 6 mg/cm². Lastly, the anode active material layers 42B were compression-molded with the use of a roll pressing machine.

When preparing the electrolytic solution, electrolyte salt ($LiPF_6$) was dissolved in a solvent (ethylene carbonate and dimethyl carbonate). In this case, a composition of the solvent was set as ethylene carbonate:dimethyl carbonate=50:50 in weight ratio, and a content of the electrolyte salt with respect to the entire solvent was set as 1 mol/kg.

When assembling the secondary battery, first, the cathode lead 45 made of aluminum was welded to the cathode current collector 41A, and the anode lead 46 made of nickel was welded to the anode current collector 42A. Subsequently, the cathode 41 and the anode 42 were laminated with the separator 43 (a polyethylene film being 5 μm thick) and the flame retardant layer 47 in between and were spirally wound to fabricate the spirally wound electrode body 40. Thereafter, the center pin 44 was inserted in the center of the spirally wound electrode body 40. Subsequently, the spirally wound electrode body 40 was contained inside the battery can 31 while being sandwiched by the pair of insulating plates 32 and 33. In this case, the tip end of the cathode lead 45 was welded to the safety valve mechanism 35, and the tip end of the anode lead 46 was welded to the battery can 31. Subsequently, the electrolytic solution was injected inside the battery can 31, and the spirally wound electrode body 40 was impregnated with the electric solution. Lastly, the battery cover 34, the safety valve mechanism 35, and the PTC device 36 were swaged at the open end of the battery can 31 by the gasket 37.

When fabricating the secondary battery, the flame retardant layer 47 was formed by the following procedure.

When forming the flame retardant layer 47 by a coating method, first, 50 parts by mass of the flame retardant material and 5 parts by mass of the polymer compound (polyvinylidene fluoride) were mixed, and the mixture was dispersed into an organic solvent (N-methyl-2-pyrrolidone) to obtain flame retardant agent slurry. As the flame retardant materials, ammonium polyphosphate (PPA), melamine cyanurate (MC), melamine polyphosphate (PPM), melamine (MEL), the melamine derivative (MMEL) represented by Formula (1-1), aluminum hydroxide ($Al(OH)_3$), magnesium hydroxide ($Mg(OH)_2$), boehmite ($Al_2O_3 \cdot H_2O$), and talc (TAL) were used. It is to be noted that two kinds of the flame retardant materials (PPA+MC) were mixed as necessary. In this case, the mixture ratio was set as PPA:MC=50:50 in weight ratio. Subsequently, the flame retardant agent slurry was applied onto the surface of the anode 42 (the anode active material layer 42B) with the use of a bar coater, and the applied flame retardant agent slurry was dried to form the flame retardant layer 47. In this case, a thickness of the flame retardant layer 47 was set as 10 μm.

The procedure for forming the flame retardant layer 47 by a pressurization method is as follows. First, the flame retardant agent slurry was applied onto the separator 43 instead of the anode 42 to form the flame retardant layer 47. Thereafter, the formed flame retardant layer 47 was pressurized onto the surface of the anode 42. Secondly, the separator 43 containing the flame retardant material therein was prepared, and the prepared separator 43 was pressurized onto the surface of the anode 42. In this case, the flame retardant material was added to a formation material (polyethylene described later) of the separator 43 in a formation step thereof. Thirdly, the flame retardant layer 47 that had been shaped into a sheet-like shape in advance was prepared, and the prepared flame retardant layer 47 was pressurized onto the surface of the anode 42. A pressure at the time of the pressurization was set as 5 MPa. In this case, the flame retardant agent slurry was applied onto the surface of the supporting plate, and the applied flame retardant agent slurry was dried to form the flame retardant layer 47. Thereafter, the formed flame retardant layer 47 was peeled off from the supporting plate. The details of the pressurization method (hydraulic press) were as described above.

For comparison, the flame retardant layer 47 was not formed in one example. Also, instead of forming the flame retardant layer 47, the flame retardant material was contained in one of the cathode mixture, the anode mixture, and the electrolytic solution in some examples.

Other than above, for comparison, aluminum oxide ($Al_2O_3$) was used to form the flame retardant layer 47 in some examples. Also, the flame retardant layer 47 was formed by the procedure similar to the procedure in the case of using the pressurization method described above (using three kinds of procedures) except that the pressurization was not performed in some examples.

Initial charge-discharge characteristics, discharge capacity characteristics, and cycle characteristics were examined as battery characteristics of the secondary battery, and high-temperature tolerance was examined as safety. Accordingly, results shown in Tables 1 and 2 were obtained.

When examining the initial charge-discharge characteristics, first, in order to stabilize a battery state, the secondary battery was charged and discharged for 1 cycle under an ambient temperature environment (23 deg C.). Subsequently, the secondary battery was charged for another cycle under the same environment and charge capacity (mAh) was measured. Thereafter, the secondary battery was discharged and discharge capacity (mAh) was measured. Based on these results, initial efficiency (%)=(discharge capacity at the 2nd cycle/charge capacity at the 2nd cycle)×100 was calculated. At the time of charge operation, the secondary battery was charged at a constant current and a constant voltage where the current was set as 0.2 C and the upper limit voltage was set as 4.2 V. At the time of discharge operation, the secondary battery was discharged at a constant current where the current was set as 0.2 C and the final voltage was set as 2.7 V. "0.2 C" is a value of a current by which the battery capacity (theoretical capacity) is completely discharged in 5 hours.

When examining the discharge capacity characteristics, the discharge capacity (mAh) at the 2nd cycle described above was measured.

When examining the cycle characteristics, the secondary battery having a battery state that had been stabilized by the above-described procedure was charged and discharged under an ambient temperature environment (23 deg C.), and the discharge capacity was measured. Subsequently, the secondary battery was charged and discharged under the same environment until the total number of cycles (the number of charge and discharge) reached 300, and the discharge capacity was measured. Based on these results, capacity retention rate (%)=(discharge capacity at the 300th cycle/discharge capacity at the 2nd cycle)×100 was calculated. The charge and discharge conditions were similar to those in the case of examining the initial charge-discharge characteristics.

When examining the high-temperature tolerance, the secondary battery having a battery state that had been stabilized by the above-described procedure was charged, and then, the charged secondary battery was placed into a constant temperature bath. Subsequently, the temperature in the constant temperature bath was increased, and the increased temperature was maintained for 1 hour to observe the state (occurrence or non-occurrence of ignition and explosion) of the secondary battery. When the secondary battery state was not changed, the temperature in the constant temperature bath was increased by 5 deg C. and observation was made again. This procedure was performed repeatedly to examine a limit temperature (highest temperature: deg C.) for not causing a change in the secondary battery state.

A cross-section of the anode 42 was observed with the use of SEM to examine whether or not a portion of the flame retardant layer 47 entered into the inside of the anode active material layer 42B (whether or not an entering portion was present). Results thereof are also shown in Tables 1 and 2.

TABLE 1

Battery structure: Cylindrical type

| | Flame retardant layer | | | | | Initial effi-ciency (%) | Discharge capacity (mAh) | Capacity retention rate (%) | Highest temperature (deg C.) |
|---|---|---|---|---|---|---|---|---|---|
| Example | Kind | Formation place | Forming method | Thickness (μm) | Entering portion | | | | |
| 1-1 | PPA | Surface of anode | Application onto anode | 10 | Observed | 84 | 1051 | 72 | 135 |
| 1-2 | MC | Surface of anode | Application onto anode | 10 | Observed | 84 | 1050 | 72 | 140 |
| 1-3 | PPA + MC | Surface of anode | Application onto anode | 10 | Observed | 84 | 1050 | 72 | 140 |
| 1-4 | PPM | Surface of anode | Application onto anode | 10 | Observed | 84 | 1052 | 72 | 145 |
| 1-5 | MEL | Surface of anode | Application onto anode | 10 | Observed | 84 | 1051 | 72 | 135 |
| 1-6 | MMEL | Surface of anode | Application onto anode | 10 | Observed | 84 | 1051 | 72 | 135 |
| 1-7 | PPA | Surface of separator | Application onto separator + Pressurization on anode | 10 | Observed | 84 | 1048 | 71 | 140 |
| 1-8 | PPA | Inside separator | Contained in separator + Pressurization on anode | — | Observed | 84 | 1049 | 71 | 140 |
| 1-9 | PPA | Separately provided | Use of sheet + Pressurization on anode | 10 | Observed | 84 | 1048 | 71 | 140 |
| 1-10 | $Al(OH)_3$ | Surface of anode | Application onto anode | 10 | Observed | 85 | 1048 | 74 | 140 |
| 1-11 | $Al(OH)_3$ | Surface of separator | Application onto separator + Pressurization on anode | 10 | Observed | 85 | 1048 | 74 | 145 |
| 1-12 | $Al_2O_3 \cdot H_2O$ | Surface of anode | Application onto anode | 10 | Observed | 87 | 1052 | 76 | 145 |
| 1-13 | $Al_2O_3 \cdot H_2O$ | Surface of separator | Application onto separator + Pressurization on anode | 10 | Observed | 87 | 1052 | 76 | 150 |
| 1-14 | $Mg(OH)_2$ | Surface of anode | Application onto anode | 10 | Observed | 86 | 1050 | 75 | 140 |

TABLE 1-continued

Battery structure: Cylindrical type

| Example | Flame retardant layer | | | | | Initial effi-ciency (%) | Discharge capacity (mAh) | Capacity retention rate (%) | Highest temperature (deg C.) |
|---|---|---|---|---|---|---|---|---|---|
| | Kind | Formation place | Forming method | Thickness (μm) | Entering portion | | | | |
| 1-15 | Mg(OH)$_2$ | Surface of separator | Application onto separator + Pressurization on anode | 10 | Observed | 86 | 1050 | 75 | 145 |
| 1-16 | TAL | Surface of anode | Application onto anode | 10 | Observed | 87 | 1052 | 76 | 145 |
| 1-17 | TAL | Surface of separator | Application onto separator + Pressurization on anode | 10 | Observed | 87 | 1052 | 76 | 150 |

TABLE 2

Battery structure: Cylindrical type

| Example | Flame retardant layer | | | | | Initial effi-ciency (%) | Discharge capacity (mAh) | Capacity retention rate (%) | Highest temperature (deg C.) |
|---|---|---|---|---|---|---|---|---|---|
| | Kind | Formation place | Forming method | Thickness (μm) | Entering portion | | | | |
| 1-18 | — | — | — | — | — | 85 | 1054 | 74 | 120 |
| 1-19 | PPA | — | Contained in cathode mixture | — | Not observed | 85 | 988 | 74 | 120 |
| 1-20 | PPA | — | Contained in anode mixture | — | Not observed | 84 | 989 | 73 | 120 |
| 1-21 | PPA | — | Contained in electrolytic solution | — | Not observed | 85 | 1054 | 74 | 120 |
| 1-22 | PPA | Surface of separator | Application onto separator | 10 | Not observed | 85 | 990 | 72 | 125 |
| 1-23 | PPA | Inside separator | Contained in separator | — | Not observed | 84 | 1054 | 70 | 125 |
| 1-24 | PPA | Separately provided | Use of sheet | 10 | Not observed | 85 | 990 | 70 | 120 |
| 1-25 | Al(OH)$_3$ | Surface of separator | Application onto separator | 10 | Not observed | 85 | 1048 | 75 | 120 |
| 1-26 | Al$_2$O$_3$•H$_2$O | Surface of separator | Application onto separator | 10 | Not observed | 87 | 1052 | 76 | 120 |
| 1-27 | Mg(OH)$_2$ | Surface of separator | Application onto separator | 10 | Not observed | 86 | 1050 | 75 | 120 |
| 1-28 | TAL | Surface of separator | Application onto separator | 10 | Not observed | 87 | 1052 | 76 | 120 |
| 1-29 | Al$_2$O$_3$ | Surface of separator | Application onto separator + Pressurization on anode | 10 | Observed | 85 | 1046 | 60 | 120 |
| 1-30 | Al$_2$O$_3$ | Surface of separator | Application onto separator | 10 | Not observed | 85 | 1046 | 60 | 120 |

Battery characteristics and safety were largely varied depending on presence or absence of the flame retardant layer 47 and the configuration thereof. The results (initial efficiency, discharge capacity, capacity retention rate, and highest temperature) of the case (Example 1-18) where the flame retardant layer 47 was not formed are used as a comparison reference below.

In the cases (Examples 1-22 to 1-28) where the flame retardant layer 47 included the flame retardant material but a portion of the flame retardant layer 47 did not enter into the inside of the anode active material layer 42B, the initial efficiency was about the same, the highest temperature was slightly increased in some cases, but the discharge capacity and the capacity retention rate were decreased in most of the cases, compared to the above-mentioned reference.

In the cases (Examples 1-19 to 1-21) where the flame retardant layer 47 was not formed and the flame retardant material was contained in the cathode mixture or the like, some of the initial efficiency, the discharge capacity, the capacity retention rate, and the highest temperature were about the same or higher but the rest thereof was decreased, compared to the above-mentioned reference.

In the cases (Examples 1-29 and 1-30) where aluminum oxide was used, the aluminum oxide did not intrinsically have flame retardant properties, and the flame retardant layer 47 was therefore not capable of exhibiting the function of suppressing occurrence of the abnormal incidents such as thermal runaway. Accordingly, battery characteristics and safety were not varied depending on presence or absence of the flame retardant layer 47 or on presence or absence of the entering portion.

On the other hand, in the cases (Examples 1-1 to 1-17) where the flame retardant layer 47 contained the flame retardant material and a portion of the flame retardant layer 47 entered into the inside of the anode active material layer 42B, the initial efficiency, the discharge capacity, and the capacity retention rate were slightly decreased in some cases but the highest temperature was largely increased, compared to the above-described reference. This result shows that, when a portion of the flame retardant layer 47 containing the flame retardant material enters into the inside of the anode active material layer 42B, the highest temperature is remarkably increased while decrease in the initial efficiency, the discharge capacity, and the capacity retention rate is suppressed to the minimum.

Examples 2-1 to 2-5

As shown in Table 3, secondary batteries were fabricated by a similar procedure except that the thickness of the flame retardant layer 47 was changed, and battery characteristics and safety were examined.

this case, the total area density of the anode active material layers 54B on both surfaces of the anode current collector 54A was set as 16 mg/cm2. Lastly, the anode active material layers 54B were compression-molded with the use of a roll pressing machine.

When forming the electrolyte layer 156 by a coating method, first, the electrolyte salt (LiPF6) was dissolved into a solvent (ethylene carbonate and propylene carbonate) to prepare electrolytic solution. In this case, the composition of

TABLE 3

Battery structure: Cylindrical type

| | | Flame retardant layer | | | | Initial effi- ciency (%) | Discharge capacity (mAh) | Capacity retention rate (%) | Highest temper- ature (deg C.) |
|---|---|---|---|---|---|---|---|---|---|
| Example | Kind | Formation place | Forming method | Thickness (μm) | Entering portion | | | | |
| 2-1 | PPA | Surface of anode | Application onto anode | 0.5 | Observed | 88 | 1055 | 76 | 130 |
| 2-2 | | | | 1 | | 86 | 1052 | 74 | 130 |
| 1-1 | | | | 10 | | 84 | 1051 | 72 | 135 |
| 2-3 | | | | 20 | | 82 | 1042 | 70 | 135 |
| 2-4 | | | | 30 | | 81 | 1040 | 68 | 135 |
| 2-5 | | | | 50 | | 80 | 1038 | 66 | 135 |
| 1-18 | — | — | — | — | — | 85 | 1054 | 74 | 120 |

Results similar to those shown in Tables 1 and 2 were obtained also in the case (Table 3) where the thickness of the flame retardant layer 47 was changed. Specifically, the initial efficiency, the discharge capacity, and the capacity retention rate were slightly decreased but the highest temperature was largely increased in the cases (Examples 2-1 to 2-5) where the flame retardant layer 47 contained the flame retardant material and a portion of the flame retardant layer 47 entered into the inside of the anode active material layer 42B.

Examples 3-1 to 3-30

The laminated-film-type secondary batteries (lithium ion secondary batteries) illustrated in FIGS. 14, 15, and 19 were fabricated by the following procedure.

When fabricating the cathode 53, first, 91 parts by mass of a cathode active material (LiCoO2), 3 parts by mass of a cathode binder (polyvinylidene fluoride), and 6 parts by mass of a cathode electric conductor (graphite) were mixed to obtain a cathode mixture. Subsequently, the cathode mixture was dispersed in an organic solvent (N-methyl-2-pyrrolidone) to obtain cathode mixture slurry. Subsequently, the cathode mixture slurry was applied onto both surfaces of the cathode current collector 53A (a strip-like aluminum foil being 20 μm thick), and the applied cathode mixture slurry was dried to form the cathode active material layers 53B. In this case, the total area density of the cathode active material layers 53B on both surfaces of the cathode current collector 53A was set as 30 mg/cm2. Lastly, the cathode active material layers 53B were compression-molded with the use of a roll pressing machine.

When fabricating the anode 54, first, 90 parts by mass of an anode active material (artificial graphite) and 10 parts by mass of an anode binder (polyvinylidene fluoride) were mixed to obtain an anode mixture. Subsequently, the anode mixture was dispersed in an organic solvent (N-methyl-2-pyrrolidone) to obtain anode mixture slurry. Subsequently, the anode mixture slurry was applied onto both surfaces of the anode current collector 54A (a strip-like copper foil being 10 μm thick), and the applied anode mixture slurry was dried to form the anode active material layers 54B. In the solvent was set as ethylene carbonate:propylene carbonate=60:40 and the content of the electrolyte salt was set as 0.8 mol/kg. Subsequently, 90 parts by mass of the electrolytic solution and 10 parts by mass of the polymer compound (a copolymer of vinylidene fluoride and hexafluoropropylene) were mixed, and the flame retardant material was added to the mixture. In this case, the polymerization ratio of vinylidene fluoride and hexafluoropropylene was set as vinylidene fluoride:hexafluoropropylene=93.1:6.9 in weight ratio. The kind and the content (wt %) of the flame retardant material were as shown in Tables 4 and 5. Subsequently, an organic solvent (dimethyl carbonate) was added to the mixture to prepare precursor solution. In this case, the viscosity of the precursor solution was set as 50 mPa·s. Subsequently, the precursor solution was applied onto the surface of each of the cathode 53 (the cathode active material layer 53B) and the anode 54 (the anode active material layer 54B) with the use of a bar coater. Thereafter, the applied precursor solution was dried to form the electrolyte layer 156 which is a gel electrolyte that includes the flame retardant material. In this case, the thickness of the electrolyte layer 156 was set as 10 μm. Subsequently, the cathode lead 51 made of aluminum was welded to the cathode current collector 53A, and the anode lead 52 made of nickel was welded to the anode current collector 54A. Subsequently, the cathode 53 and the anode 54 were laminated with the separator 55 and the electrolyte layer 156 in between, which was spirally wound to fabricate the spirally wound electrode body 50. Thereafter, the protective tape 57 was attached to the outermost periphery of the fabricated spirally wound electrode body 50. Subsequently, the spirally wound electrode body 50 was sandwiched between the two film-like outer package members 59. Thereafter, the outer edges of the outer package members 59 were thermally bonded, and the spirally wound electrode body 50 was thereby enclosed inside the outer package member 59. In this case, the close-attachment film 58 (a polyethylene film) was inserted between the cathode lead 51 and the outer package member 59 and between the anode lead 52 and the outer package member 59.

It is to be noted that, for comparison, the method of forming the electrolyte layer 156, etc. were changed as shown in Table 5 as in the case of fabricating the cylindrical-type secondary battery.

Initial charge-discharge characteristics, discharge capacity characteristics, and cycle characteristics were examined as battery characteristics of the secondary battery, and a state at the time of short circuit was examined as safety. Accordingly, results shown in Tables 4 and 5 were obtained.

A procedure of examining the initial charge-discharge characteristics, the discharge capacity characteristics, and the cycle characteristics were similar to those in the case of examining the cylindrical-type secondary battery.

When examining the circumstance at the time of short circuit, short circuit was caused outside the secondary battery, and then, the highest value of the surface temperature (deg C.) of the secondary battery was measured. In this case, it was examined whether or not the outer package member 59 was cleaved and gas eruption was caused by the pyrolysis reaction in the secondary battery.

TABLE 4

| | Battery structure: Laminated film type | | | | | | | | | |
|---|---|---|---|---|---|---|---|---|---|---|
| | Electrolyte layer (Flame retardant layer) | | | | | Initial effi-ciency (%) | Discharge capacity (mAh) | Capacity retention rate (%) | Surface temper-ature (deg C.) | Gas eruption |
| Example | Kind | Content (wt %) | Formation place | Forming method | Entering portion | | | | | |
| 3-1 | PPA | 10 | Surfaces of cathode and anode | Application onto cathode and anode | Observed | 90 | 1026 | 85 | 75 | Not observed |
| 3-2 | MC | 10 | Surfaces of cathode and anode | Application onto cathode and anode | Observed | 90 | 1027 | 85 | 70 | Not observed |
| 3-3 | PPA + MC | 10 | Surfaces of cathode and anode | Application onto cathode and anode | Observed | 89 | 1026 | 84 | 72 | Not observed |
| 3-4 | PPM | 10 | Surfaces of cathode and anode | Application onto cathode and anode | Observed | 90 | 1026 | 82 | 62 | Not observed |
| 3-5 | MEL | 10 | Surfaces of cathode and anode | Application onto cathode and anode | Observed | 90 | 1026 | 82 | 70 | Not observed |
| 3-6 | MMEL | 10 | Surfaces of cathode and anode | Application onto cathode and anode | Observed | 90 | 1026 | 81 | 70 | Not observed |
| 3-7 | PPA | 10 | Surface of separator | Application onto separator + Pressurization on cathode and anode | Observed | 90 | 1024 | 81 | 70 | Not observed |
| 3-8 | PPA | 10 | Inside separator | Contained in separator + Pressurization on cathode and anode | Observed | 90 | 1024 | 81 | 70 | Not observed |
| 3-9 | PPA | 10 | Separately provided | Use of sheet + Pressurization on cathode and anode | Observed | 90 | 1024 | 81 | 70 | Not observed |
| 3-10 | Al(OH)$_3$ | 10 | Surfaces of cathode and anode | Application onto cathode and anode | Observed | 88 | 1026 | 85 | 66 | Not observed |
| 3-11 | Al(OH)$_3$ | 10 | Surface of separator | Application onto separator + Pressurization on cathode and anode | Observed | 88 | 1026 | 85 | 61 | Not observed |
| 3-12 | Al$_2$O$_3$•H$_2$O | 10 | Surfaces of cathode and anode | Application onto cathode and anode | Observed | 90 | 1030 | 90 | 60 | Not observed |
| 3-13 | Al$_2$O$_3$•H$_2$O | 10 | Surface of separator | Application onto separator + Pressurization on cathode and anode | Observed | 90 | 1030 | 90 | 55 | Not observed |
| 3-14 | Mg(OH)$_2$ | 10 | Surfaces of cathode and anode | Application onto cathode and anode | Observed | 89 | 1028 | 87 | 63 | Not observed |
| 3-15 | Mg(OH)$_2$ | 10 | Surface of separator | Application onto separator + Pressurization on cathode and anode | Observed | 89 | 1028 | 87 | 58 | Not observed |
| 3-16 | TAL | 10 | Surfaces of cathode and anode | Application onto cathode and anode | Observed | 90 | 1030 | 90 | 60 | Not observed |
| 3-17 | TAL | 10 | Surface of separator | Application onto separator + Pressurization on cathode and anode | Observed | 89 | 1030 | 90 | 55 | Not observed |

TABLE 5

Battery structure: Laminated film type

| Example | Electrolyte layer (Flame retardant layer) | | | | Entering portion | Initial efficiency (%) | Discharge capacity (mAh) | Capacity retention rate (%) | Surface temperature (deg C.) | Gas eruption |
|---|---|---|---|---|---|---|---|---|---|---|
| | Kind | Content (wt %) | Formation place | Forming method | | | | | | |
| 3-18 | — | — | — | — | — | 91 | 1048 | 85 | 500 | Observed |
| 3-19 | PPA | — | — | Contained in cathode mixture | Not observed | 88 | 989 | 85 | 500 | Observed |
| 3-20 | PPA | — | — | Contained in anode mixture | Not observed | 88 | 990 | 84 | 500 | Observed |
| 3-21 | PPA | — | — | Contained in electrolytic solution | Not observed | 89 | 1050 | 85 | 500 | Observed |
| 3-22 | PPA | 10 | Surface of separator | Application onto separator | Not observed | 89 | 992 | 83 | 500 | Observed |
| 3-23 | PPA | 10 | Inside separator | Contained in separator | Not observed | 89 | 1050 | 81 | 500 | Observed |
| 3-24 | PPA | 10 | Separately provided | Use of sheet | Not observed | 89 | 991 | 85 | 500 | Observed |
| 3-25 | $Al(OH)_3$ | 10 | Surface of separator | Application onto separator | Not observed | 85 | 1048 | 85 | 500 | Observed |
| 3-26 | $Al_2O_3 \cdot H_2O$ | 10 | Surface of separator | Application onto separator | Not observed | 90 | 1030 | 90 | 500 | Observed |
| 3-27 | $Mg(OH)_2$ | 10 | Surface of separator | Application onto separator | Not observed | 89 | 1028 | 87 | 500 | Observed |
| 3-28 | TAL | 10 | Surface of separator | Application onto separator | Not observed | 89 | 1030 | 90 | 500 | Observed |
| 3-29 | $Al_2O_3$ | 10 | Surfaces of cathode and anode | Application onto cathode and anode | Observed | 85 | 1046 | 75 | 500 | Observed |
| 3-30 | $Al_2O_3$ | 10 | Surfaces of cathode and anode | Application onto cathode and anode | Not observed | 85 | 1046 | 75 | 500 | Observed |

Results similar to those of the cylindrical-type secondary battery (Tables 1 and 2) that uses the flame retardant layer 47 containing the flame retardant material were obtained also in the laminated-film-type secondary battery (Tables 4 and 5) that uses the electrolyte layer 156 containing the flame retardant material.

In detail, the results (initial efficiency, discharge capacity, capacity retention rate, surface temperature, and gas eruption) of the case (Example 3-18) where the electrolyte layer 156 is not formed was used as a comparison reference.

In the cases (Examples 3-22 to 3-28) where the electrolyte layer 156 contained the flame retardant material but a portion of the electrolyte layer 156 did not enter into the inside of the anode active material layer 54B, the surface temperature was about the same, but the initial efficiency was decreased in all of the cases, and the discharge capacity and the capacity retention rate were decreased in some cases.

In the cases (Examples 3-19 to 3-21) where the electrolyte layer 156 was not formed and the flame retardant material was contained in the cathode mixture or the like, some of the initial efficiency, the discharge capacity, the capacity retention rate, and the surface temperature were almost the same or higher, but the rest was decreased.

Moreover, in the series of cases mentioned above, radical pyrolysis reaction was caused inside the secondary battery in all of the cases, and gas eruption was therefore caused.

In the cases (Examples 3-29 and 3-30) where aluminum oxide was used, battery characteristics and safety were not varied depending on presence or absence of the electrolyte layer 156 and presence or absence of the entering portion.

On the other hand, in the cases (Examples 3-1 to 3-17) where the electrolyte layer 156 contained the flame retardant material, and a portion of the electrolyte layer 156 entered into the inside of the anode active material layer 53B, the initial efficiency, the discharge capacity, the capacity retention rate were slightly decreased but the surface temperature was largely decreased. Further, little pyrolysis reaction was caused inside the secondary battery, and gas eruption was therefore not caused. This result shows that, when a portion of the electrolyte layer 156 that contains the flame retardant material enters into the inside of the anode active material layer 53B, the surface temperature was largely decreased and the occurrence of gas eruption was suppressed while decrease in the initial efficiency, the discharge capacity, and the capacity retention rate was suppressed to the minimum.

Examples 4-1 to 4-6

As shown in Table 6, the secondary batteries were fabricated by a similar procedure except that the content (wt %) of the flame retardant material in the electrolyte layer 156 was changed, and battery characteristics and safety were examined.

TABLE 6

Battery structure: Laminated film type

| Example | Electrolyte layer (Flame retardant layer) | | | | Entering portion | Initial efficiency (%) | Discharge capacity (mAh) | Capacity retention rate (%) | Surface temperature (deg C.) | Gas eruption |
|---|---|---|---|---|---|---|---|---|---|---|
| | Kind | Content (wt %) | Formation place | Forming method | | | | | | |
| 4-1 | PPM | 1 | Surfaces of cathode and anode | Application onto cathode and anode | Observed | 84 | 1026 | 85 | 75 | Not observed |

TABLE 6-continued

Battery structure: Laminated film type

| | Electrolyte layer (Flame retardant layer) | | | | | Initial effi-ciency (%) | Discharge capacity (mAh) | Capacity retention rate (%) | Surface temper-ature (deg C.) | Gas eruption |
|---|---|---|---|---|---|---|---|---|---|---|
| Example | Kind | Content (wt %) | Formation place | Forming method | Entering portion | | | | | |
| 4-2 | | 2 | | | | 84 | 1026 | 84 | 69 | Not observed |
| 4-3 | | 5 | | | | 84 | 1026 | 83 | 63 | Not observed |
| 3-4 | | 10 | | | | 90 | 1026 | 82 | 62 | Not observed |
| 4-4 | | 20 | | | | 84 | 1026 | 81 | 61 | Not observed |
| 4-5 | | 30 | | | | 84 | 1026 | 80 | 60 | Not observed |
| 4-6 | | 50 | | | | 84 | 1026 | 79 | 58 | Not observed |
| 3-18 | — | — | — | — | — | 91 | 1048 | 85 | 500 | Observed |

Results similar to those shown in Tables 4 and 5 were obtained also in the case (Table 6) where the content of the flame retardant material in the electrolyte layer 156 was changed. Specifically, in the cases (Examples 4-1 to 4-6) where the electrolyte layer 156 contained the flame retardant material and a portion of the electrolyte layer 156 entered into the inside of the anode active material layer 54B, the surface temperature was largely decreased and occurrence of gas eruption was suppressed while decrease in the initial efficiency, the discharge capacity, and the capacity retention rate was suppressed to the minimum.

In particular, when the content of the flame retardant material was from 5 wt % to 30 wt %, the initial efficiency, the discharge capacity, and the capacity retention rate was further increased, and the surface temperature was further decreased.

As can be seen from the results shown in Tables 1 to 6, when the flame retardant layer contained a particular flame retardant material and a portion of the flame retardant layer entered into one or both of the cathode and the anode, safety was largely improved while battery characteristics were secured. Accordingly, battery characteristics and safety were both achieved.

The present application has been described above referring to the embodiments and Examples. However, the present application is not limited to the examples described in the embodiments and Examples, and may be variously modified. For example, the description has been given with the specific examples of the case in which the battery structure is of a cylindrical type, a laminated film type, and a square type, and the battery device has a spirally wound structure. However, applicable structures are not limited thereto. The secondary battery of the present application is similarly applicable to a case where the secondary battery has other battery structure such as a coin type and a button type, and to a case where the battery device has other structure such as a laminated structure.

Moreover, for example, the electrode reactant may be any of other Group 1 elements such as sodium (Na) and potassium (K), Group 2 elements such as magnesium and calcium, and other light metal such as aluminum. The effects of the present application should be obtained independently of the kind of the electrode reactant. Accordingly, similar effects are achieved also when the kind of the electrode reactant is changed.

It is to be noted that the effects described herein are mere examples. The effects of the present application are not limited thereto, and may include other effect.

It is possible to achieve at least the following configurations from the above-described example embodiments and the modifications of the technology.

[1]

A secondary battery including:
a cathode;
an anode;
an electrolytic solution; and
an interlayer provided between the cathode and the anode and including one or more of a polyphosphate salt, a melamine salt, a melamine derivative represented by Formula (1), a metal hydroxide, and a metal hydrate, the interlayer partially entering into the cathode, the anode, or both,

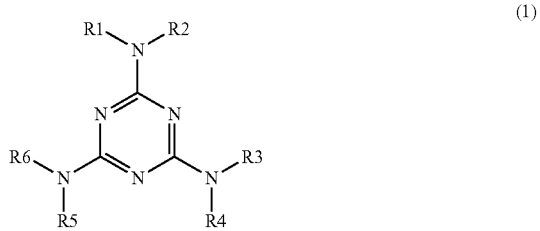

where R1 to R6 are each one of a hydrogen group (—H), a monovalent hydrocarbon group, a monovalent hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.

[2]

The secondary battery according to [1], further including
a separator provided between the cathode and the anode, wherein
the interlayer is provided between the cathode and the separator and partially enters into the cathode.

[3]
The secondary battery according to [1], further including
a separator provided between the cathode and the anode,
wherein
the interlayer is provided between the anode and the separator and partially enters into the anode.

[4]
The secondary battery according to [1], further including
a separator provided between the cathode and the anode,
wherein
the interlayer includes a first interlayer and a second interlayer, the first interlayer being provided between the cathode and the separator and partially entering into the cathode, and the second interlayer being provided between the anode and the separator and partially entering into the anode.

[5]
The secondary battery according to [2], wherein attachment intensity of the interlayer with respect to the separator is higher than attachment intensity of the interlayer with respect to the cathode.

[6]
The secondary battery according to [3], wherein attachment intensity of the interlayer with respect to the separator is higher than attachment intensity of the interlayer with respect to the anode.

[7]
The secondary battery according to [4], wherein attachment intensity of the first interlayer with respect to the separator is higher than attachment intensity of the first interlayer with respect to the cathode, and attachment intensity of the second interlayer with respect to the separator is higher than attachment intensity of the second interlayer with respect to the anode.

[8]
The secondary battery according to [1], wherein the interlayer is a separator.

[9]
The secondary battery according to [1], wherein the interlayer is an electrolyte layer including the electrolytic solution and a polymer compound that holds the electrolytic solution.

[10]
The secondary battery according to any one of [1] to [9], wherein
the monovalent hydrocarbon group is an alkyl group having carbon number from 1 to 5 both inclusive, and
the monovalent hydroxyl-group-containing hydrocarbon group is a hydroxyalkyl group having carbon number from 1 to 5 both inclusive.

[11]
The secondary battery according to any one of [1] to [10], wherein
the polyphosphate salt includes one or more of ammonium polyphosphate, magnesium polyphosphate, barium polyphosphate, zinc polyphosphate, nickel polyphosphate, aluminum polyphosphate, and melamine polyphosphate,
the melamine salt includes one or more of melamine cyanurate and melamine sulfate,
the melamine derivative includes one or more of melamine and compounds represented by respective Formulas (1-1) to (1-4),
the metal hydroxide includes one or more of Al(OH)3, Mg(OH)2, Mg3Si4O10(OH)2, and Al2SiO3(OH),
the metal hydrate includes one or more of Al2O3.H2O, Mg6Al2(CO3)(OH)16.4H2O, Mg9Si12O30(OH)6(OH2)4.6H2O, K2O.3Al2O3.6SiO2.2H2O, (Ca/2, Na)0.33(Mg, Fe2+)3(Si, Al)4O10(OH)2.4H2O, (Mg, Al)2Si4O10(OH).6H2O, and (Na, Ca)0.33 (Al, Mg)2Si4O10(OH)2.nH2O where n is an integer of 1 or larger.

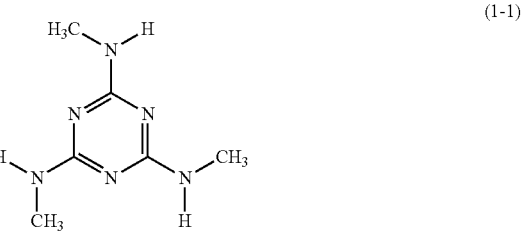

(1-1)

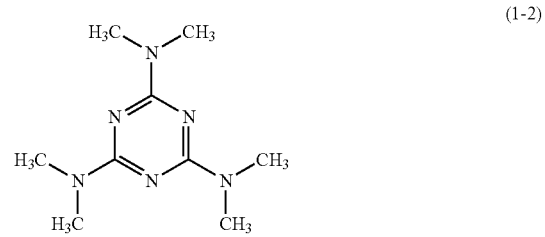

(1-2)

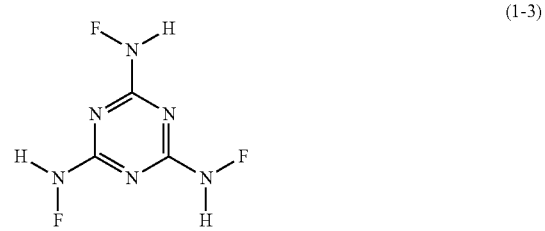

(1-3)

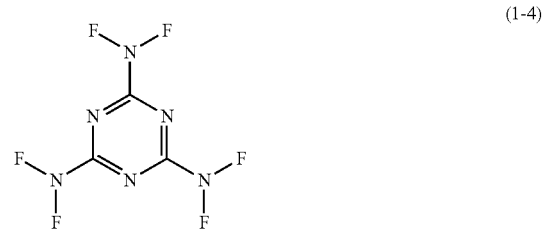

(1-4)

[12]
The secondary battery according to any one of [1] to [11], wherein the secondary battery is a lithium ion secondary battery.

[13]
A battery pack including:
the secondary battery according to any one of [1] to [12];
a control section configured to control operation of the secondary battery; and
a switch section configured to switch the operation of the secondary battery according to an instruction of the control section.

[14]
An electric vehicle including:
the secondary battery according to any one of [1] to [12];
a conversion section configured to convert electric power supplied from the secondary battery into drive power;
a drive section configured to operate according to the drive power; and
a control section configured to control operation of the secondary battery.

[15]
An electric power storage system including:
the secondary battery according to any one of [1] to [12];
one or more electric devices configured to be supplied with electric power from the secondary battery; and a control section configured to control the supplying of the electric power from the secondary battery to the one or more electric devices.

[16]

An electric power tool including:

the secondary battery according to any one of [1] to [12]; and a movable section configured to be supplied with electric power from the secondary battery.

[17]

An electronic apparatus including the secondary battery according to any one of [1] to [12] as an electric power supply source.

[18]

An electrode including:

an active material layer; and a surface layer provided on the active material layer and including one or more of a polyphosphate salt, a melamine salt, a melamine derivative represented by Formula (1), a metal hydroxide, and a metal hydrate, the surface layer partially entering into the active material layer,

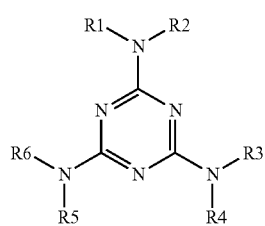

(1)

where R1 to R6 are each one of a hydrogen group (—H), a monovalent hydrocarbon group, a monovalent hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery comprising:

a cathode;

an anode;

an electrolytic solution; and an interlayer provided between the cathode and the anode and including a melamine derivative represented by Formula (1), the interlayer partially entering into the cathode, the anode, or both,

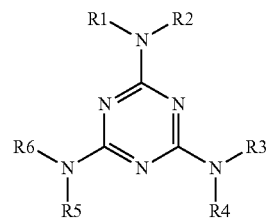

(1)

where R1 to R6 are each one of a hydrogen group (—H), a monovalent hydrocarbon group, a monovalent hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.

2. The secondary battery according to claim 1, further comprising a separator provided between the cathode and the anode, wherein the interlayer is provided between the cathode and the separator and partially enters into the cathode.

3. The secondary battery according to claim 1, further comprising a separator provided between the cathode and the anode, wherein the interlayer is provided between the anode and the separator and partially enters into the anode.

4. The secondary battery according to claim 1, further comprising a separator provided between the cathode and the anode, wherein the interlayer includes a first interlayer and a second interlayer, the first interlayer being provided between the cathode and the separator and partially entering into the cathode, and the second interlayer being provided between the anode and the separator and partially entering into the anode.

5. The secondary battery according to claim 2, wherein attachment intensity of the interlayer with respect to the separator is higher than attachment intensity of the interlayer with respect to the cathode.

6. The secondary battery according to claim 3, wherein attachment intensity of the interlayer with respect to the separator is higher than attachment intensity of the interlayer with respect to the anode.

7. The secondary battery according to claim 4, wherein attachment intensity of the first interlayer with respect to the separator is higher than attachment intensity of the first interlayer with respect to the cathode, and attachment intensity of the second interlayer with respect to the separator is higher than attachment intensity of the second interlayer with respect to the anode.

8. The secondary battery according to claim 1, wherein the interlayer is a separator.

9. The secondary battery according to claim 1, wherein the interlayer is an electrolyte layer including the electrolytic solution and a polymer compound that holds the electrolytic solution.

10. The secondary battery according to claim 1, wherein
the monovalent hydrocarbon group is an alkyl group having carbon number from 1 to 5 both inclusive, and
the monovalent hydroxyl-group-containing hydrocarbon group is a hydroxyalkyl group having carbon number from 1 to 5 both inclusive.

11. The secondary battery according to claim 1, wherein
the interlayer further comprises a polyphosphate salt including one or more of ammonium polyphosphate, magnesium polyphosphate, barium polyphosphate, zinc polyphosphate, nickel polyphosphate, aluminum polyphosphate, and melamine polyphosphate,
the interlayer further comprises a melamine salt including one or more of melamine cyanurate and melamine sulfate,
the melamine derivative includes one or more of melamine and compounds represented by respective Formulas (1-1) to (1-4),
the interlayer further comprises a metal hydroxide including one or more of Al(OH)3, Mg(OH)2, Mg3Si4O10(OH)2, and Al2SiO3(OH),
the interlayer further comprises a metal hydrate including one or more of Al2O3.H2O, Mg6Al2(CO3)(OH)16.4H2O, Mg9Si12O30(OH)6(OH2)4.6H2O, K2O.3Al2O3.6SiO2.2H2O, (Ca/2, Na)0.33(Mg, Fe2+)3(Si, Al)4O10(OH)2.4H2O, (Mg, Al)2Si4O10(OH).6H2O, and (Na, Ca)0.33(Al, Mg)2Si4O10(OH)2.nH2O where n is an integer of 1 or larger,

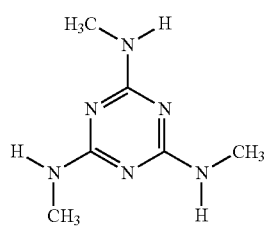
(1-1)

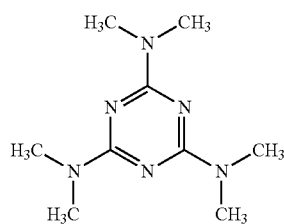
(1-2)

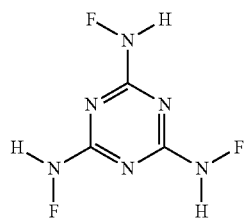
(1-3)

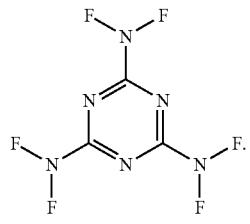
(1-4)

12. The secondary battery according to claim 1, wherein the secondary battery is a lithium ion secondary battery.

13. A battery pack comprising:
a secondary battery;
a control section configured to control operation of the secondary battery; and
a switch section configured to switch the operation of the secondary battery according to an instruction of the control section,
the secondary battery including
a cathode,
an anode,
an electrolytic solution, and
an interlayer provided between the cathode and the anode and including a melamine derivative represented by Formula (1), the interlayer partially entering into the cathode, the anode, or both,

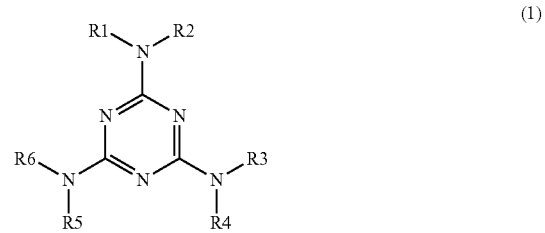
(1)

where R1 to R6 are each one of a hydrogen group (—H), a monovalent hydrocarbon group, a monovalent hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.

14. An electric vehicle comprising:
a secondary battery;
a conversion section configured to convert electric power supplied from the secondary battery into drive power;
a drive section configured to operate according to the drive power; and
a control section configured to control operation of the secondary battery,
the secondary battery including
a cathode,
an anode,
an electrolytic solution, and
an interlayer provided between the cathode and the anode and including a melamine derivative represented by Formula (1), the interlayer partially entering into the cathode, the anode, or both,

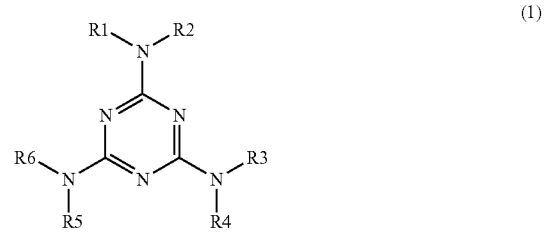
(1)

where R1 to R6 are each one of a hydrogen group (—H), a monovalent hydrocarbon group, a monovalent hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.

15. An electric power storage system comprising:
a secondary battery;
one or more electric devices configured to be supplied with electric power from the secondary battery; and
a control section configured to control the supplying of the electric power from the secondary battery to the one or more electric devices,
the secondary battery including
a cathode,
an anode,
an electrolytic solution, and
an interlayer provided between the cathode and the anode and including a melamine derivative represented by Formula (1), the interlayer partially entering into the cathode, the anode, or both,

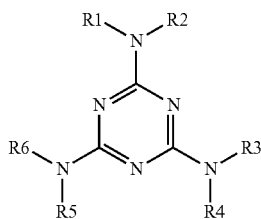
(1)

where R1 to R6 are each one of a hydrogen group (—H), a monovalent hydrocarbon group, a monovalent hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.

16. An electric power tool comprising:
a secondary battery; and
a movable section configured to be supplied with electric power from the secondary battery,
the secondary battery including
a cathode,
an anode,
an electrolytic solution, and
an interlayer provided between the cathode and the anode and including a melamine derivative represented by Formula (1), the interlayer partially entering into the cathode, the anode, or both,

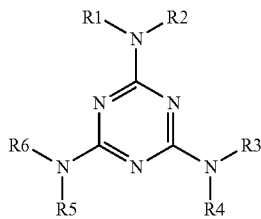
(1)

where R1 to R6 are each one of a hydrogen group (—H), a monovalent hydrocarbon group, a monovalent hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.

17. An electronic apparatus comprising
a secondary battery as an electric power supply source,
the secondary battery including
a cathode,
an anode,
an electrolytic solution, and
an interlayer provided between the cathode and the anode and including a melamine derivative represented by Formula (1), the interlayer partially entering into the cathode, the anode, or both,

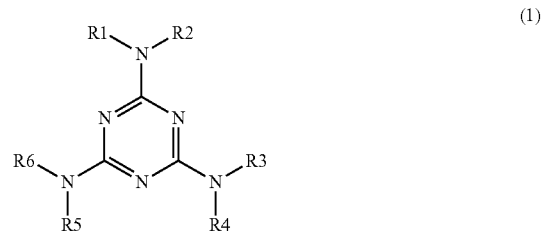
(1)

where R1 to R6 are each one of a hydrogen group (—H), a monovalent hydrocarbon group, a monovalent hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.

18. An electrode comprising:
an active material layer; and
a surface layer provided on the active material layer and including a melamine derivative represented by Formula (1), the surface layer partially entering into the active material layer,

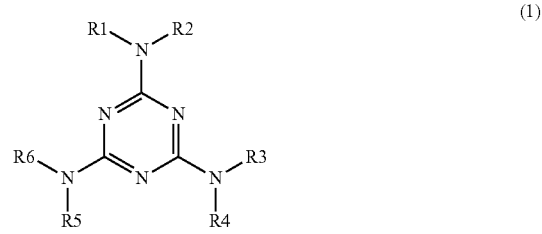
(1)

where R1 to R6 are each one of a hydrogen group (—H), a monovalent hydrocarbon group, a monovalent hydroxyl-group-containing hydrocarbon group, a monovalent group obtained by bonding one or more monovalent hydrocarbon groups and one or more oxygen bonds (—O—), a monovalent group obtained by bonding one or more monovalent hydroxyl-group-containing hydrocarbon groups and one or more oxygen bonds, and a monovalent group obtained by bonding two or more thereof.

* * * * *